United States Patent
Abrahami et al.

(10) Patent No.: US 11,449,661 B2
(45) Date of Patent: *Sep. 20, 2022

(54) SYSTEM AND METHOD FOR EXTENDED DYNAMIC LAYOUT

(71) Applicant: Wix.com Ltd., Tel Aviv (IL)

(72) Inventors: Nadav Abrahami, Tel Aviv (IL); Giora Kaplan, Tel Aviv (IL); Avishai Abrahami, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,151

(22) Filed: Sep. 9, 2020

(65) Prior Publication Data
US 2020/0410155 A1     Dec. 31, 2020

Related U.S. Application Data

(60) Division of application No. 16/195,956, filed on Nov. 20, 2018, now Pat. No. 10,789,412, which is a (Continued)

(51) Int. Cl.
*G06F 17/00*   (2019.01)
*G06F 40/106*  (2020.01)
(Continued)

(52) U.S. Cl.
CPC .......... *G06F 40/106* (2020.01); *G06F 3/0482* (2013.01); *G06F 16/986* (2019.01); (Continued)

(58) Field of Classification Search
CPC .......... G06F 17/2247; G06F 17/30893; G06F 17/30905; G06F 17/218; G06F 17/211
See application file for complete search history.

(56) References Cited

U.S. PATENT DOCUMENTS 5,570,281 A   10/1996  Berry
5,649,133 A    7/1997  Arquie
(Continued)

OTHER PUBLICATIONS

Yves Ernst: "HTML—In 10 Minuten zur eigenen HomePage", Data Becker, 1996, ISBN 3-8158-1560-6, pp. 23-26, Chapter 1.8 „Richtig verankert: So hangeln Sie sich durch Ihr Dokument.
(Continued)

*Primary Examiner* — Hassan Mrabi
(74) *Attorney, Agent, or Firm* — Heidi Brun Associates Ltd.

(57) ABSTRACT

A website editor includes a database to store pages and components, the components predefined as one of: master components associated with at least one master page and regular components associated with at least one regular page; a displayer to display a composite page including master components and regular components; an editor to enable a user to select either the master components or the regular components for editing thereby generating selected components and non-selected components and a layout manager to dynamically create at least automatic anchors between parallel edges of affecting and affected selected components according to associated dynamic layout rules, the rules defining relationships at least between content and a containing component, between a component and a peer component in a primary direction, between bottom edges of the affecting and the affected selected components, and between horizontal and vertical edges of the affecting and the affected selected components.

14 Claims, 55 Drawing Sheets

Related U.S. Application Data continuation-in-part of application No. 13/771,119, filed on Feb. 20, 2013, now Pat. No. 10,185,703, and a continuation-in-part of application No. 13/779,798, filed on Feb. 28, 2013, now Pat. No. 10,169,307, and a continuation-in-part of application No. 13/786,488, filed on Mar. 6, 2013, now abandoned.

(60) Provisional application No. 61/600,726, filed on Feb. 20, 2012, provisional application No. 61/605,243, filed on Mar. 1, 2012, provisional application No. 61/607,094, filed on Mar. 6, 2012.

(51) Int. Cl.
*G06F 16/958* (2019.01)
*G06F 3/0482* (2013.01)
*G06F 40/166* (2020.01)
*G06F 40/143* (2020.01)
*G06F 40/197* (2020.01)

(52) U.S. Cl.
CPC .......... *G06F 40/143* (2020.01); *G06F 40/166* (2020.01); *G06F 16/972* (2019.01); *G06F 40/197* (2020.01); *G06F 2203/04804* (2013.01)

(56) References Cited

U.S. PATENT DOCUMENTS

| | | | |
|---|---|---|---|
| 5,706,591 A | 1/1998 | Wissmiller | |
| 5,721,848 A * | 2/1998 | Joseph | G06F 9/451 715/764 |
| 5,796,401 A * | 8/1998 | Winer | G06T 11/60 345/619 |
| 6,111,573 A * | 8/2000 | McComb | G09G 5/363 345/661 |
| 6,144,962 A | 11/2000 | Weinberg et al. | |
| 6,144,991 A * | 11/2000 | England | H04L 29/06 709/205 |
| 6,199,082 B1 * | 3/2001 | Ferrel | G06F 16/958 715/205 |
| 6,310,631 B1 | 10/2001 | Cecco et al. | |
| 7,024,022 B2 * | 4/2006 | Harrington | H04N 1/00002 382/112 |
| 7,171,618 B2 * | 1/2007 | Harrington | G06F 40/197 715/229 |
| 7,222,306 B2 * | 5/2007 | Kaasila | G09G 5/24 715/801 |
| 7,391,885 B2 * | 6/2008 | Harrington | G06F 16/382 382/112 |
| 7,533,142 B2 * | 5/2009 | Ng | G06F 16/957 709/202 |
| 7,554,689 B2 * | 6/2009 | Tonisson | G06F 40/186 358/1.18 |
| 7,568,155 B1 * | 7/2009 | Axe | G06Q 30/02 715/246 |
| 7,634,725 B2 * | 12/2009 | Nishikawa | G06K 15/02 715/243 |
| 7,770,122 B1 | 8/2010 | Shaik | |
| 7,805,672 B2 * | 9/2010 | Kobashi | G06F 40/106 715/252 |
| 7,812,786 B2 * | 10/2010 | Etelapera | G06F 9/451 345/3.3 |
| 7,831,909 B2 * | 11/2010 | Tokunaga | G06F 40/103 715/247 |
| 7,856,345 B2 * | 12/2010 | Christensen | G06F 40/174 703/4 |
| 7,895,522 B2 * | 2/2011 | Wong | H04L 67/34 715/746 |
| 7,900,139 B2 * | 3/2011 | Hosotsubo | G06T 11/60 715/247 |
| 7,924,452 B2 * | 4/2011 | Matsuda | H04N 1/00509 358/1.15 |
| 7,992,007 B2 * | 8/2011 | Lazzaro | G07F 7/1041 713/183 |
| 8,091,036 B1 * | 1/2012 | Pavek | G06F 8/38 715/762 |
| 8,112,502 B2 * | 2/2012 | Emmelmann | H04L 67/42 709/219 |
| 8,296,183 B2 * | 10/2012 | Evans | G06Q 30/0276 705/14.43 |
| 8,312,170 B2 * | 11/2012 | Ng | G06F 16/954 709/246 |
| 8,381,093 B2 | 2/2013 | Mohan | |
| 8,418,131 B2 * | 4/2013 | Emmelmann | H04L 67/42 717/111 |
| 8,489,984 B1 * | 7/2013 | Violet | G06F 8/34 715/243 |
| 8,510,651 B1 * | 8/2013 | Palkar | G06F 16/958 715/273 |
| 8,661,338 B2 * | 2/2014 | Purvis | G06T 11/60 715/249 |
| 8,694,900 B2 * | 4/2014 | Bishop | G06F 9/451 715/763 |
| 8,819,542 B2 | 8/2014 | Cudich et al. | |
| 8,862,991 B2 * | 10/2014 | Harrington | G06F 40/143 715/277 |
| 8,887,132 B1 * | 11/2014 | Hunter | G06F 9/44505 717/111 |
| 8,978,075 B1 * | 3/2015 | Kaiser | H04N 5/44591 725/62 |
| 9,043,698 B2 * | 5/2015 | Tucovic | G06F 40/106 715/246 |
| 9,304,975 B2 * | 4/2016 | Boreham | G06F 40/103 |
| 10,789,412 B2 | 9/2020 | Abrahami et al. | |
| 2002/0116418 A1 * | 8/2002 | Lachhwani | G06F 40/106 715/244 |
| 2003/0023632 A1 * | 1/2003 | Ries | G06F 16/958 715/235 |
| 2004/0068527 A1 | 4/2004 | Smith | |
| 2004/0078776 A1 * | 4/2004 | Moon | G06Q 40/08 717/101 |
| 2005/0071755 A1 * | 3/2005 | Harrington | G06F 40/143 715/229 |
| 2005/0108620 A1 | 5/2005 | Allyn et al. | |
| 2005/0177401 A1 | 8/2005 | Koeppel et al. | |
| 2005/0198204 A1 * | 9/2005 | Takahashi | G06F 21/6218 709/219 |
| 2006/0029125 A1 * | 2/2006 | Kobashi | G06F 40/197 375/222 |
| 2006/0044604 A1 * | 3/2006 | Mirmotahari | G06F 40/106 358/1.15 |
| 2006/0050287 A1 * | 3/2006 | Kobashi | H04N 1/3871 358/1.2 |
| 2006/0103667 A1 * | 5/2006 | Amit | G06F 40/103 345/619 |
| 2006/0143182 A1 * | 6/2006 | Meadows | G06F 8/38 |
| 2006/0174199 A1 * | 8/2006 | Soltis | G06F 40/103 715/700 |
| 2006/0190811 A1 * | 8/2006 | Ohno | G06F 40/186 715/255 |
| 2006/0198555 A1 * | 9/2006 | Hosotsubo | G06T 11/60 382/162 |
| 2006/0203294 A1 * | 9/2006 | Makino | G06T 11/60 358/400 |
| 2006/0212805 A1 * | 9/2006 | Allen | G06F 40/106 715/234 |
| 2006/0236231 A1 * | 10/2006 | Allen | G06F 40/103 715/202 |
| 2006/0253493 A1 * | 11/2006 | Tamas | G06F 16/972 |
| 2006/0259860 A1 * | 11/2006 | Kobashi | G06F 40/106 715/209 |
| 2006/0294199 A1 | 12/2006 | Bertholf | |
| 2007/0028166 A1 * | 2/2007 | Hundhausen | G06F 40/186 715/205 |
| 2007/0050718 A1 * | 3/2007 | Moore | G11B 27/034 715/744 |
| 2007/0171716 A1 * | 7/2007 | Wright | G06T 11/206 365/185.12 |

(56) References Cited

U.S. PATENT DOCUMENTS

| | | |
|---|---|---|
| 2007/0240039 A1 | 10/2007 | Hosotsubo |
| 2008/0120538 A1* | 5/2008 | Kurz .................. G06F 16/972 |
| | | 715/255 |
| 2008/0141116 A1 | 6/2008 | Mohan |
| 2008/0155387 A1* | 6/2008 | Yabe .................. G06F 40/103 |
| | | 715/204 |
| 2008/0178073 A1 | 7/2008 | Gao et al. |
| 2008/0209533 A1* | 8/2008 | Abrams ................. G06F 21/62 |
| | | 726/9 |
| 2008/0215964 A1* | 9/2008 | Abrams ................. G06F 40/10 |
| | | 715/246 |
| 2008/0215965 A1* | 9/2008 | Abrams ............... G06F 16/958 |
| | | 715/246 |
| 2008/0215967 A1* | 9/2008 | Abrams ............... G06F 16/958 |
| | | 715/255 |
| 2008/0215985 A1* | 9/2008 | Batchelder ........... G06F 40/103 |
| | | 715/731 |
| 2008/0313533 A1* | 12/2008 | Hoyer .................. G06F 40/103 |
| | | 715/243 |
| 2009/0100129 A1* | 4/2009 | Vigil ................. G06F 3/04886 |
| | | 709/203 |
| 2009/0192968 A1 | 7/2009 | Tunstall-Pedoe |
| 2009/0249193 A1 | 10/2009 | Hanechak |
| 2009/0249239 A1 | 10/2009 | Eilers |
| 2009/0309894 A1* | 12/2009 | Lam .................. G06F 40/103 |
| | | 345/582 |
| 2010/0023863 A1 | 1/2010 | Cohen-Martin |
| 2010/0058172 A1* | 3/2010 | Soldan ................ G06F 40/143 |
| | | 715/235 |
| 2010/0191727 A1* | 7/2010 | Malik ................... G06F 3/013 |
| | | 707/734 |
| 2010/0205547 A1 | 8/2010 | Boegelund et al. |
| 2010/0318892 A1 | 12/2010 | Teevan et al. |
| 2010/0325529 A1 | 12/2010 | Sun |
| 2011/0026898 A1 | 2/2011 | Lussier et al. |
| 2011/0113346 A1 | 5/2011 | O'Shaugnessy et al. |
| 2011/0213655 A1* | 9/2011 | Henkin ............... G06Q 30/0251 |
| | | 705/14.49 |
| 2012/0036423 A1* | 2/2012 | Haynes, II ............ G06F 3/0483 |
| | | 715/230 |
| 2012/0210210 A1 | 8/2012 | Itoh et al. |
| 2012/0226971 A1* | 9/2012 | Tocchini ............. G06F 16/9577 |
| | | 715/234 |
| 2013/0019150 A1* | 1/2013 | Zarom ............... H04N 21/4532 |
| | | 715/204 |
| 2013/0073945 A1* | 3/2013 | Bingell ............... G06F 16/9577 |
| | | 715/234 |
| 2013/0145240 A1 | 6/2013 | Anderson et al. |
| 2013/0174015 A1* | 7/2013 | Kwan ..................... G06F 8/36 |
| | | 715/234 |
| 2013/0187926 A1* | 7/2013 | Silverstein ............. G06F 16/80 |
| | | 345/440 |
| 2013/0212487 A1* | 8/2013 | Cote ..................... G06F 9/451 |
| | | 715/745 |
| 2013/0227617 A1* | 8/2013 | Carney ............. H04N 21/8543 |
| | | 725/61 |
| 2013/0263280 A1* | 10/2013 | Cote ................... H04L 63/1433 |
| | | 726/26 |
| 2014/0033026 A1 | 1/2014 | Sheridan et al. |
| 2014/0095632 A1 | 4/2014 | Grosz et al. |
| 2014/0250371 A1* | 9/2014 | Wabyick ................ G06F 40/10 |
| | | 715/243 |
| 2014/0289640 A1* | 9/2014 | Poornachandran ... G06F 40/106 |
| | | 715/745 |
| 2014/0289702 A1* | 9/2014 | McMahon ................ G06F 9/44 |
| | | 717/120 |

OTHER PUBLICATIONS

Shannon, "Introduction to CSS", published online Aug. 21, 2012 (Year: 2012).

Masato Nakamura, "A Dynamic Rearrangement Mechanism of Webs Page Layouts Using Web Agents", 2009, Dept. of Computer Science and Engineering, Graduate School of Engineering, Nagoya Institute of Technology, Gokiso-cho, Showa-ku, Nagoya, Aichi, 466-8555 Japan, all pages.

* cited by examiner

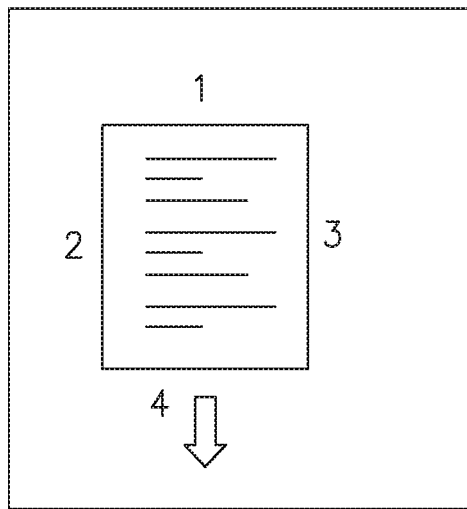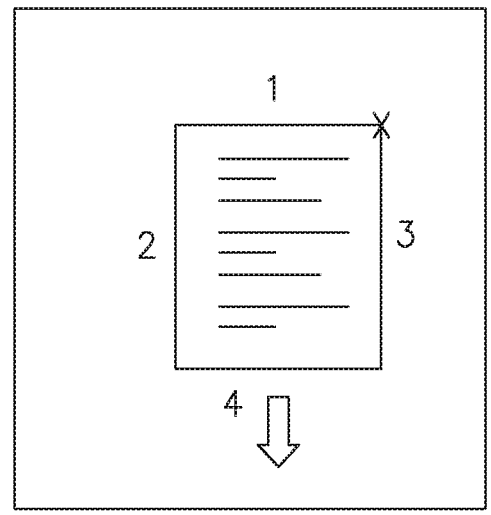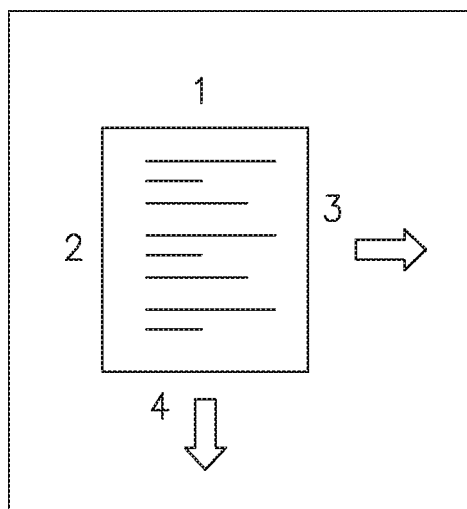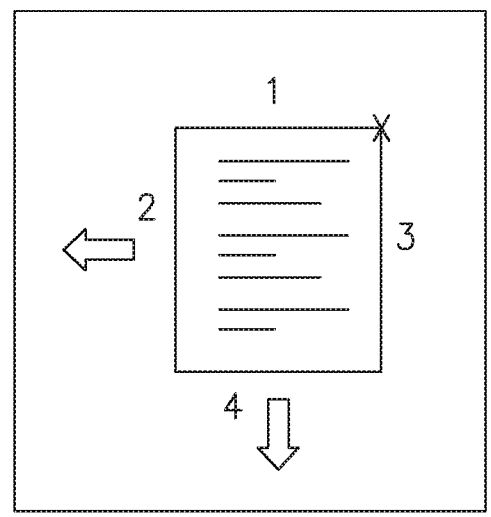
FIG.14C                               FIG.14D

SYSTEM AND METHOD FOR EXTENDED DYNAMIC LAYOUT

CROSS REFERENCE TO RELATED APPLICATIONS

This application is a divisional application of U.S. patent application Ser. No. 16/195,956 filed Nov. 20, 2018 which is a continuation-in-part application of the following applications: U.S. patent application Ser. No. 13/771,119, filed Feb. 20, 2013, now issued as U.S. Pat. No. 10,185,703, which claims priority from U.S. provisional patent application 61/600,726, filed Feb. 20, 2012; U.S. patent application Ser. No. 13/779,798, filed Feb. 28, 2013, now issued as U.S. Pat. No. 10,169,307, which claims priority from U.S. provisional patent application 61/605,243, filed Mar. 1, 2012; and U.S. patent application Ser. No. 13/786,488, filed Mar. 6, 2013, which claims priority from U.S. provisional patent application 61/607,094, filed Mar. 6, 2012, all of which are incorporated herein by reference.

FIELD OF THE INVENTION

The present invention relates to the building of online visual design systems generally and to operations therein utilizing dynamic layout in particular

BACKGROUND OF THE INVENTION

Current visual design systems use a WYSIWYG (What You See Is What You Get) metaphor to provide a convenient, high-productivity and easy to use environment for the creation and editing of graphical applications and creations. Such creations or applications can include web sites, catalogs, presentations, e-shops, flow diagrams and as well as other application categories. These creations are deployed to systems which display them on a display screen, or to systems which print them.

A visual design system may integrate both static and dynamic content into the applications created in it. Static content may be stored locally and dynamic content may originate from a number of sources such as from the application itself, a database, an external dynamic data sources (or streams) such as an RSS feed or content generated by other users of the same system.

Visual design systems may be standalone systems (such as the Microsoft Visio diagram editor or the Microsoft PowerPoint presentation program), or may be embedded inside a larger editing system (such as the Microsoft Word AutoShape editor).

A designer using such a system may design a new application from scratch (starting with a blank screen), or may rely on predefined templates created by the application designer, by the system creator, or by the designer community. When a template is provided, the designer can customize it at will, adding, removing or modifying all elements of the template to create his or her version of the template.

Such applications generally consist of multiple pages. An application can include any number of pages and pages can typically be added or removed by the system designer and/or the end-user as required. Pages contain components which can be further classified as either atomic (those that cannot be broken down into sub-components) or container (which occupy a given screen area and can contain one or more further sub-components). Components may be fixed in shape and content, may be based on a content management system or may be based on user specified content such as a text area into which the designer enters text. Dynamic components can be based on external information (static or dynamic), such as an RSS feed displaying information from an external data source or the content of a given internet page.

Container components can be nested to a number of levels and can contain components of multiple types. Some containers are also limited to contain specific classes of contained components such as a photo album container which may only hold picture components. Component appearances and screen areas can be modified by moving, resizing, rotation and similar operations. Their appearance and behavior can also be modified by various modifiers, such as blurring and animation (e.g. the component has blurred edges, or appears on the screen by expanding from a single pixel, etc.) During the application creation and editing process, the content of a component may be entered and modified in a number of ways.

In visual design systems, typically the pages (containing the components) as well as the components themselves (container and atomic components) are often rectangles whose sides are parallel to each other and to the sides of the display screen. They are also parallel to the X and Y axes of the system on which the pages are being displayed or printed. In some cases, the components themselves are not axes-parallel rectangles. They may be a rotated rectangle, a combination of attached rectangles, or have a different shape altogether. In these cases, visual design systems (and their layout management element) typically handle the components using a per-component minimal enclosing axes-parallel rectangle which contains the irregularly-shaped component.

Components do not have to occupy mutually exclusive screen regions, and may in fact geometrically intersect each other. A component may also be situated completely within the boundaries of another component. The screen area overlap may be coupled with logical containment (i.e. the component "belongs" to a given container—and moves with the container wherever it goes), or be a mere geometrical overlap which is not based on any containment relationship. Whenever components intersect, a display priority attached to each component controls which component is displayed on top of which component. A visual design system typically employs a layout manager which manages component places, sizes, display order and related issues.

Visual design systems can be often be classified as absolute position or relative position systems (described in more detail herein below). In absolute positioning systems, the focus is on exact component positioning. The location of the components is defined as an absolute position value (x, y) relative to the containing entity, be it relative to the page itself or to a container containing the component. The position is typically expressed as an offset between the top left corner of the containing entity and the top left corner of the component.

In relative positioning systems, the focus is on the concept of flow or natural order. The system arranges components along a logical content flow, which typically corresponds to the reading order of the components whenever such an order is applicable. For example, an English language word processor is essentially a layout system for characters (and words) which uses the natural reading order of the English language (top to bottom and then left to right) to arrange the displayed characters and words. Another example is a blog editing system (such as the Wordpress blogging platform commercially available from wordpress.org), which arranges page elements (blog entries, talkbacks etc.) on a page according to a natural reading flow.

Thus, in a relative positioning system, the components are positioned relative to each other, so a component is displayed after (position-wise) the display of a previous component ends. Existing absolute and relative positioning systems both define a default screen or page size, which is used for all displayed pages. All relative positioning systems (and some absolute positioning systems) can increase this size as required to accommodate the addition of content to the page.

Visual design systems which use absolute positioning are best suited for exact layout and design of the displayed page. Such exact placement allows components to be properly sized, positioned and aligned on the displayed screen. For example, as illustrated in FIG. 1 components [a], [b], [c] and [d] are arranged on a page P. Components [e] and [f] are then added in the available space (page Q), so that all are properly aligned—[a], [e] and [c] in the first row, and [b], [f] and [d] in the second row—without the need to push components aside or to calculate the correct reading flow.

There are also two main types of absolute positioning systems, constraint based systems and anchor-based systems. The types are not mutually exclusive and systems can contain elements of both systems. In visual design systems, constraints and anchors can be specified explicitly by the designer (through the system user interface) or inferred automatically by the system based on existing component layout and information. In a constraint-based system, the designer defines dynamic mathematical constraints on the relationships between the components residing on the screen. In anchor-based systems, the dynamic layout is defined in terms of anchors set between components and framework elements, as well as between the components themselves.

Dynamic layout, the automatic adjustment of components according to their content to fit on a page, is known in the art. In existing systems, dynamic layout is typically present in relative (rather than absolute) positioning systems. Current methods available provide both manual and automatic solutions using standard methodologies such as anchoring. Dynamic layout involves the moving and resizing of components on the screen based on dynamic layout triggers. These triggers may include content changes, multiple target platforms (display of the application using different technologies on different viewing platforms), multiple screen sizes (display of the application using a number of displays which have different sizes and resolutions), dynamic data (use of components containing dynamic data which changes over time), end user changes and application initiated layout changes. Component moving and resizing may also cause dynamic layout changes (i.e. act as a trigger), although the system should provide a way to move and resize component without triggering dynamic layout (e.g. by providing separate visual editing modes with and without dynamic layout triggering).

Reference is now made to FIG. 2 which illustrates the implementation of dynamic layout on components [a] and [b] situated on a page W. As can be seen, component [a] is placed slightly above component [b] with a small separation between them. During editing, when component A is moved down, it begins to overlap and occlude component [b] as seen on page X. In such a scenario, it would be desirable to also move component [b] accordingly in order to view the content of component [b] as is shown on page Y or to even resize it accordingly, as shown on page Z, without losing sight of the content of component [b]. Such changes include not only modifications to the content of the displayed components ([a], [b]) but also modifications to their style and other display parameters, such as text size and font.

U.S. Pat. No. 5,796,401 to Wiener together with U.S. Pat. No. 7,554,689 to Tonisson and U.S. Pat. No. 7,634,725 to Nishikawa are believed to be representative of the prior art regarding dynamic layout.

SUMMARY OF THE PRESENT INVENTION

There is therefore provided, in accordance with a preferred embodiment of the present invention, a website editor implementable on a computing device. The editor includes a database to store pages and components, the components predefined as one of: master components associated with at least one master page and regular components associated with at least one regular page; a displayer to display a composite page comprising master components and regular components; an editor to enable a user to select either master components or regular components for editing thereby defining selected components and non-selected components, and a layout manager to dynamically create at least automatic anchors between parallel edges of affecting and affected selected components according to associated dynamic layout rules, the rules defining relationships at least between content and a containing component, between a component and a peer component in a primary direction and between horizontal and vertical edges of the affecting and the affected selected components.

Moreover, in accordance with a preferred embodiment of the present invention, the master page also includes a page group component to provide a location for the at least one regular page.

Further, in accordance with a preferred embodiment of the present invention, the editor includes a regular page switcher to switch the current regular page being displayed and edited.

Still further, in accordance with a preferred embodiment of the present invention, the regular page switcher includes a visual menu arrangement to activate the regular page switcher.

Additionally, in accordance with a preferred embodiment of the present invention, the system includes a dynamic layout editor to update the selected components.

Moreover, in accordance with a preferred embodiment of the present invention, the displayer displays the dynamic layout updates.

Further, in accordance with a preferred embodiment of the present invention, the displayer displays the dynamic layout updates through an animation effect.

There is also provided, in accordance with a preferred embodiment of the present invention, a website editor implementable on a computing device, a method for a editing a website. The method includes storing in a database, pages and components, the components predefined as one of: master components associated with at least one master page and regular components associated with at least one regular page, displaying a composite page comprising master components and regular components, enabling a user to select either master components or regular components for editing thereby defining selected components and non-selected components, and dynamically creating at least automatic anchors between parallel edges of affecting and affected selected components according to associated dynamic layout rules, the rules defining relationships at least between content and a containing component, between a component and a peer component in a primary direction and between horizontal and vertical edges of the affecting and the affected selected components.

Moreover, in accordance with a preferred embodiment of the present invention, the master page also includes a page group component to provide a location for the at least one regular page.

Further, in accordance with a preferred embodiment of the present invention, the enabling a user includes switching the current regular page being displayed and edited.

Still further, in accordance with a preferred embodiment of the present invention, the switching includes activating the switching using a visual menu arrangement.

Additionally, in accordance with a preferred embodiment of the present invention, the method also includes updating the selected components.

Moreover, in accordance with a preferred embodiment of the present invention, the displaying displays the dynamic layout updates.

Finally, in accordance with a preferred embodiment of the present invention, the displaying displays the dynamic layout updates through an animation effect.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 14A, 14B, 14C and 14D are schematic illustrations of component center locking, constructed and operative in accordance with the present invention;

Figure 1:
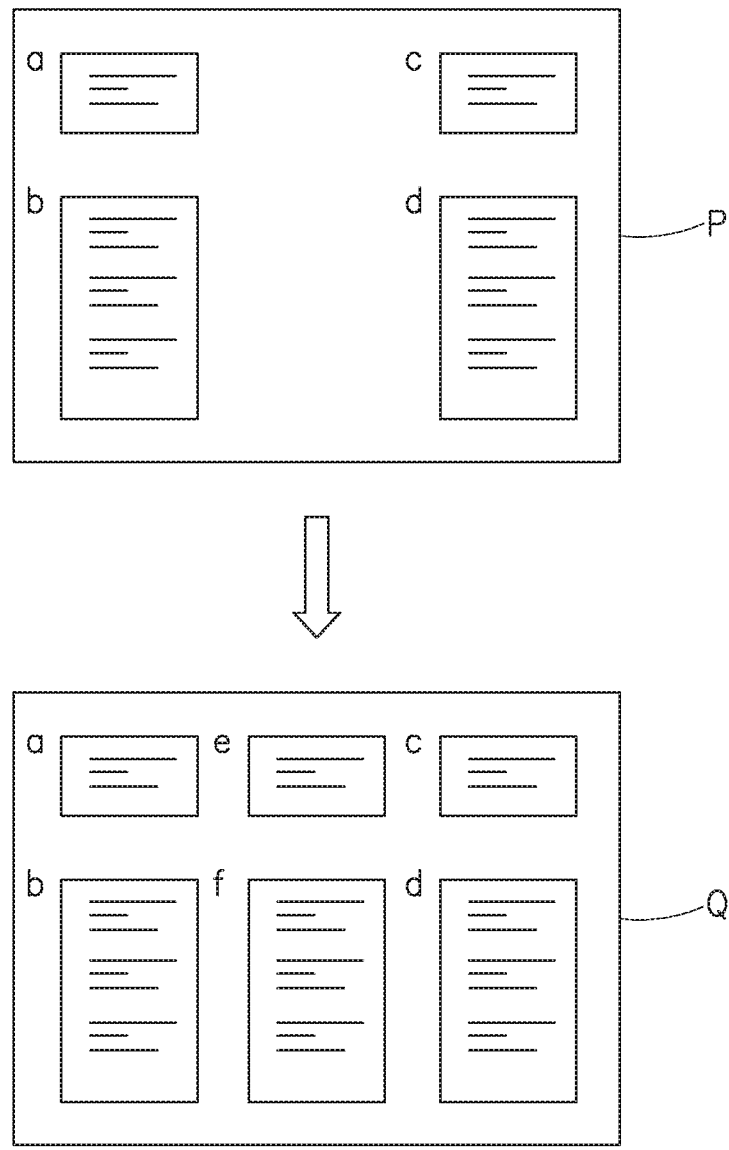
FIG. 1 is a schematic illustration of the use of absolute positioning in web page design.
Figure 2:
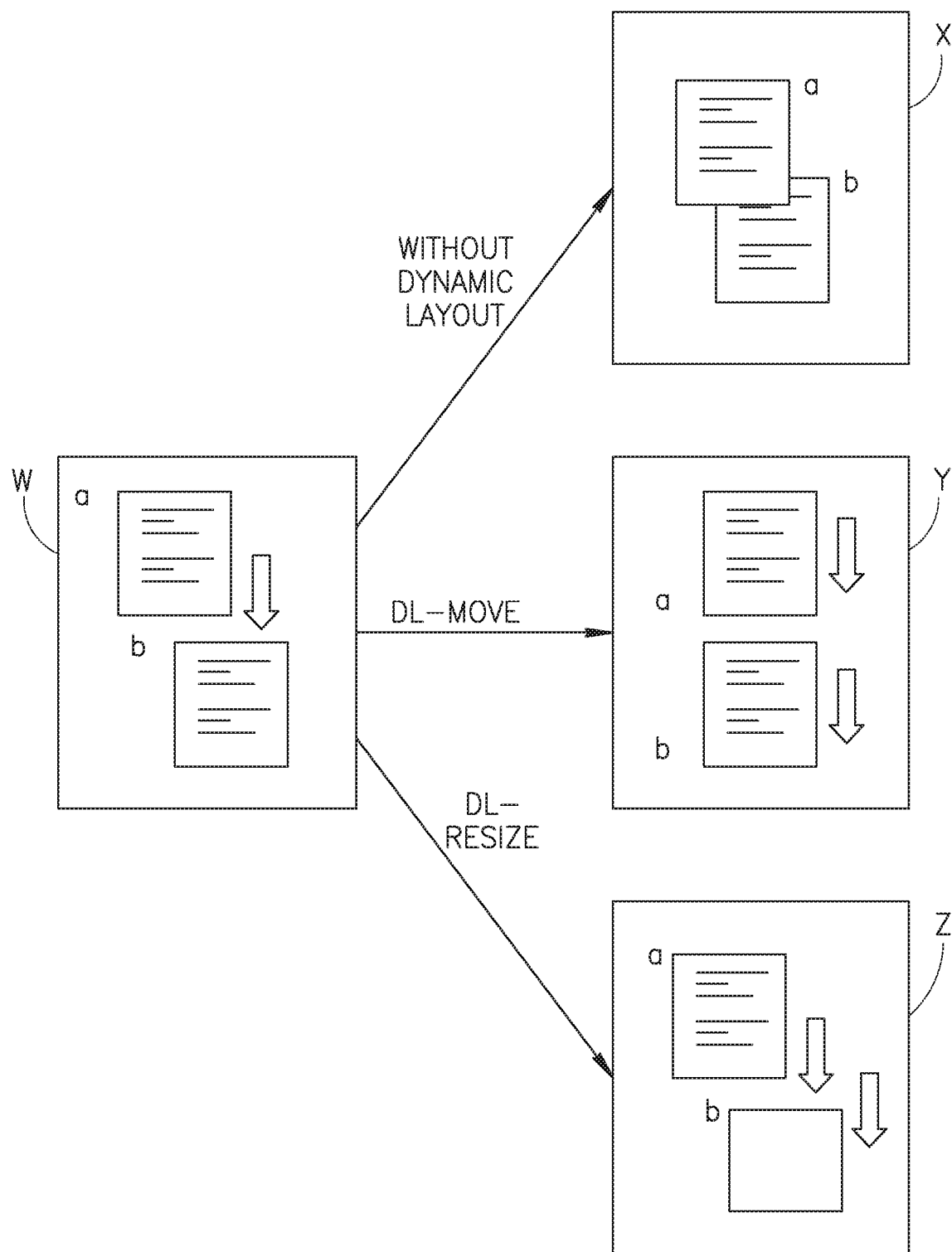
FIG. 2 is a schematic illustration of the use of dynamic layout during online editing.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 3:
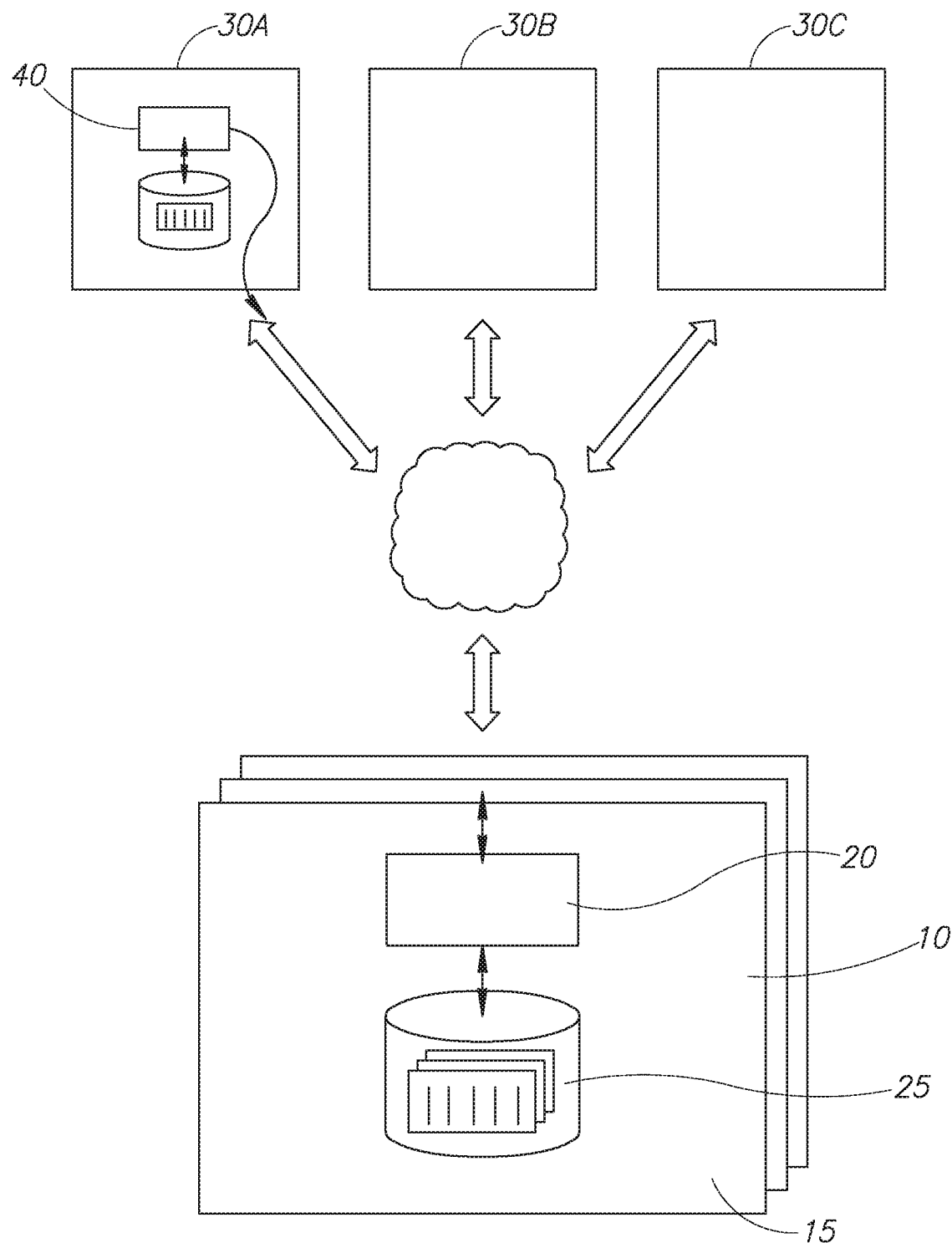
FIG. 3 is a schematic illustration of the architecture and elements of a server-based website design system.

Many of the types of visual design systems as discussed in the background are aimed specifically at the design and editing of websites. Websites are typically hosted by a remote server and accessed locally on a client integrated with a browser for access to the layout and content residing on the remote server. Reference is now made to FIG. 3 which illustrates a website server 10, hosting application 20 and content 25 and which is servicing client 30. Application 20 may be viewed using by client 30A using a browser 40. It will be appreciated that website server 10 may be typically accessed by multiple clients (30B, 30C) at any one time allowing for multiple users to view the same website concurrently.

It will also be appreciated, that in existing systems known in the art, the functionality related to dynamic layout is performed entirely on the editing or viewing software client 30, without involving the capabilities provided by a centralized application-specific server which supports the dynamic layout process. In existing systems, a copy of the website in question may often be held locally for editing. Changes made to a website are stored locally and then later synchronized with the main copy of the website which is stored on website server 10. Such synchronization may occur whenever the designer moves from page to page, on explicit designer requests, over a given time period or using another mechanism.

Applicants have realized that current methods of working with dynamic layout are limiting. There are two solutions that are in common use in absolute-positioning systems for the problems arising when there is insufficient space to display the required content. One common solution is dynamically adding scroll bars (e.g. HTML IFRAME or DIV "scrolling=auto" property) to the component so as to enable the application user to scroll over the content (be it text or image). Another common solution is dynamically changing the text font size to fit into the available space (such as. Microsoft Excel's "alignment I shrink to fit" option). It will be appreciated that scroll bars require the application user to scroll to read the full text, or view the full media and that this is particularly bothersome o users when there is only a small amount of text which doesn't fit into the allocated space; Horizontal scroll bars may be especially problematic as they require text to be scrolled twice for every line read, and not just when finishing reading the page (as vertical scroll bars do). A similar problem exists with vertical scroll bars applied to components displaying vertical text such as Japanese and Chinese traditional text writing. Scroll bars also cannot be used in print media output, or in situations in which user interaction is limited (such as applications displayed on a data kiosk). Text font resizing is often unacceptable as the text would have to shrink to a size below what is reasonable for a user to view.

As described herein above, dynamic layout, when used in absolute positioning systems, involves the moving and resizing of components on the screen based on dynamic layout triggers. Some examples known in the art for absolute positioning systems which also comprise dynamic layout include: the use of absolute alignment in HTML CSS (with 4 directional margin specification) and the use of anchoring and docking the controls in a graphical user interface (GUI) design for systems running under the Microsoft Windows operating system. Anchoring (described in more detail herein below) entails connecting the edge of a GUI component to the edge of a container, causing the component to be resized or moved when the container changes. Docking entails specifying that multiple GUI components are stacked (based on predefined priority) near a given edge of a container. These options can be found, for example, in the Microsoft dynamic layout controls and in the Telerik dynamic reports system commercially available from Telerik.

Applicants have realized that these simple dynamic layout solutions and systems cannot create complex, high quality web sites (such as e-Commerce store fronts) that integrate multiple dynamic content and dynamic layouts. There are often cases in which components have to be moved or re-sized making it difficult to maintain the preplanned exact layout. This layout can become unstable and incorrect. This is especially relevant when the content is external to the system, and reflects for example, an external product database which is not managed by the design system itself. Dynamic layout is also a necessity for devices such as smart phones and tablets that have smaller display areas than a regular personal computer. Applicants have further realized that the use of a centralized application-specific server combined with dynamic layout principles may allow for concurrent editing of the same website by multiple users on multiple clients, may allow for the integration of dynamic content from multiple sources and may also allow automatic real time modifications due to dynamic data and screen size changes.

Figure 4A:
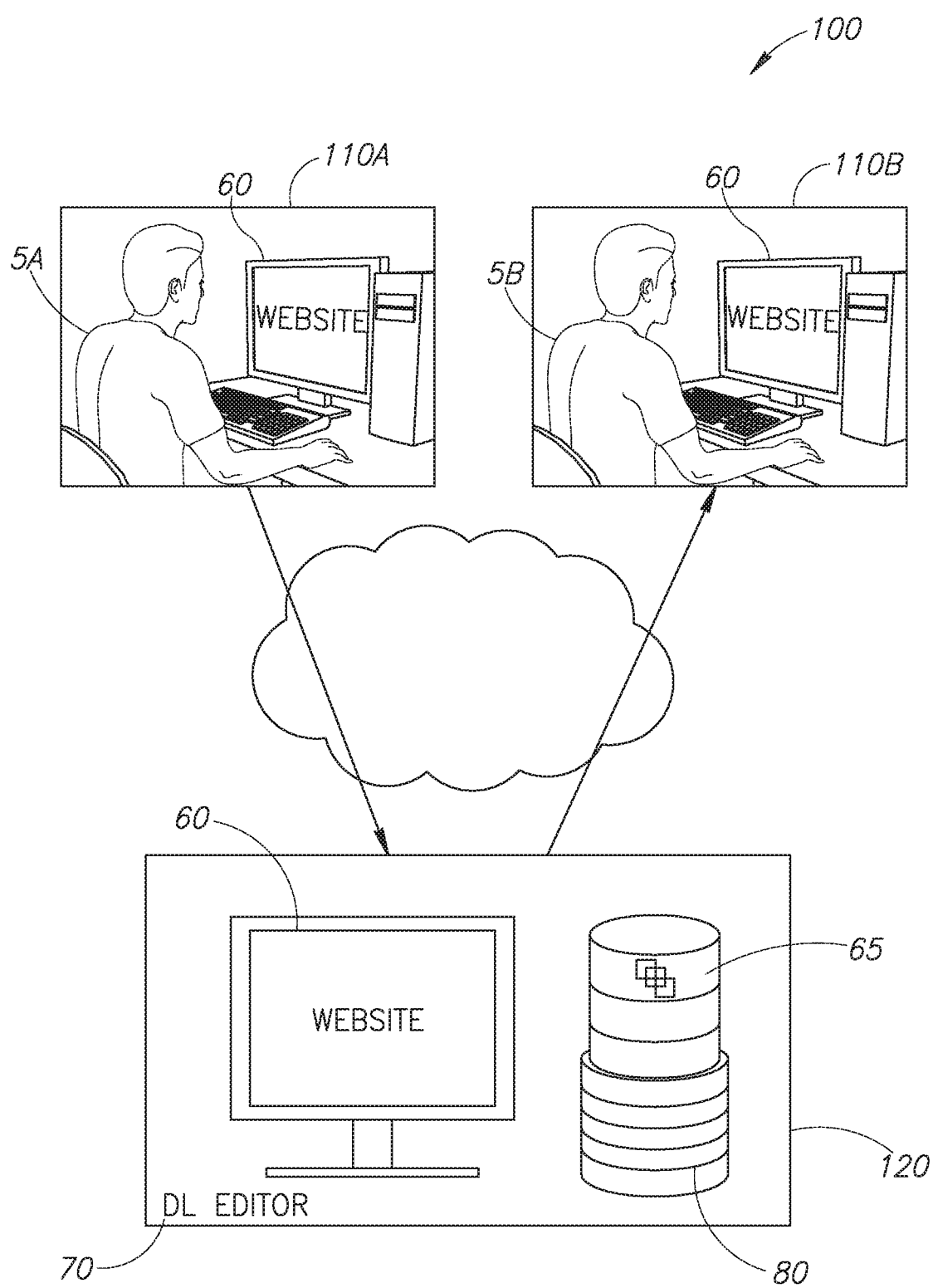
FIG. 4A is a schematic illustration of a centralized application-specific server system for the design and layout of a website implementing dynamic layout techniques, constructed and operative in accordance with the present invention.

Reference is now made to FIG. 4A which illustrates a centralized application-specific server system 100 for the design and layout of a website 60 implementing dynamic layout techniques in accordance with an embodiment of the current invention. It will be appreciated that system 100 may facilitate the use of dynamic data, as well as supporting dynamic layout changes resulting from other sources, such as user-generated or application-initiated changes.

Server-based system 100 may comprise two main interconnected sub-systems, a client component 110 and a server component 120. It will be appreciated that there may be more than one client component 110, connected to server component 120 at any one time. It will be further appreciated that there may be two types of client components—an editor client 110A (used by the application designer) and a viewer client 110B (used by an end user of the application). It will also be appreciated that both the editor client 110A and the viewer client 110B may be implemented either using the same architecture and technology—for example, both are FLASH-based downloaded applications, or both are iOS-based applications—or may use entirely different architecture and technology to the same advantage. A browser based application may also be used, which may be downloaded but combines both client and server side work. Clients 110A and 110B may also have different screen sizes and geometries used for display. It will also be appreciated that both clients 110A and 110B may be personal computers with a full browser and full HTML support, or may be smartphones or tablets, or alternatively may be an application embedded within a social network. The latter may internally limit the availability of HTML and JavaScript which can be used in the application display (e.g. for security reasons or due to limitations of its embedded browser).

Server 120 may comprise a website application 60, a dynamic layout editor 70 and a data repository 80. Website application 60 may also be installed locally on clients 110A and 110B. Data repository 80 may store the pages and templates 65 pertinent to website 60, together with component information as well as rules and parameters pertinent to dynamic layout actions.

Figure 4B:
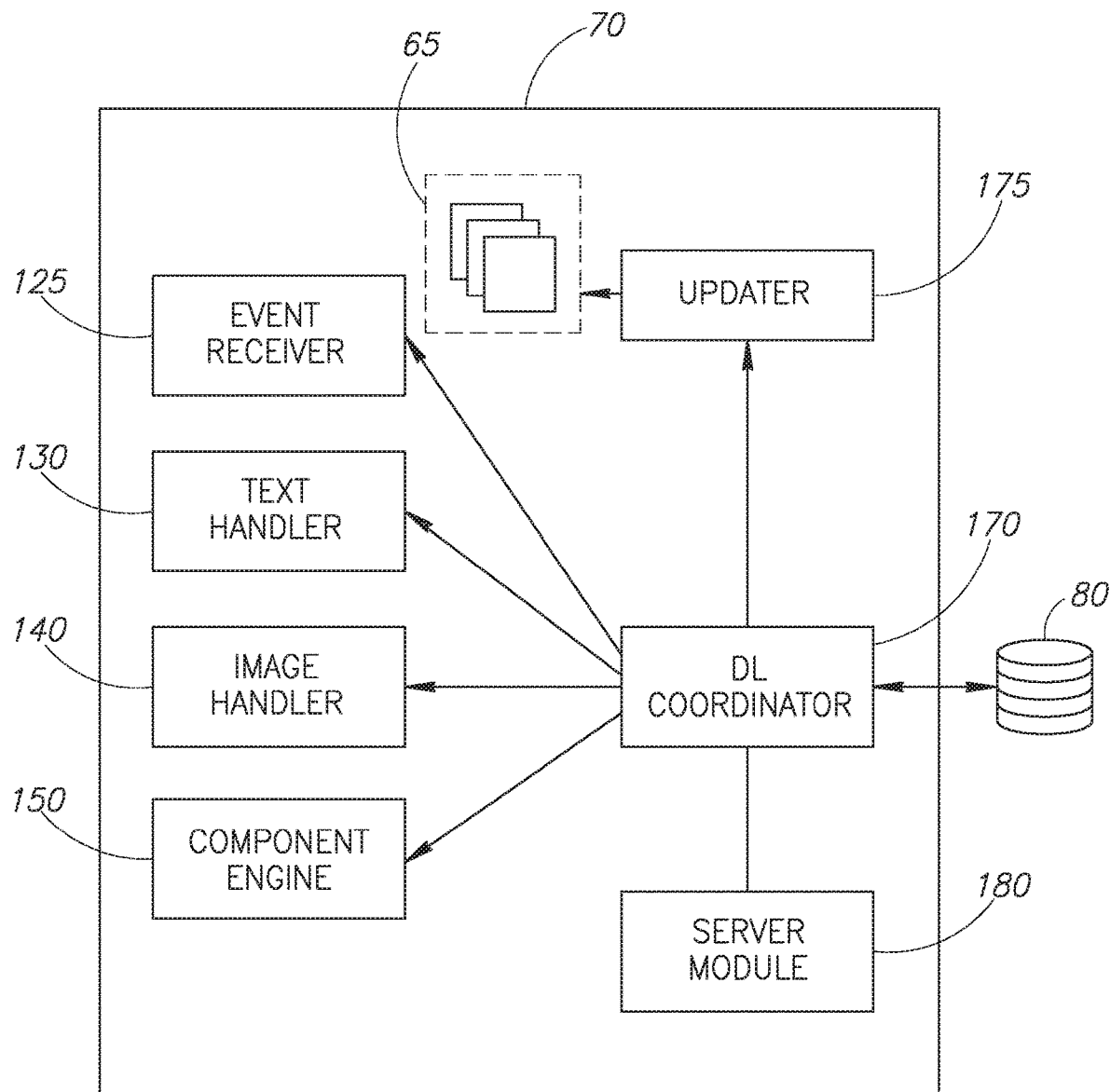
FIG. 4B is a schematic illustration of the elements of a dynamic layout editor; constructed and operative in accordance with the present invention.

Dynamic layout editor 70 may comprise an event receiver 125, a text handler 130, an image handler 140, a component engine 150, a dynamic layout coordinator 170, a pre-processor 155, an updater 175 and a server module 180 as illustrated in FIG. 4B to which reference is now made. Event receiver 125 may receive dynamic layout events caused by dynamic layout triggers. Dynamic layout coordinator 170 may coordinate the dynamic layout events between one or multiple clients 110 and server 120 by coordinating the flow of information between changes made by website designer or end-user 5 working on client 110. User 5A situated at client 110A may make changes to the pertinent template such as change the size of a component, addition of a picture etc. The pertinent change may be received by event receiver 125 which may forward the information to dynamic layout coordinator 170 which may coordinate the appropriate edits to website 60 according to the dynamic layout rules held in repository 80. Text handler 130 may handle different fonts, font sizes and text reformatting, image handler 140 may adjust the scaling of images, component engine 150 may change the actual structure of the components, pre-processor 155 may preprocess for specific targets and un-displayed areas and server module 180 may aggregate, limit and filter ingoing and outgoing data. Once the appropriate edit has been made, updater 175 may update templates 65 accordingly in order for a second user 5B situated at client 110B to see the change.

In an alternative embodiment to the present invention, dynamic layout editor 70 may also be implemented on the client side as part of client 110, for example using a locally installed visual design system, a dynamically downloaded application (such as a Flash application) or a browser-based application (which runs inside the client browser using technologies such as HTML5 and JavaScript).

In yet another alternative embodiment to the present invention, dynamic layout editor 70 may be implemented on both server 120 and client 110. For example, system 100 may handle dynamic layout processing based on triggers activated by client 110 and handle dynamic layout processing based on triggers resulting from server-side activities (such as on-line data feeds) on server 120. The division of tasks may also be dynamic, shifting tasks between the two as necessary (e.g. to optimize performance and bandwidth usage).

Figure 5A:
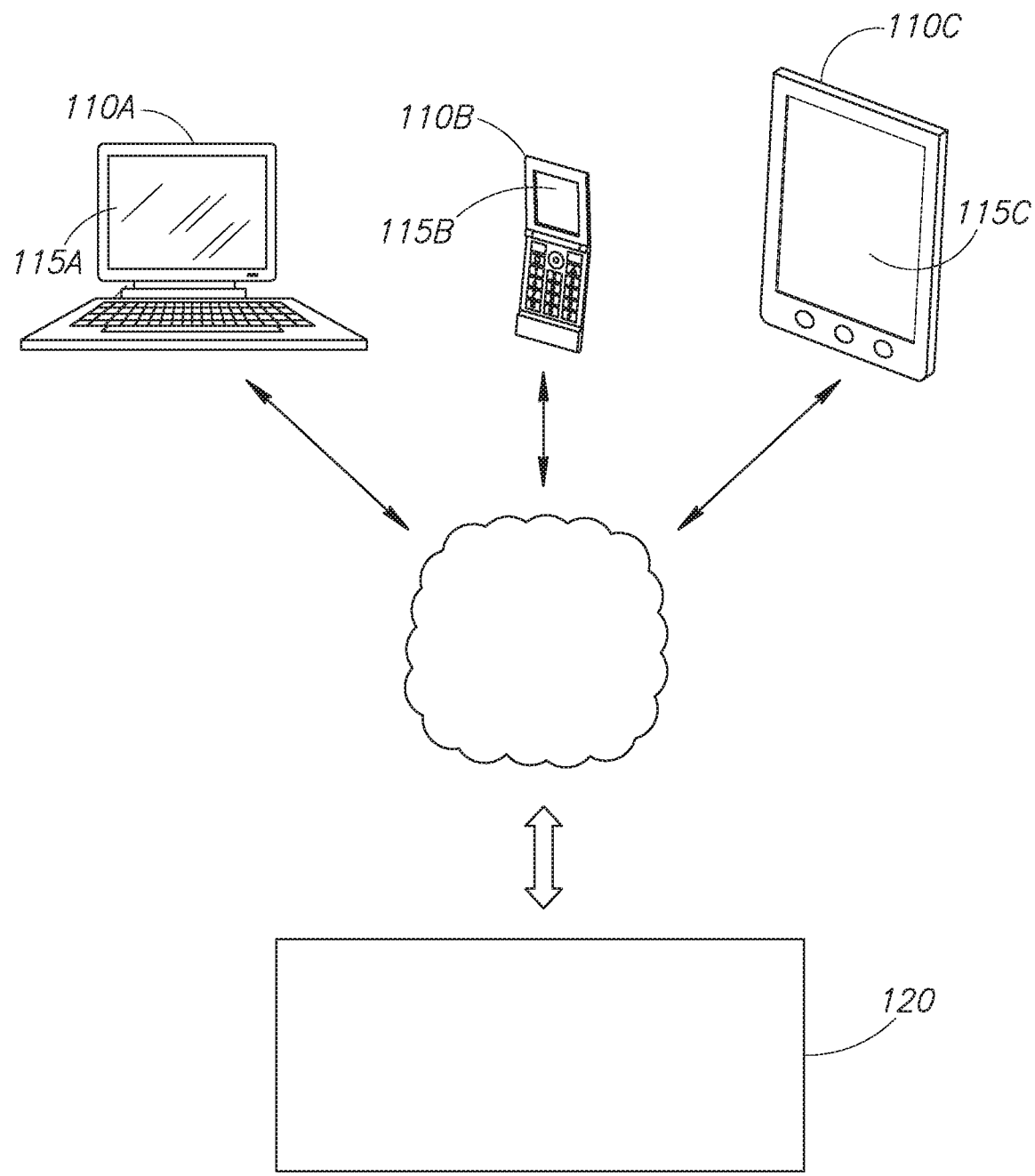
FIGS. 5A, 5B and 5C are schematic illustrations of different client side embodiments of the system of FIGS. 4A and 4B, constructed and operative in accordance with the present invention.

It will also be appreciated that there may be numerous embodiments for the client component 110. In an alternative embodiment to the present invention, as illustrated in FIG. 5A to which reference is now made, client 110 may be a software component running on a client computer 115. The software may be a pre-installed application, a dynamically downloaded application (such as a Flash application) or a browser-based application (which runs inside the client browser using technologies such as HTML5 and JavaScript). The hardware used may typically be a personal computer 115A, a smartphone 115B, or a tablet 115C etc. all connected through a communication medium such as the Internet to server 120.

Figure 5B:
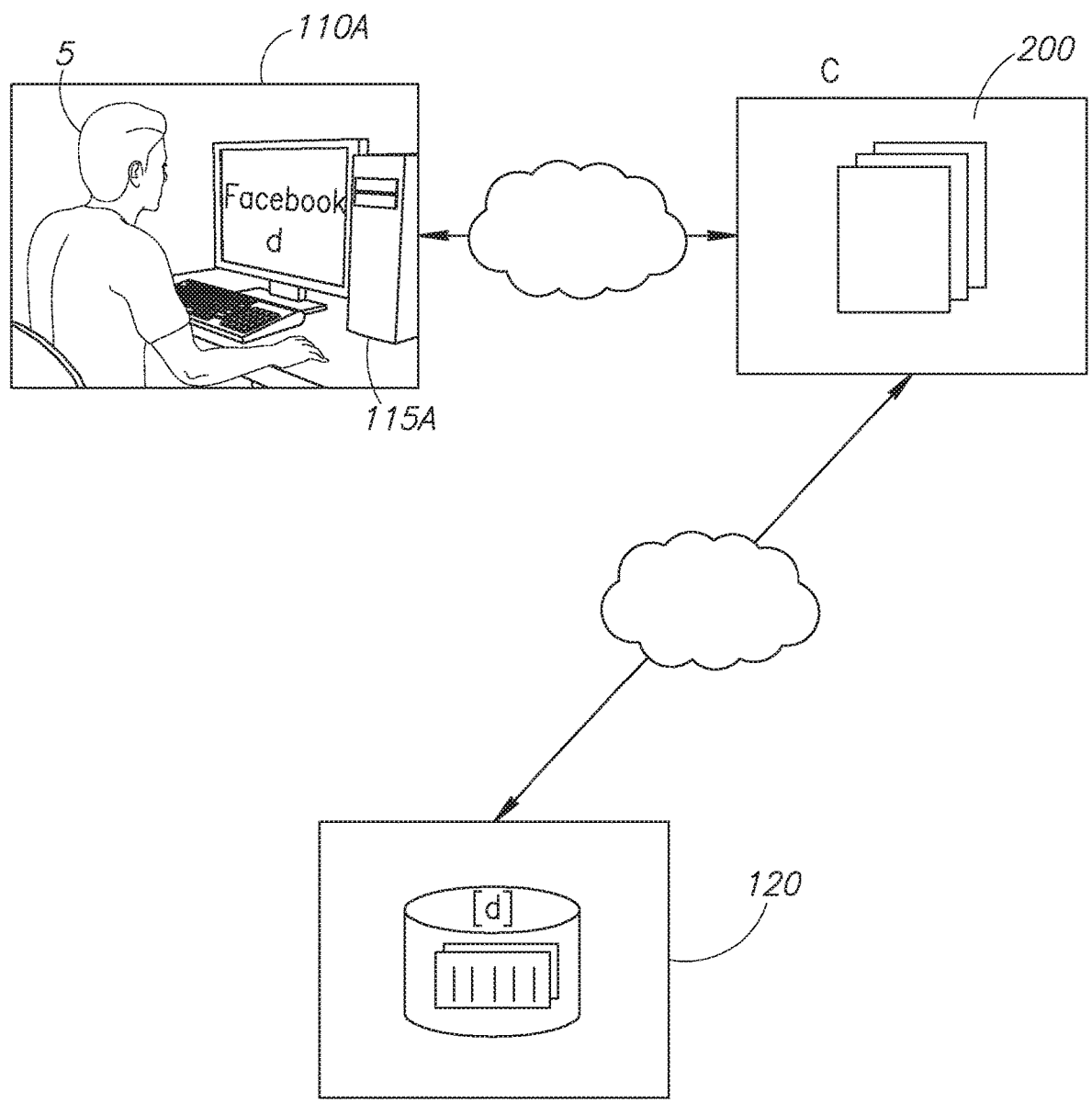

In an alternative embodiment to the present invention, client 110 may be integrated with a larger software system so as to provide a rich media application editing, layout and display services inside the larger software system. This could be through the use of integration technologies (such as Microsoft's ActiveX technology) or by being embedded as a specialized plug-in inside the larger system (for example by integrating the client sub-system as Facebook application). Reference is now made to FIG. 5B which illustrates an end user 5 on personal computer 115A, viewing a social network site (such as Facebook) which is served by the Facebook company servers 200, containing an area [d] containing an application to be edited. In order to edit [d], servers 200 may contact server 120 in order to access developed applications.

Figure 5C:
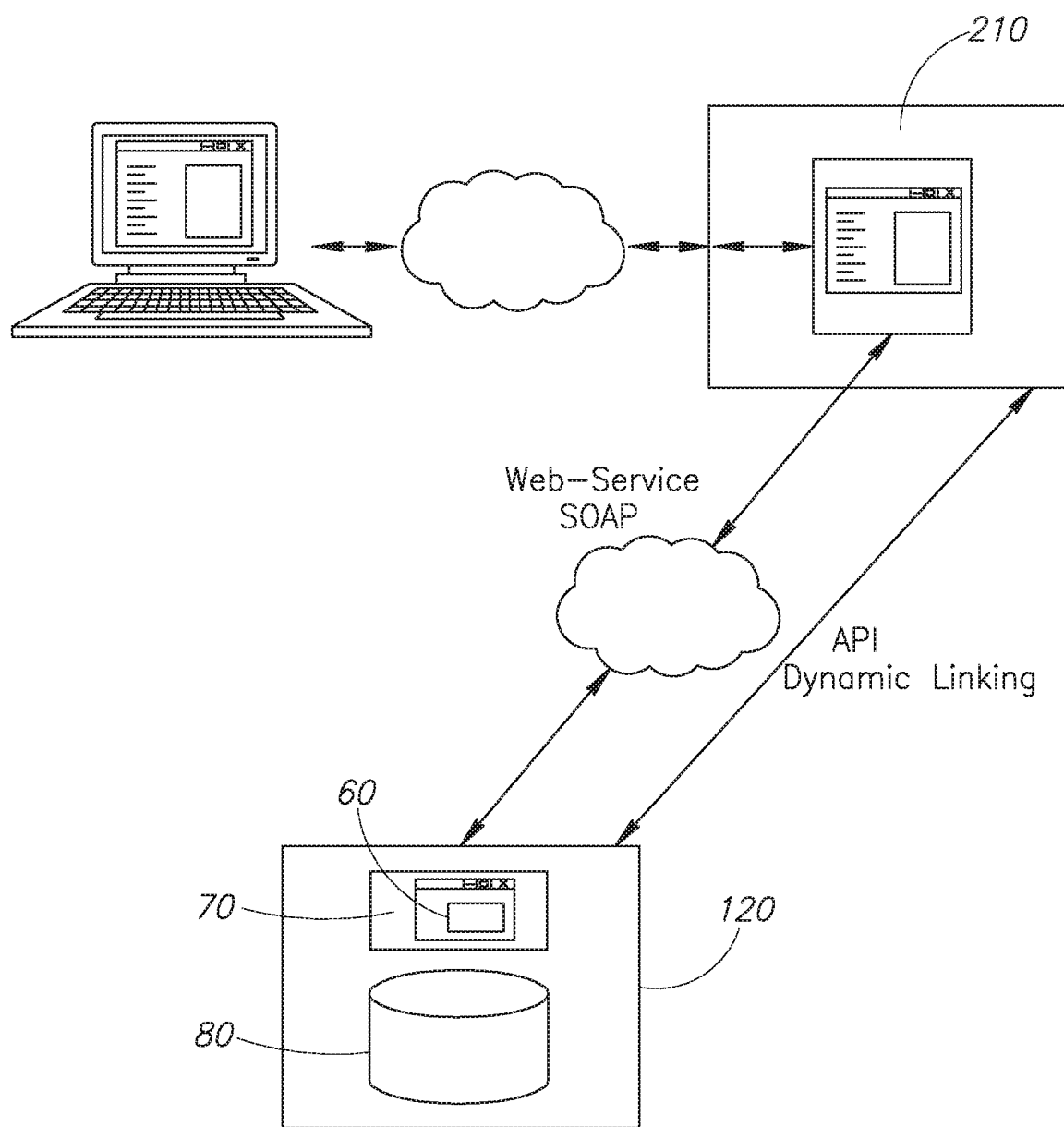

In yet another alternative embodiment to the present invention, client 110 may be integrated with a larger software system which provides its own editing and display user interface. System 100 may be used only as a back-end engine to provide content formatting and layout information, but the actual edit-time and run-time display is performed by the larger software system as is illustrated in FIG. 5C to which reference in now made. This larger system 210 and server 120 may be connected via a direct Application Programming Interface (API), dynamic linking, a web services interface (such as SOAP) or any other program-to-program interface.

It will be appreciated that work may be divided between the client and server components (110 and 120) as required for the specific web site design system (as described herein above) and there may be various embodiments to the combination as is described herein below.

It will also be appreciated that system 100 may also be integrated with the same server infrastructure used to host the pertinent website to end users which use the pertinent web site (and are not involved in its creation). It will also be appreciated that this server does not have to be the same physical server, as such systems typically employ numerous servers in a load-balancing or cloud configuration and these numerous servers may be optimized for specific sub-tasks.

It will be further appreciated that the client-side software does not have to be installed, or otherwise permanently reside on the client computer used by the end user. It may of course be installed on it, but it may also be downloaded on demand, using technologies such as Adobe Flash, browser-based JavaScript or Java.

In accordance with an embodiment of the present invention, system 100 may be built using server assisted dynamic layout. Tasks related to dynamic layout may be performed with the assistance of server 120 which may cooperate with either client 110A or 110B via dynamic layout coordinator 170. The direct actions of the designer or end-user 5 working on the created web site or application may trigger dynamic layout activity. It will be appreciated that such dynamic layout activity may often (but not always) be performed on the client side, so as to provide immediate response to designer or end user editing actions and to avoid network latency during visual editing. However, even for such cases, server 120 support may be required in cases involving very low-power end-user machines and reasonable speed communication links to server 120.

In an alternative embodiment to the present invention, certain events triggering dynamic layout, such as changes resulting from dynamic data or from cooperation with concurrent users, do not require instant feedback, and therefore the required processing may be performed entirely by server 120.

It will also be appreciated that system 100 may create and maintain an internal data structure which contains the full dynamic layout information and is persistent across all editing sessions known as stored dynamic layout information (SDLI). This information may be stored in rules repository 80 which may sit on server 120. A copy of the information may also be stored locally on client 110 in cases where end-user 5 is allowed to modify certain aspects of the application (such as the size and position of certain components). There may be multiple versions of the stored dynamic layout information for the same stored application. This information may include anchor information, anchor creation history and the original position and size for each component affected by the dynamic layout as well as any designer or end-user set parameters. It will be further appreciated that website 60 may provide a suitable interface with the designer and/or end user 5 in order to receive such designer or end-user set parameters.

However, since many events that trigger dynamic layout such as changes resulting from dynamic data or from cooperation with concurrent users, do not require instant feedback, server 120 may entirely perform the required processing itself or may be assisted by server 120.

Figure 6:
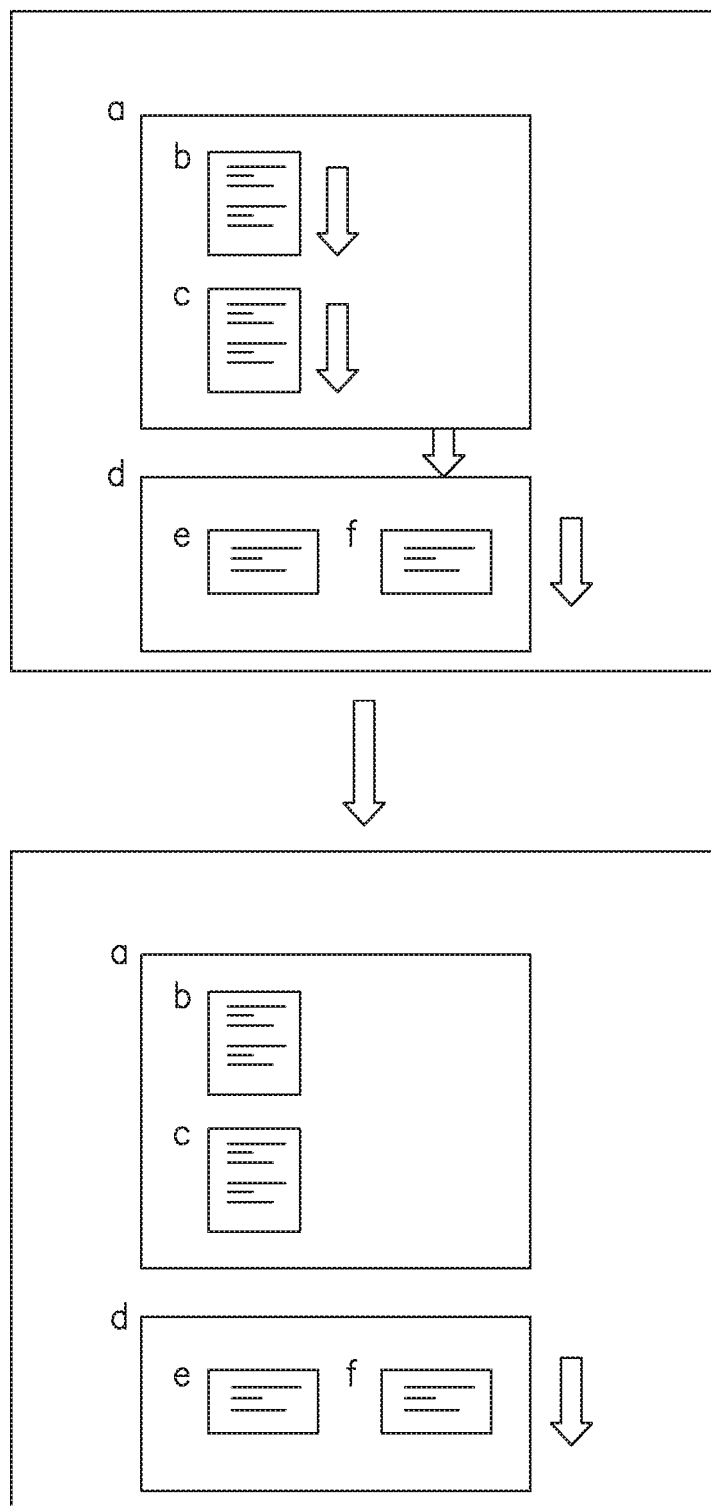
FIG. 6 is a schematic illustration of the use of container components in visual editing.

It will also be appreciated that system 100 may also provide server assisted dynamic layout services both at the component and container levels for different pages of the pertinent visual design system. The container in question may be a full page containing components, or it may be a sub-container inside the page or inside a large container as illustrated in FIG. 6 to which reference is now made. As can be seen, container [a] may contain components [b] and [c] and container [d] may contain components [e] and [f]. When the content of component [b] grows, it pushes down component [c] which expands container [a]. The expanded container [a], in turn, pushes container [d] and thus moves down components [e] and [f]. It will also be appreciated that component-level server assisted dynamic layout may be used to present modified versions of a specific component and that container-level server assisted dynamic layout may be used to calculate the modified layout of components inside a container or container set.

It will also be appreciated that component-level server assisted dynamic layout may include the actions needed to present modified versions of a specific component. The code implementing components in website 60 may run on the client-side software, such as the above mentioned iOS application or a browser based application. Alternatively, the code does not have to reside on the client-side system but may still run on it (i.e. through dynamic downloading); it may also be completely server-side in cases where the system is completely server based and uses a very low CPU-power client. Certain elements may have a matching server-side element that implements some of the processing-intensive tasks related to dynamic layout.

Container-level server assisted dynamic layout may include an actual calculation of layout based on the properties of the collection of components which reside inside a single container, the calculation is not related to a single component but to the interaction between the set of components and the area in which they reside.

It will also be appreciated that server assisted dynamic layout may be performed by system 100 at a number of stages during the application editing process: System 100 may perform them fully on-line whenever a page is accessed by client 110 or even while the page is being viewed, whenever a new version of a given page or when the completed application is saved or published. System 100 may also perform server assisted dynamic layout in parallel to regular system functioning, based on collected information and usage patterns gathered from tracking actual application use, and not as a response to a given page access or modification. This could be done, for example, during times of lower system load.

Figure 7:
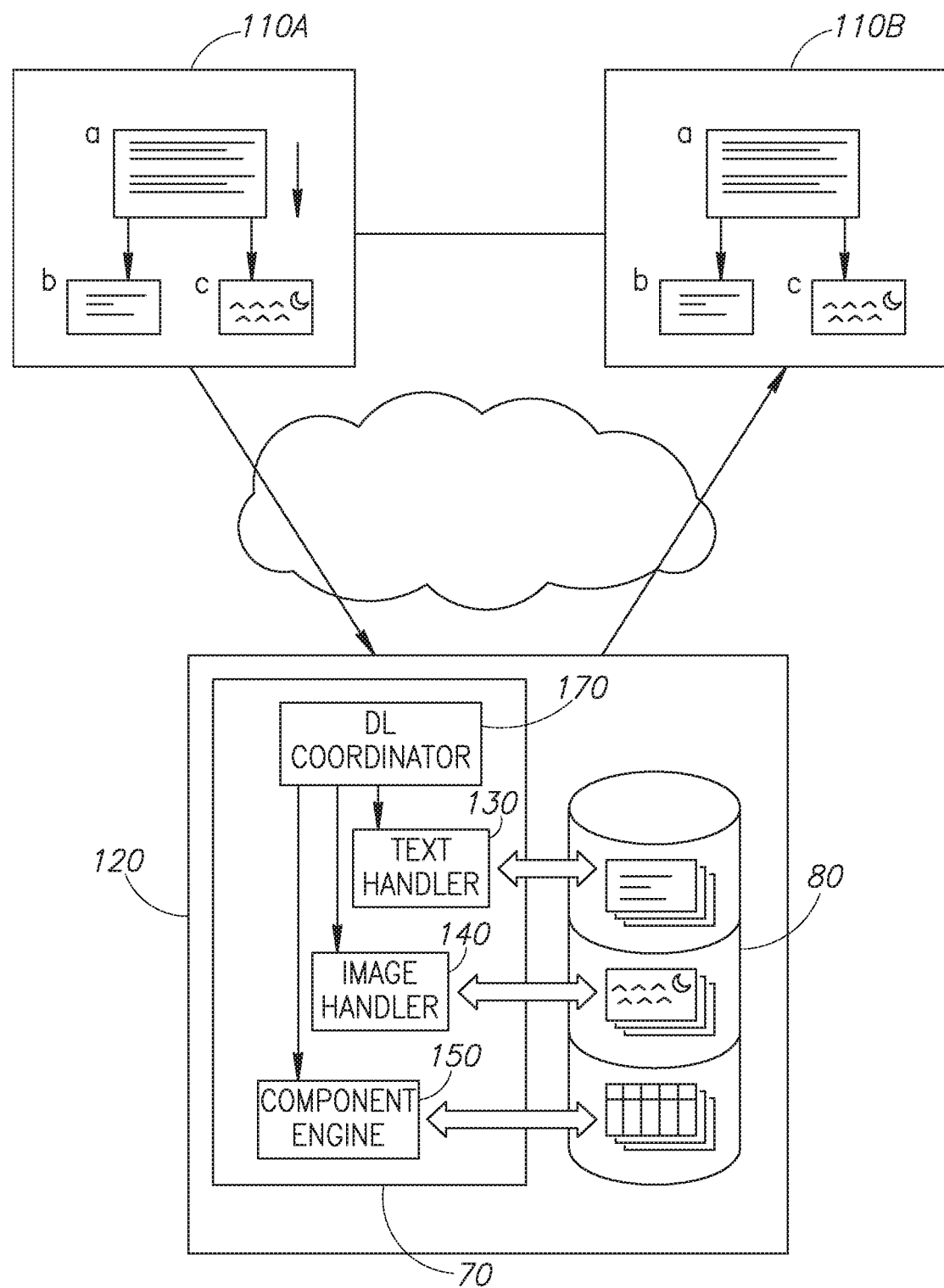
FIG. 7 is a schematic illustration use of server-assisted dynamic layout, constructed and operative in accordance with the present invention.

Reference is now made to FIG. 7 which illustrates 2 clients 110A (editing client) and 110B (viewing client) connected to server 120 and both showing the same content. If the content of component [a] on client 110A is modified, it may cause component [a] to expand down. This may require components [b] and [c] in turn to shrink. Component [b] contains text which may have to be reformatted, and component [c] contains an image which may have to be shrunk. In this example, system 100 may offload the component resizing to server 120. Dynamic layout performed on client 110A may generate requests for different versions of specific components having different sizes. Server 120 may in turn generate resized (and possibly reformatted) versions of the components' content, a task which may be performed differently for each component type.

As mentioned herein above, dynamic layout editor 70 may comprise dynamic layout coordinator 170 which may comprise a text handler 130, an image handler 140 and a component engine 150. It will be appreciated that for text-based components, text handler 130 may handle different fonts, font sizes and text reformatting. For image-based components, image handler 140 may adjust the scaling of the image to a different size or possibly change the amount of details in vector-based images (such as maps). Similar changes may apply to other media types (such as video) as well. For complex components (such as a store front component), an actual change in the structure of the components, including removing or adding graphical user interface elements for the specific component may be dealt with using component engine 150.

It will be further appreciated that the above mentioned operations may typically be performed on-line, with server 120 responding to specific client (110A and 110B) requests. However, server 120 may also cache requests, so the processing done for client 110A using a specific screen size would be immediately useable for additional users of the same application which deploy it on a system of similar size such as client 110B. These cached versions of the components may be stored (taking images for example) using a data structure such as an image pyramid or mipmaps.

It will also be appreciated that the design environment of system 100 may use absolute positioning to provide a high quality website layout (in both the editor 110A and viewer 110B clients) to support automatically generated changes to the designer-defined layout. It may also integrate dynamic layout management as well as dynamic content separate from the design information. Dynamic layout editor 70 may be integrated with both the editing and the viewer components (110A and 110B), so the same dynamic layout rules can be applied to changes in website 60 resulting from explicit design actions (by the site designer), as well as to changes in the web site resulting from changes in the dynamic information included in website 60. These dynamic layout rules are discussed in further detail herein below.

It will be appreciated that there may be different embodiments to system 100 regarding the server 120/client (110A and 110B) relationship when dynamic layout processing. is performed. Some of these embodiments are described herein below. In most of these cases, server 120 may modify the stored dynamic layout information data stored on it. This could be the stored dynamic layout information of currently un-displayed pages (which would be loaded when required), or that of currently displayed pages (which would be synchronized with the client-side version of the same information).

Target-specific dynamic layout processing. As discussed hereinabove, system 100 may have clients 110 of multiple types accessing the same application. Clients 110 may have different characteristics, and may employ completely different technologies for the display of the application. Clients 110 may further have different screen sizes and geometries used for display. In order to overcome these obstacles, the application in question must be adapted to each of the different display platforms and display screen geometries. In existing systems known in the art, there are two major approaches to this problem of adaptation. One approach is editor-side adaptation—editor client 110A creates multiple versions of the application each time the application is saved, or alternatively when the application is finally published and loaded into a server for access by the viewing clients. Another approach is viewer-side adaptation—editor client 110A saves the application in a generic format (be it a database format, a collection of HTML or XML files or some other method) on server 120. Each viewer client 110B then performs the required adaptation of the application to his own platform and parameters.

It will be appreciated that when system 100 implements dynamic layout, there may be a substantial amount of work involved in the retargeting of the designed screen for all supported target platforms and screen geometries. This may involve position recalculation, re-rendering of text, resizing of images and other activities. It will further be appreciated that for dynamic layout triggered by content editing in editor client 110A, there is no problem, as the dynamic layout is calculated during editing and before the point in which the application is saved and/or published. In such a case, editor-side adaptation would be sufficient. However, for dynamic layout triggered from other sources (such as dynamic data or collaboration), dynamic layout is triggered during application viewing and cannot be pre-calculated by the editing client 110A.

Figure 8:
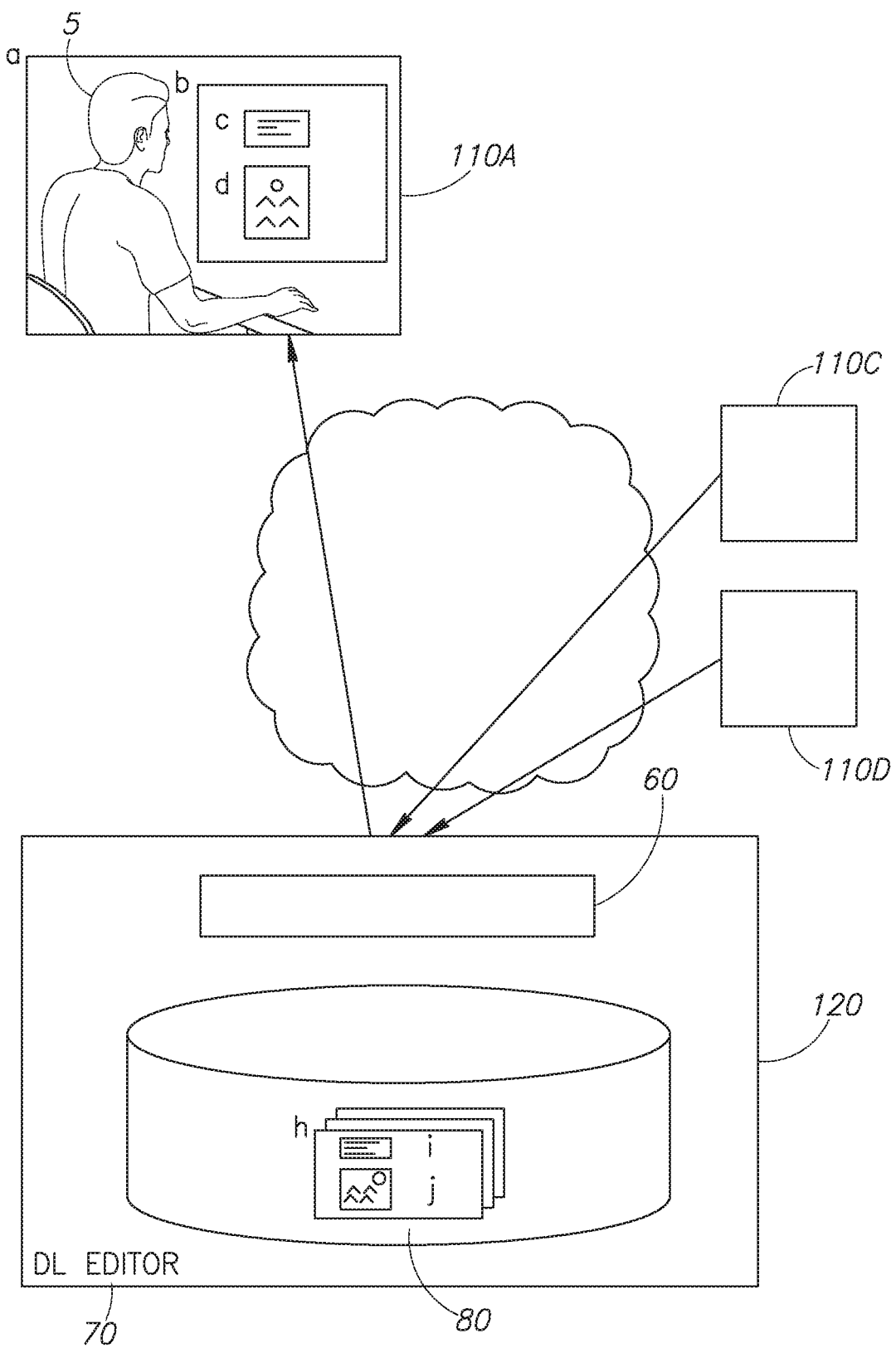
FIG. 8 is a schematic illustration of the use of server-assisted dynamic layout together with dynamic data, constructed and operative in accordance with the present invention.

In accordance with an embodiment of the present invention, the processing required for dynamic layout related to multiple target platforms and multiple screen geometries may be performed by server 120. Reference is now made to FIG. 8 which illustrates end-user 5 working on client 110A and who is viewing application screen b containing components [c] and [d]. It will be appreciated that client 110A may receive screen [b] via server 120 which is running website 60 and holding repository 80 integrated with dynamic layout editor 70. It will also be appreciated that repository 80 may contain the various pages of the application being viewed, which in turn may contain the full data [i] and [j] for the multiple instances of the components [c] and [d]. Event receiver 125 may receive updates from client 110C which may affect the content of the instances of the component [i]. Event receiver 125 may also receive updates from another client system 110D which may modify the contents of the instances of the component [j]. Dynamic layout editor 70 may then perform the required dynamic layout changes on the instances in repository 80 as required.

It will be appreciated that this method of operation may decrease the workload on client 110A, which may receive a version of website 60 already adapted to the specific client, and would not be required to reformat it. In addition, the work is performed once per target platform, and is not performed repeatedly by numerous clients 110 accessing the application. It will be appreciated that in the way, server 120 may perform the entire dynamic layout work or may partially perform some of the time consuming leaving part of the work for client 110A to perform.

Un-displayed area processing. It will be appreciated that when end-users 5 (using both editing and viewing clients) browse an application, a single specific application page is typically displayed at any given time. There are numerous sections of the application which are not displayed at any given moment, including (but not limited to) the following: pages other than the current page; hidden areas in the current page, such as occluded areas or off-screen area (to which end-user 5 may scroll or switch) and application pop-up graphical user interface elements which are not displayed currently.

It will be also appreciated that even though these areas are not visible at any given time, they may still require dynamic layout changes. This could be due to changes to the application resulting from external sources (such as dynamic data and collaborative authoring). This could also be, for example, due to designer or viewer initiated changes which affect off-screen areas, e.g. changes to component which are visible from a number of screens (such as a large e-Store object which is visible from multiple screens in the application). These areas may be disjointed dynamic-layout wise—from the currently displayed areas, e.g. separate application pages which do not interact with the currently displayed page. They could be, however, areas which would interact with the currently displayed area when they would be displayed, e.g. the un-displayed areas of components which may provide additional information on demand. In the latter case, server 120 may pre-process alternative layout information for the page based on the case in which the additional information would be displayed.

Figure 9:
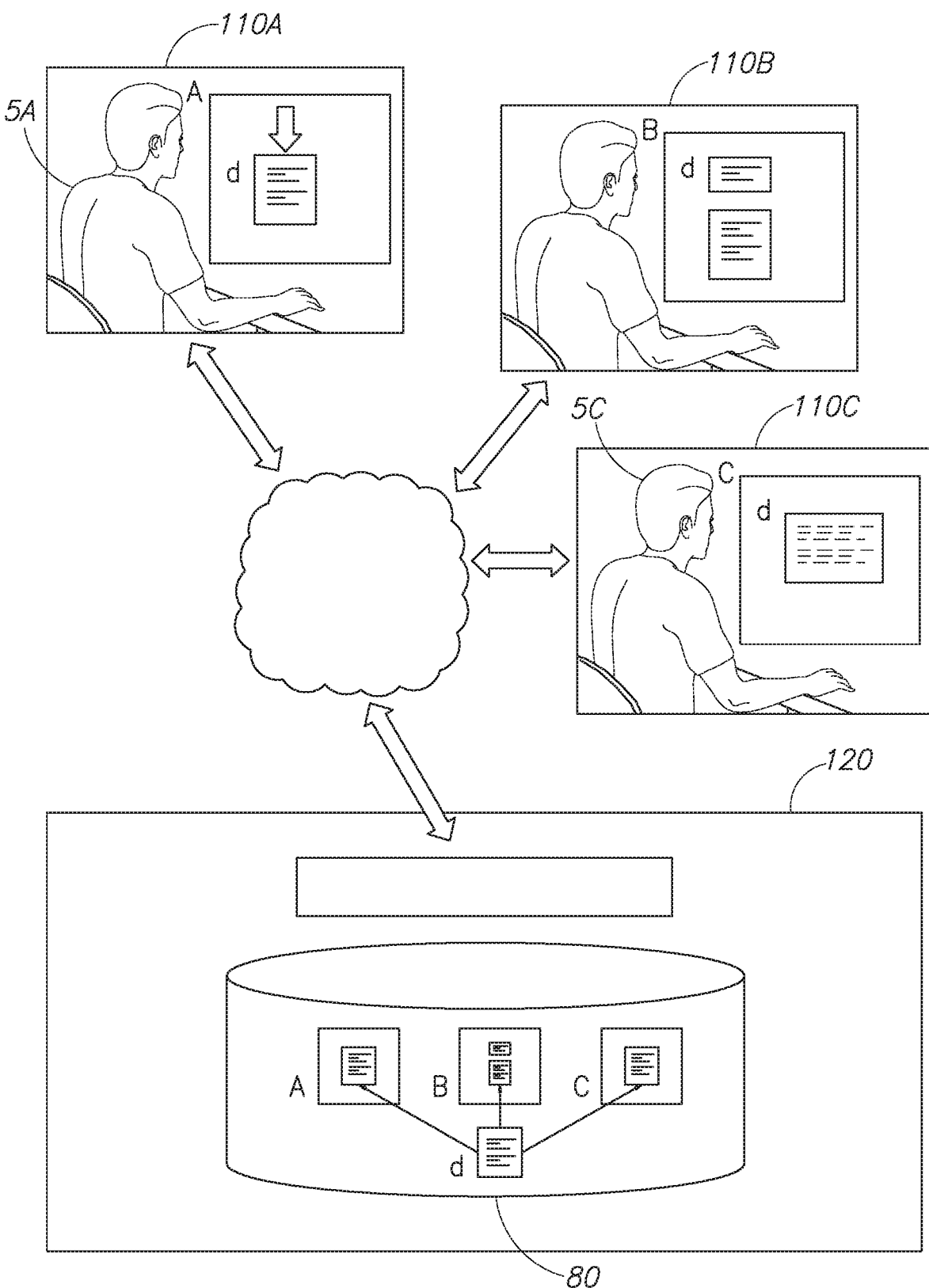
FIG. 9 is a schematic illustration of the use of server-assisted dynamic layout together with collaborative authoring, constructed and operative in accordance with the present invention.

It will be appreciated that in all of these cases, the dynamic layout processing for the non-displayed areas may be performed by server 120 without affecting the interactivity or response speed of system 100. An example of this is a system in accordance with an embodiment of the present invention which supports full collaboration between users, so that concurrent editing is possible. Reference is now made to FIG. 9 which illustrates an application containing pages A, B and C. Only page A is displayed on client 110A and viewed by user 5A. However, changes in layout made by another user 5B may affect the layout of page B. Also, changes to the content of the text component [d] which is visible on page A as well as pages B and C may require dynamic layout changes in all pages A, B and C. Client 110A may perform dynamic layout changes to page A in order to provide an immediate and interactive response. Server 120 may also repeat the changes to page A and may also perform the same (or equivalent) changes on pages B and C so that the updated version of page B may be displayed to user 5B who is viewing page B of the application on client 110B concurrently with user 5A. The required changes may be somewhat different between pages A, B and C since each page may have specific constraints affecting the dynamic layout process.

Sites sharing single design but multiple data. An alternative embodiment to the present invention may employ the single design/multiple data (SDMD) model of application specification. In this model a single common design template is used by multiple applications having different content data. The template specifies the general structure of the fields, their interaction (e.g. pressing a button X will link to screen Y) and the content for some fields. Each of the multiple data instances of the application has its own set of field values and content. One example could be an electronic catalog application, in which the template would contain the layout and definition of the catalog, and the actual catalog item data (text, images etc.) would be part of each application using this catalog template.

It will be appreciated that each of the separate catalog applications based on the same catalog template may require dynamic layout processing due to different data content. Furthermore, such an application may be built on-line (by a designer who provides the component content through the on-line editor) or off-line (by automatically generating a new catalog application using the catalog template and data imported from external data sources).

Figure 10:
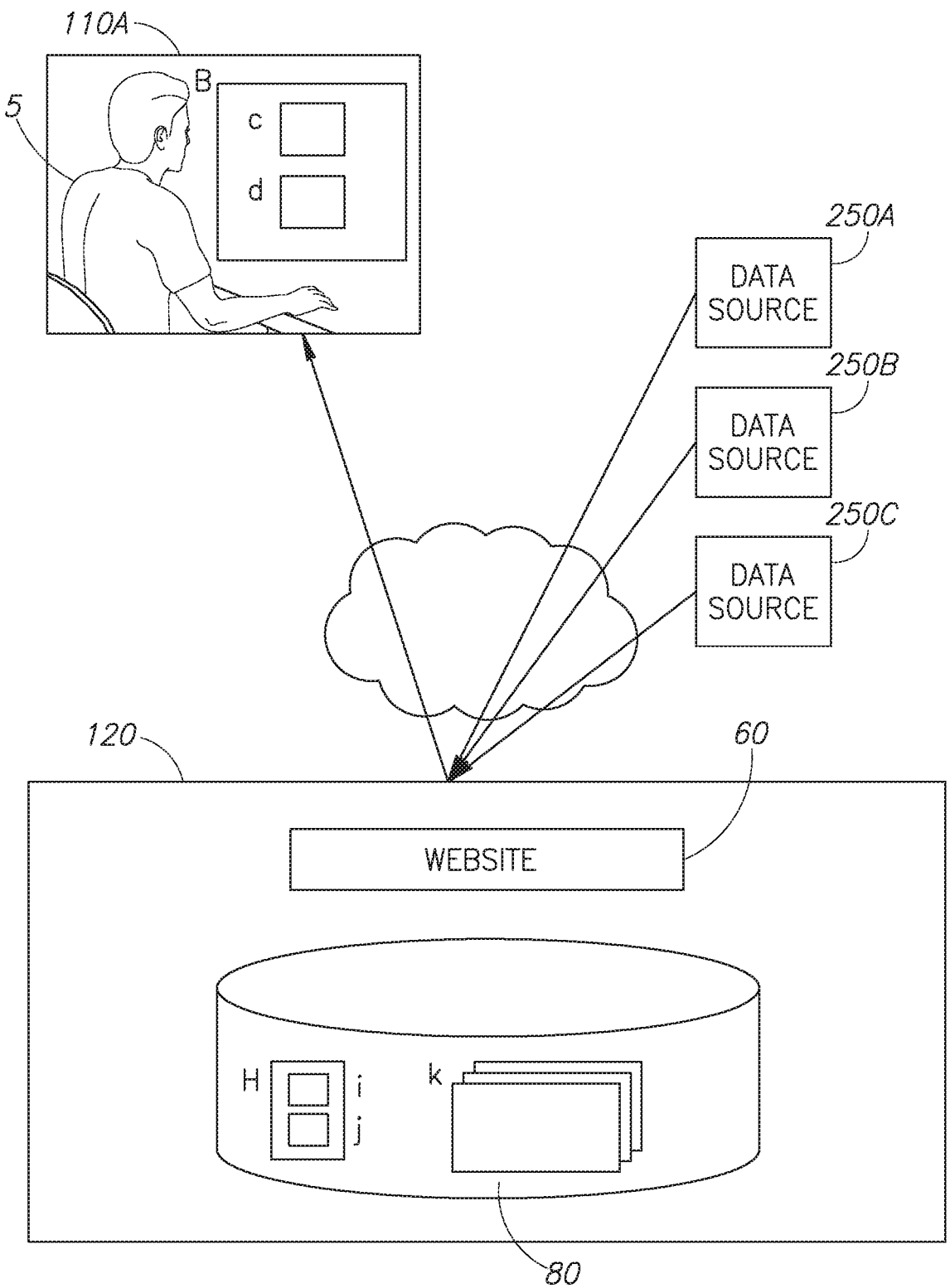
FIG. 10 is a schematic illustration of the use of server-assisted dynamic layout together with imported data, constructed and operative in accordance with the present invention.

It will also be appreciated that server assisted dynamic layout is especially helpful for applications which are built using imported data (i.e. off-line), otherwise known as external data applications. These applications require dynamic layout in order to handle the changes in the screen layout caused by the imported data. In systems which implement server assisted dynamic layout, processing the dynamic layout changes triggered by external data changes may be performed before pages are loaded by the client. In accordance with an embodiment of the present invention, server 120 may implement dynamic layout processing without requiring client-side processing. Reference is now made to FIG. 10 which illustrates end-user 5 working on client system 110A and who is viewing application screen B which contains the components [c] and [d] that reflect imported data in the single design/multiple data scenario. Client 110A may receive screen B from server 120. Repository 80 may contain the design and layout information H for screen B as well as the design and layout information [i] and [j] for components [c] and [d]. It will be appreciated that the actual data is stored in repository 80 for multiple instances of the application, together with specific layout information for each instance of the application, such layout being affected by the actual data being imported into instances of [i] and [j]

from the data sources 250A, 250B and 250C. Dynamic layout editor 70 may perform the required dynamic layout changes on the instances in repository 80 as required.

Dynamic data aggregation and limiting. Certain applications may contain components that reflect external data, and this data may change rapidly (e.g. stock rate information or news-wire item display). This in turn would cause rapid changes to the displayed application and require rapid reactivation of the dynamic layout mechanism.

Figure 11:
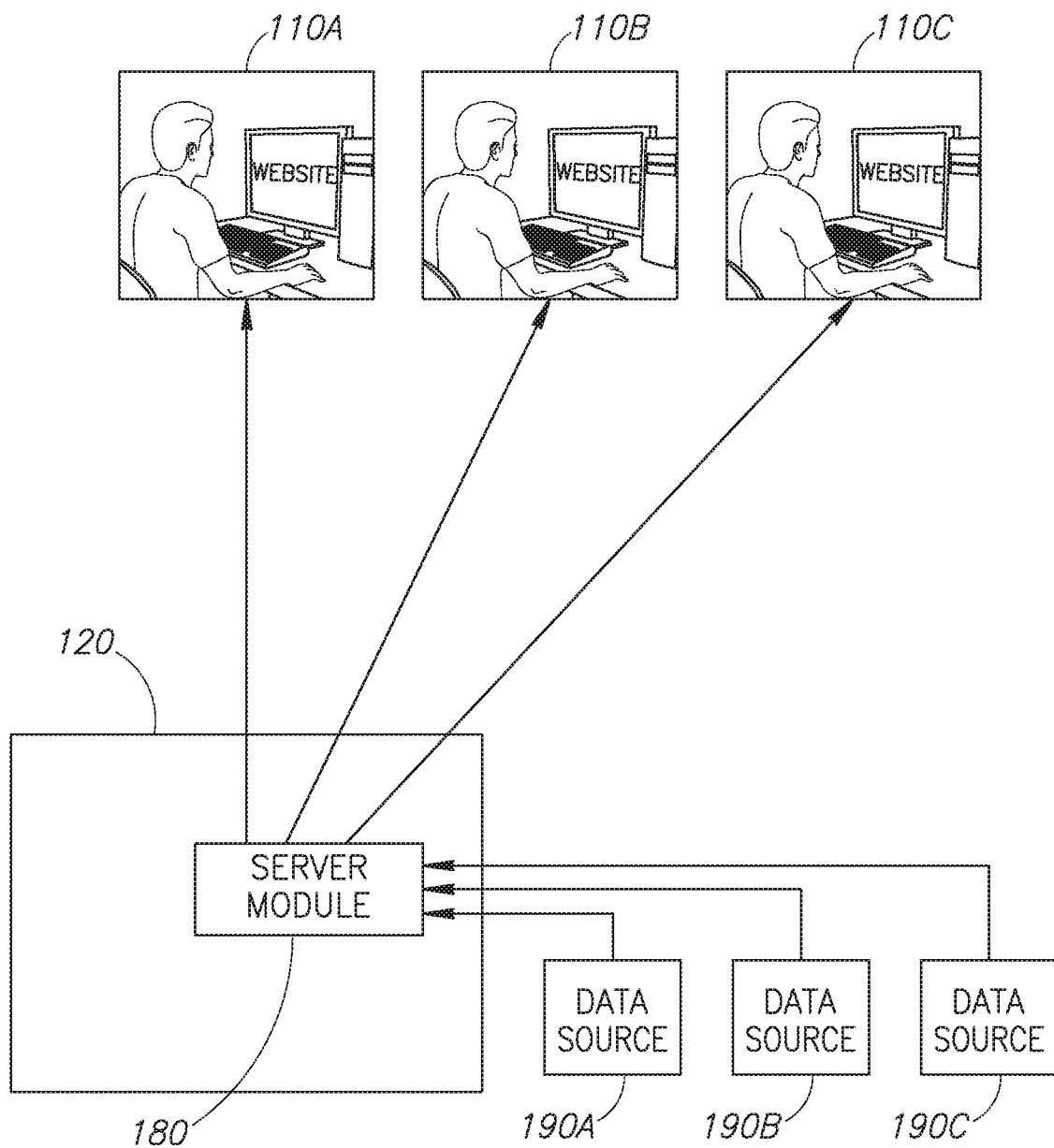
FIG. 11 is a schematic illustration of the use of server-assisted dynamic layout together with data aggregation, constructed and operative in accordance with the present invention.

As opposed to the prior art where each client has to connect to each individual data sources separately, in an alternative embodiment to the present invention, server 120 may provide an aggregation service, so that each client 110 may connect to a server module 180 which may receive updates from the data sources 190A, 190B and 190C as is illustrated in FIG. 11 to which reference is now made. Dynamic layout coordinator 170 may then coordinate the required update to the dynamic layout of the application accordingly. It will be appreciated that such data aggregation may be particularly useful when used in conjunction with collaborative authoring. Server module 180 may combine the updates arriving from multiple designers in order to provide a single update version which will refresh the displayed page layout for all concurrent designers. This way, collaborative authoring and the resulting dynamic layout changes required by it may require a one-to-many communication instead of a many-to-many communication between the participating designers.

Furthermore, server module 180 may provide update limiting. Clients 110A, 110B and 110C connected to server 120 may have different capabilities, processing power and communication bandwidth. In an alternative embodiment to the present invention, data server component 180 may filter the information updates going out to the clients 110A, 110B and 110C accordingly. For example, client 110A with low processing power or narrow communication bandwidth may receive only some of the changes and not all of them when the change in frequency is too high. This way the low processing power/narrow bandwidth clients 110 may keep up with the rest of the system.

It will be appreciated that in order to implement system 100 to aid dynamic layout, certain dynamic layout rules must be applied. Each dynamic layout rule may describe a situation in which a change to an element of the designed application may affect another element within the same designed application. Such an element may be a component, a container or the content of a given component. It will be further appreciated that the relationship between the affecting element A and the affected element B may be automatic or explicit, using automatic or explicit anchoring. The effect on the affected element B may be that of moving it or resizing it or (in some cases) both. For the sake of clarity, each triggering of a dynamic layout rule, in which changes to an element A may affect element B may be known as a dynamic layout event. It will also be appreciated that the dynamic layout concepts and rules as described in more detail herein below may also be implemented locally on a client 110 without server 120. It will be further appreciated that system 100 may employ a plurality of dynamic layout rules having a plurality of attributes and parameters (described in more detail herein below). It will be further appreciated that the dynamic layout rules may form part of the stored dynamic layout information and may be stored in data repository 80.

There may be multiple cases for dynamic layout events as discussed hereinabove such as user and system initiated layout display, use of multiple target platforms, differences in user screen size, dynamic data etc. It will be appreciated that some of these events may be local and focus on a single given component. Other events may be global and may generate multiple dynamic layout events which must be handled together in order to derive a new layout. For example, a change in display screen size such as opening the application on a smaller screen may require a dynamic layout change to all the components on the screen.

Figure 12A:
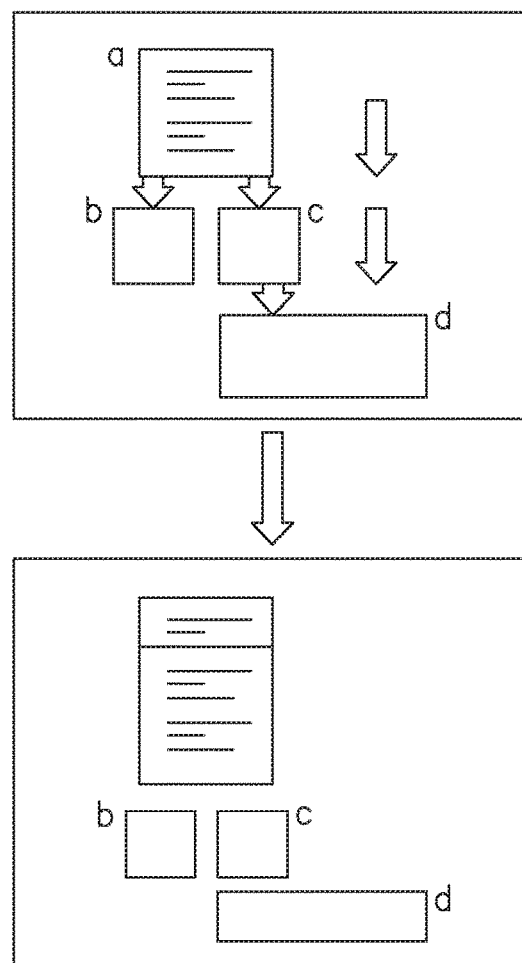
FIG. 12A is a schematic illustration of a dynamic layout event that triggers multiple additional dynamic layout events, constructed and operative in accordance with the present invention.
Figure 12B:
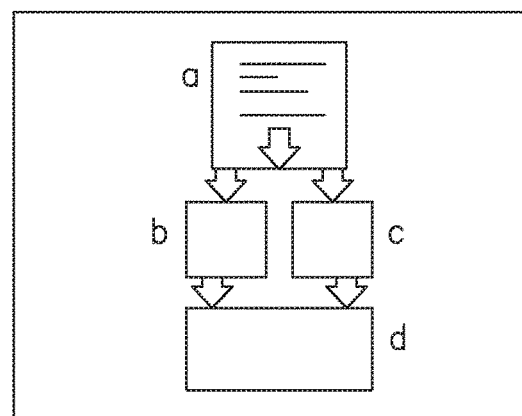
FIG. 12B is a schematic illustration of multiple dynamic layout events merged into a single dynamic layout event, constructed and operative in accordance with the present invention.

It will also be appreciated that dynamic layout events can be staggered so that the execution of one event may trigger another. Reference is now made to FIG. 12A which illustrates such a staggered execution. As can be seen, component [a] may expanded due to a content change. This expansion may cause components [b] and [c] to move down which in turn may cause component [d] to shrink. Dynamic layout events may also be merged. Reference is now made to FIG. 12B which illustrates such a merge. Component [a] expands downwards pushing components [b] and [c] which in turn push component [d]. It will be appreciated that the dynamic layout events that are created by the movement of components [b] and [c] may be merged into a single event since both components [b] and [c] push component [d] equally the same amount in the same direction.

It will be further appreciated that the rules and examples provided hereinabove and herein below for the sake of clarity, are detailed in terms of vertical movement of components in the downward direction. This direction is known as the primary direction of the dynamic layout process. It will further be appreciated that dynamic layout may be facilitated in all directions (up, down, left and right). Each container or page may specify the direction in which their components may move. For example, a header on a page may require a more rigid layout, permitting expansion in the downward direction only, whereas content areas below the header may require less rigidity in design and may allow dynamic layout in different directions. It will also be appreciated that a combination of directions may also be implemented. These attributes may be set by the designer or end user 5 for each component or container. Components may be marked to grow, shrink or move independently in any of the four directions. The lower edge may move downwards, for example, without affecting the other three edges.

Figure 13A:
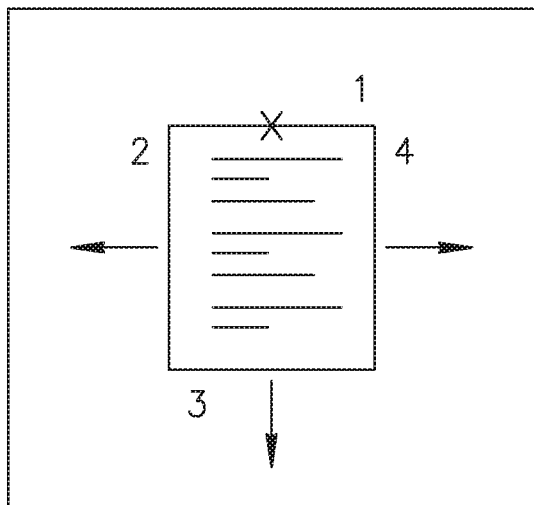
FIGS. 13A, 13B and 13C are schematic illustrations of component edge locking, constructed and operative in accordance with the present invention.
Figure 13B:
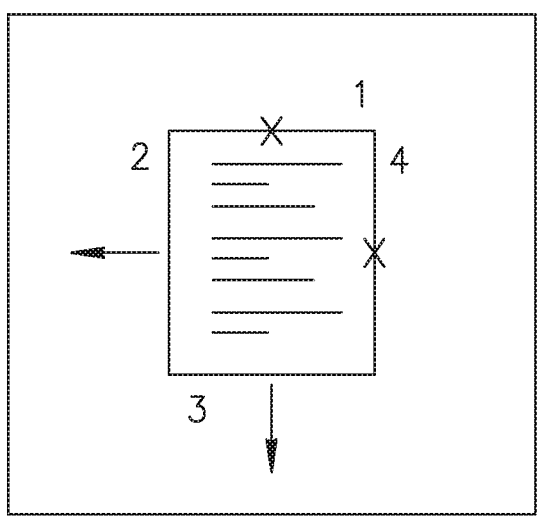
Figure 13C:
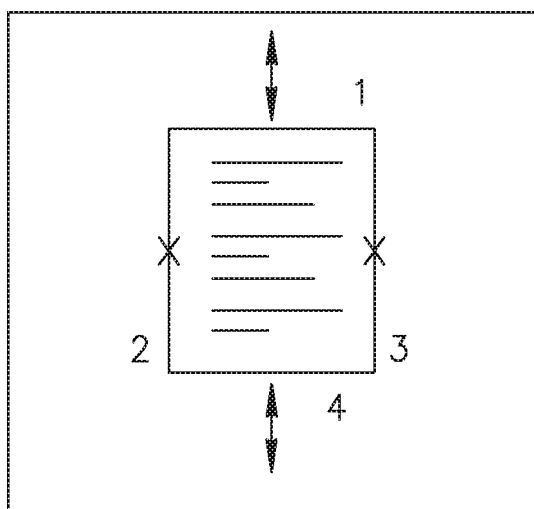

It will be further appreciated that each of the four edges of a component (or a combination of them) may be locked. A locked edge is explicitly anchored to the closest edge of the container containing the pertinent component as is illustrated in FIG. 13A to which reference is now made. Side 1 may be locked allowing the component to grow and move left, right and/or down. Reference is now made to FIG. 13B which illustrates the same component as FIG. 13A but with sides 1 and 4 locked. In this scenario the component may only expand (or shrink down) to the left, but cannot move. If two parallel edges are locked such as edges 2 and 3 as is illustrated in FIG. 13C, to which reference is now made, the component may still move in the other two directions, i.e. in this case up and down, and may also expand or shrink both up and down.

Each of the four corners of the component may also be locked. This is essentially a shortcut specifying that the two edges which meet at the given corner are edge locked.

Figure 14A:
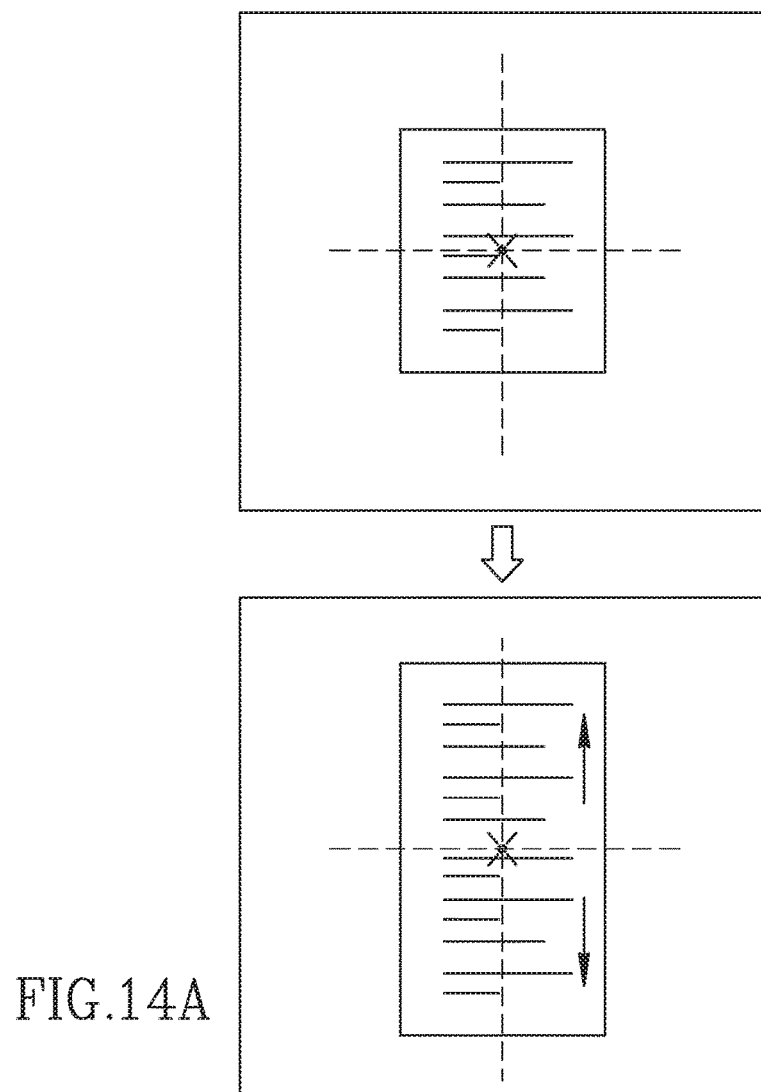
Figure 14B:
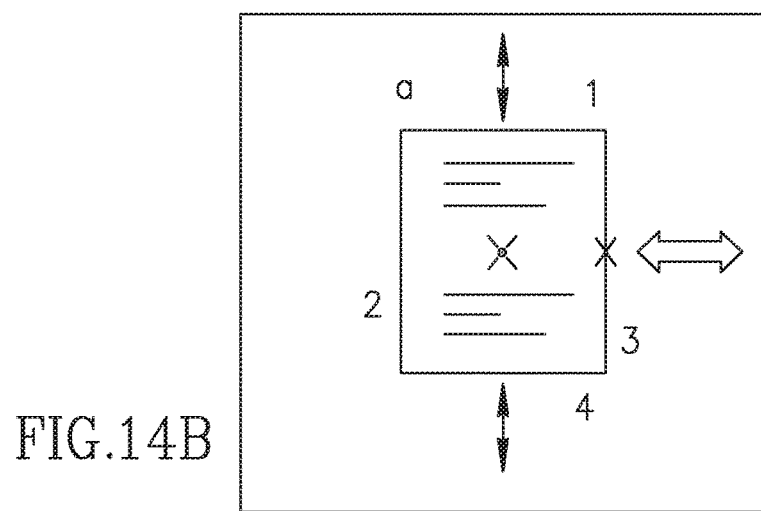

It will be further appreciated that the center of a component may also be locked as is illustrated in FIG. 14A to which reference is now made. In this scenario, changes to the component must leave the center in the same position; therefore, the component may not be moved and may only expand/shrink. A combination of edge locking and center locking may also be implemented as is illustrated in FIG.

14B to which reference is now made. In this scenario the center of component [a] is locked, as is edge 3. Since both are locked, edge 2 (in parallel with edge 3) is also automatically locked. Component [a] may not move, but may expand/shrink by moving edges 1 and 4.

Components may also be marked with a "preserve aspect ratio" i.e. their existing aspect ratio, the proportion between their height and width cannot be changed. If no edge or center locking is specified, the lock is by default the top left hand corner of the component. In this scenario, as is illustrated in FIG. 14C to which reference is now made, if edge 4 has to move downwards to compensate a content change due to a dynamic layout event, edge 3 would automatically move right in order to preserve the existing aspect ratio of the component. If however, the top right hand corner has been locked (as illustrated in FIG. 14D), edge 3 would remain in the same position and edge 2 would move to preserve the ratio with edge 4.

As has been discussed hereinabove, dynamic layout events and rules may typically cause components to change their size and position compared to their original size and position as specified by the designer of the system. It will be appreciated that when the trigger that caused the dynamic layout event is reversed (fully or partially), the changes to the affected component may also be reversed. It will be appreciated that the extent to which the layout change may be reversed is limited in that the affected component cannot move beyond its original position or size. This original size notion is applicable to both expanding and shrinking components. It will also be appreciated, that if a component has been modified due to automatic layout, and the designer makes a further explicit change to that component that affects its size, the new size becomes the new "original size" also known as original size reset. However, if the designer makes changes to the component that do not affect component size (such as changes to display properties), the original size is preserved by the system. The original size concept also may be applied to position changes. If a designer moves a component manually, the preserved original position will be set to the new value. This is also known as an original position reset.

It will be further appreciated (as discussed briefly hereinabove) that dynamic layout rules may include a combination of anchors created explicitly, automatically or semi-automatically. An anchor may be created between one or more components and/or framework elements such as a screen boundary. The given edge of a component may be locked with an edge of a different component or a framework element. A set of interconnected edges may be known as an anchor set. A designer may add or remove edges to an anchor set at will. There may typically be multiple anchors active at any one time and thus multiple anchor sets.

Figure 15:
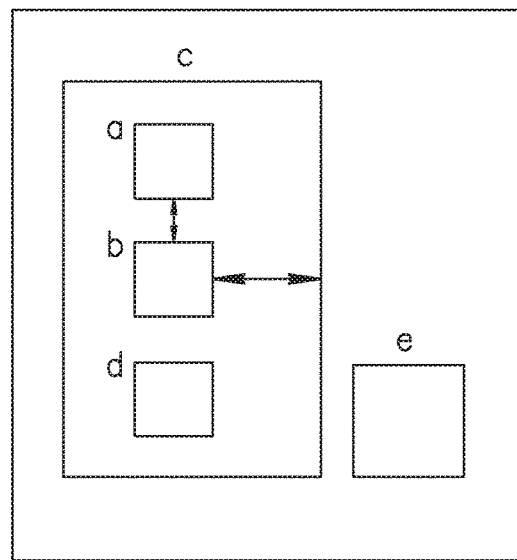
FIG. 15 is a schematic illustration of the interaction between anchors and containers; constructed and operative in accordance with the present invention.

Explicit anchoring may be performed by the designer using a pertinent user interface. The designer may create the specific anchoring between parallel edges and/or framework elements by selecting these edges and specifying that an anchor is to be created between them. It will be appreciated, that anchors are always created between components located inside the same container (or page). Reference is now made to FIG. 15 which illustrates such an arrangement. Components [a] and [b] which are situated within container c may be anchored to each other, components [d] and [e] which are not situated within the same container, may not. Explicit anchors are permanent until removed by the designer. It will be appreciated, that anchors are always created between components located inside the same container (or page), thus when explicitly anchored components are modified (moved, resized etc.), the explicit link remains. It will also be appreciated that explicit anchors may also be suspended so that the anchor remains in existence but does not trigger a dynamic layout event while suspended. It will also be appreciated that such anchors may be 'broken' such as by moving the pertinent component in or out of a container or by moving the component a distance which is further than a set limit.

Figure 16:
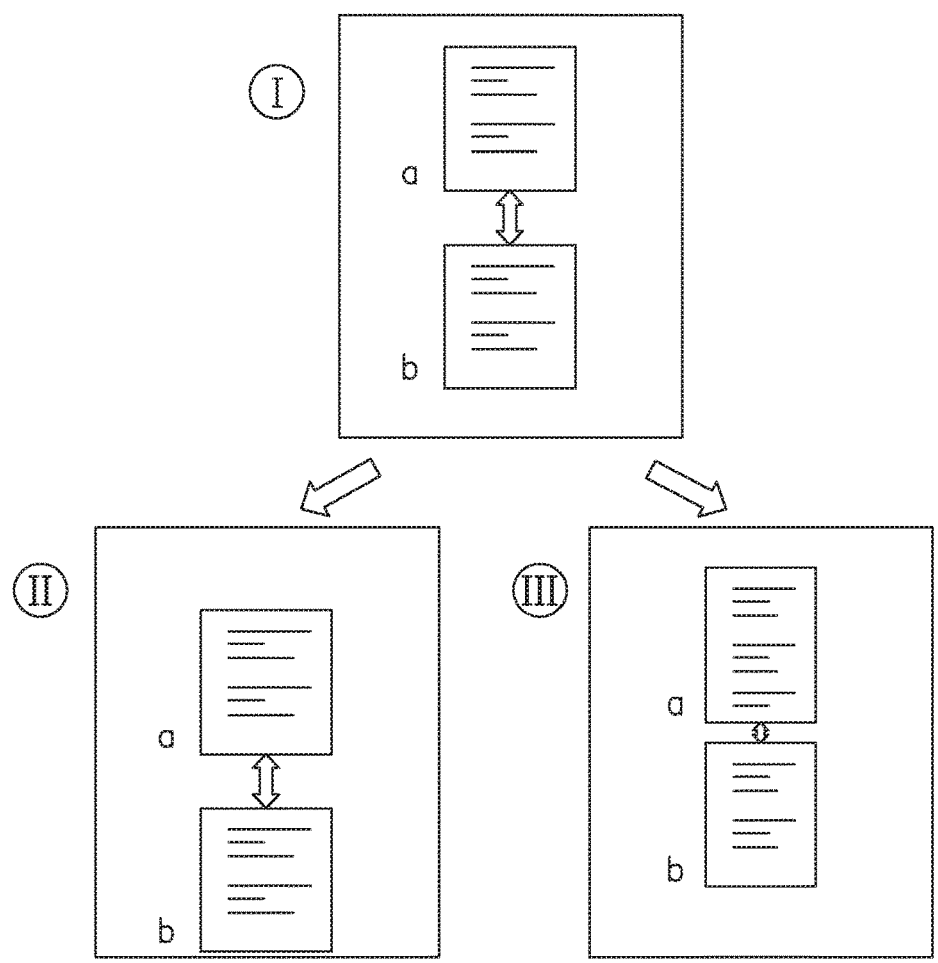
FIG. 16 is a schematic illustration of the differences between firm and flexible anchors, constructed and operative in accordance with the present invention.

Anchors may be firm or flexible. In a firm anchor, the relative distance between linked edges are preserved whenever possible. In a flexible anchor, the distance may have a minimal and maximal relative distance. Reference is now made to FIG. 16 which illustrates firm vs. flexible anchoring. In scenario I, the bottom edge of component [a] is anchored to the top edge of component [b]. If the anchor is firm (scenario II) and component [a] needs to expand downwards, component [b] would also move downwards to preserve the distance between [a] and [b]. If the anchor is flexible (scenario III), component [a] may expand downwards until the minimal distance allowed for the anchor is reached, and only then component [b] would start moving down. An alternative mode of operation for flexible anchors would move component [b] down immediately but would stop when it hits the bottom of the page. In this scenario, component [a] would continue expanding downwards until the minimal distance for the anchor is reached. It will be appreciated that the properties for minimal and maximal relative distance may be set by the designer at the design stage.

Figure 17A:
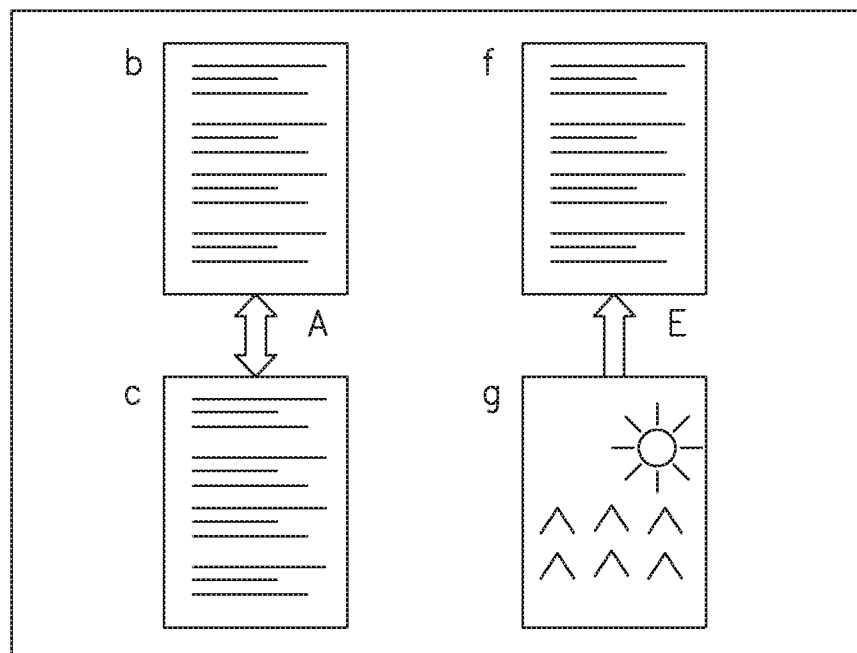
FIGS. 17A and 17B are schematic illustrations of unidirectional vs. bidirectional anchoring and two way anchoring, constructed and operative in accordance with the present invention.

It will be further appreciated that explicit anchors are typically bidirectional so that a change in one anchored component edge can affect the other anchored edge and vice versa. It will be also appreciated that a designer may also specify that anchors are unidirectional as is illustrated in FIG. 17A to which reference is now made. Anchor A connecting components [b] and [c] may be bidirectional, so that when component [b] is moved, component [c] also moves and vice versa. However, if anchor E is unidirectional, linking the bottom edge of component [f] to the top of edge of component [g], if component [f] is moved, component [g] also moves but if component [g] is moved, component [f] remains in position.

Figure 17B:
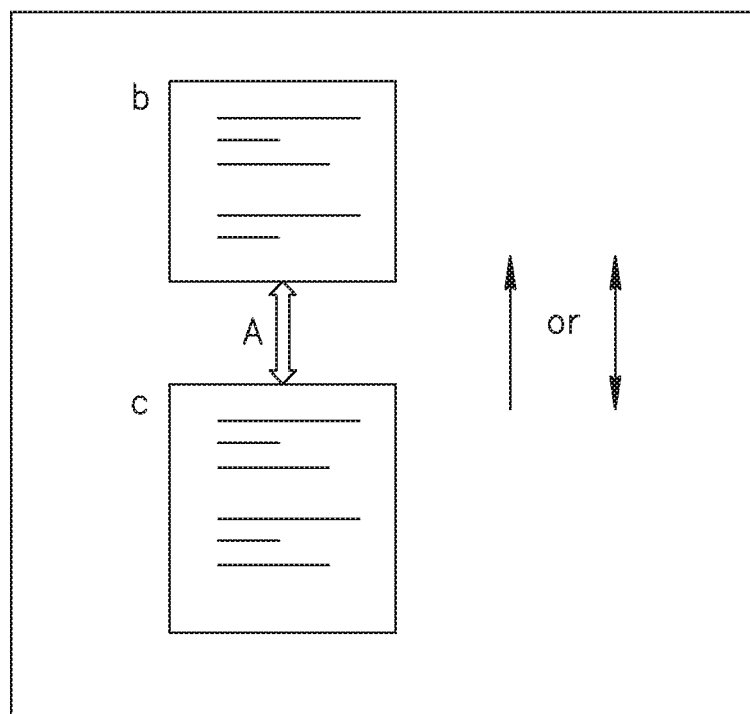

It will also be appreciated that as well as being bidirectional, explicit anchors are typically two-way as illustrated in FIG. 17B to which reference is now made. Component [b] when moved downwards may cause component [c] to move down and when component [c] is moved upwards, component [b] may move upwards accordingly. Alternatively, the anchor may be one-way in that moving component [b] downwards may move component [c] downwards, but moving component [b] upwards would not move component [c] upwards. It will be appreciated that both properties (uni/bi-directional and one/two way) are orthogonal and can be set independently of each other.

As discussed hereinabove, anchors may be either explicit or automatic. Dynamic layout editor 70 may perform automatic anchoring when it detects a situation under which components are likely to be related, and that their spatial relationship should be preserved to a certain extent when one of them is moved (for example, to prevent one from occluding the other). In this way, dynamic layout editor 70 attempts to determine the intent of the designer, and save the work required to create explicit anchors or to move the components manually.

It will be appreciated that dynamic layout editor 70 may implement a number of automatic anchoring rules which may specify the situations under which automatic anchors are created or discarded, subject to certain dynamic layout base parameters and their effect. These rules are described in more detail herein below. It will be further appreciated that the description below details the creation of firm automatic anchors. However, layout editor 70 may also implement rules under which flexible automatic anchors may be created, complete with specific minimal and maximal distance specification for such anchors as described above. In such cases, the flexible anchor parameters may be pre-configured, or be based on the geometrical properties of the component it is connected to.

Figure 18:
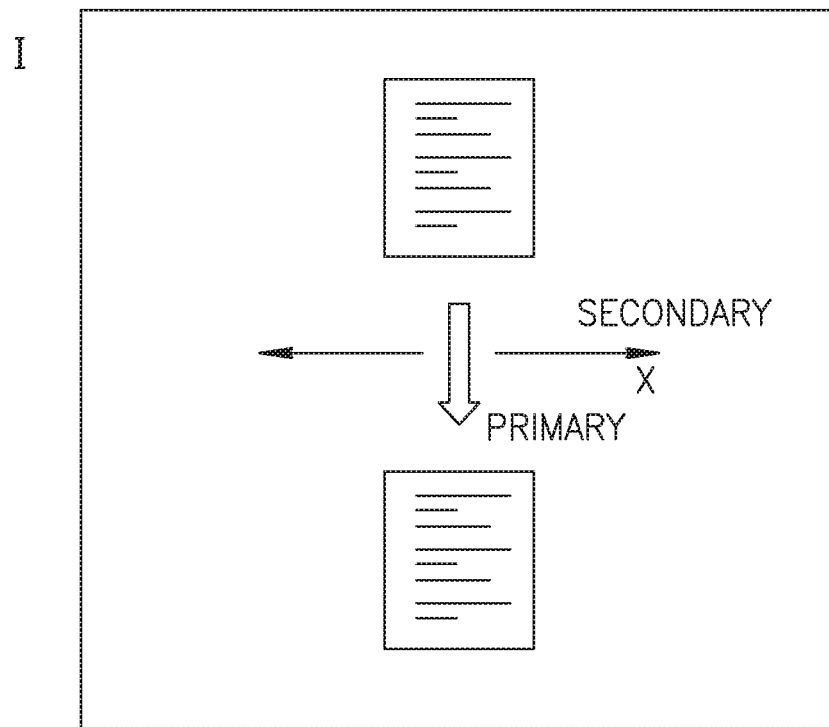
FIG. 18 is a schematic illustration of the use of different primary directions and secondary axes, constructed and operative in accordance with the present invention.
Figure 18:
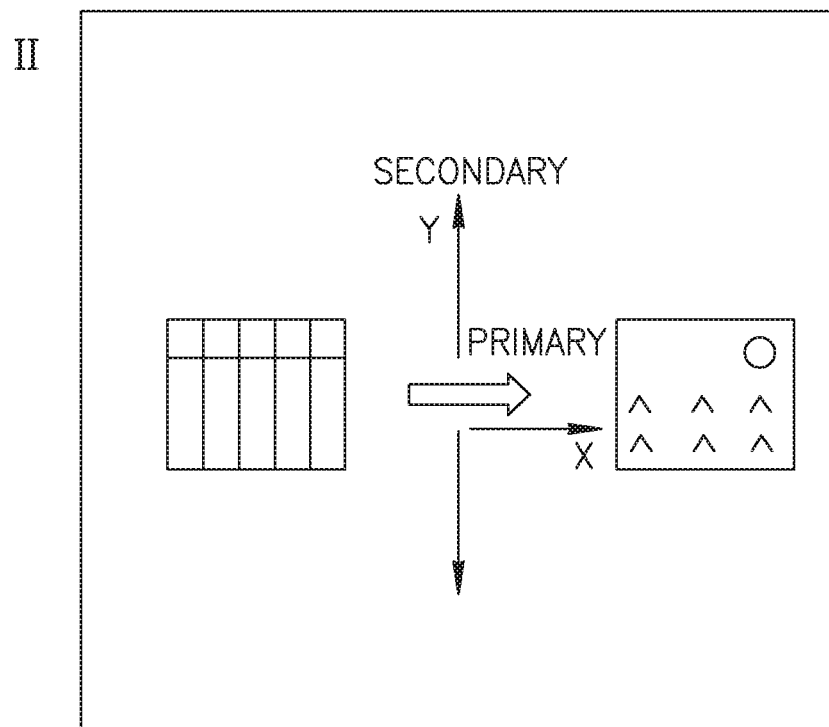

It will be further appreciated that the choice of a primary direction for any dynamic layout operation also defines a secondary axis, which is the axis (and the two directions) perpendicular to the primary direction. If the primary direction is up or down, the secondary axis is the horizontal one (X axis). If the primary direction is left or right, the secondary axis is the vertical one (Y axis)—as illustrated in FIG. 18 to which reference is now made.

In order for dynamic layout editor 70 to determine if an automatic anchor exists between the parallel edges of two components, a series of conditions related to the proximity and/or intersection of the two components may be evaluated—both vertically and horizontally. These conditions are based on testing the inter-component distance or the inter-section distance against user-defined minimum and maximum parameters, for a total of 8 different dynamic layout base parameters. The permutations are [primary or secondary] *[proximity or intersection] *[min or max].

Figure 19:
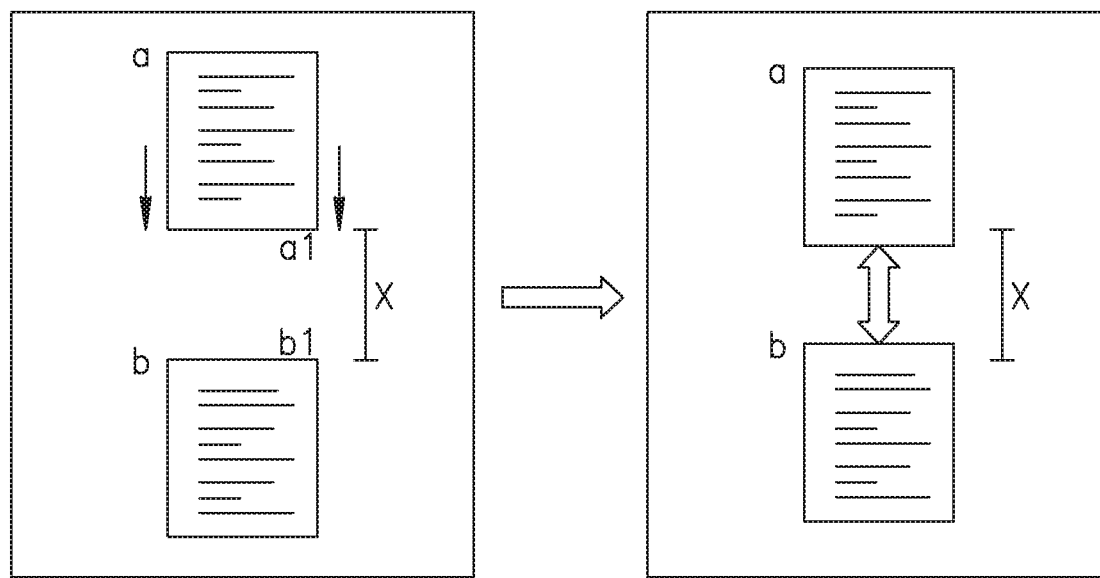
FIG. 19 is a schematic illustration of the creation of anchors when the primary-distance-max parameter has been reached, constructed and operative in accordance with the present invention.

For example, dynamic layout editor 70 may require any of the following conditions for an automatic anchor to be created. In all the examples discussed below, the primary direction is considered to be downwards. dynamic layout editor 70 may create an automatic anchor from the bottom edge of a component [a] (a1) and the top edge of a component [b] (b1) as illustrated in FIG. 19 to which reference is now made. If a1 is located above b1 and the distance between these two edges is greater than the pre-defined primary-distance-max parameter X, it is possible that component [a] may initially be too high above component [b] to be automatically anchored to component [b]. However, as component [a] moves down or grows down (e.g., manually or due to content change), the distance between components [a] and [b] becomes small enough so they may become anchored.

Figure 20:
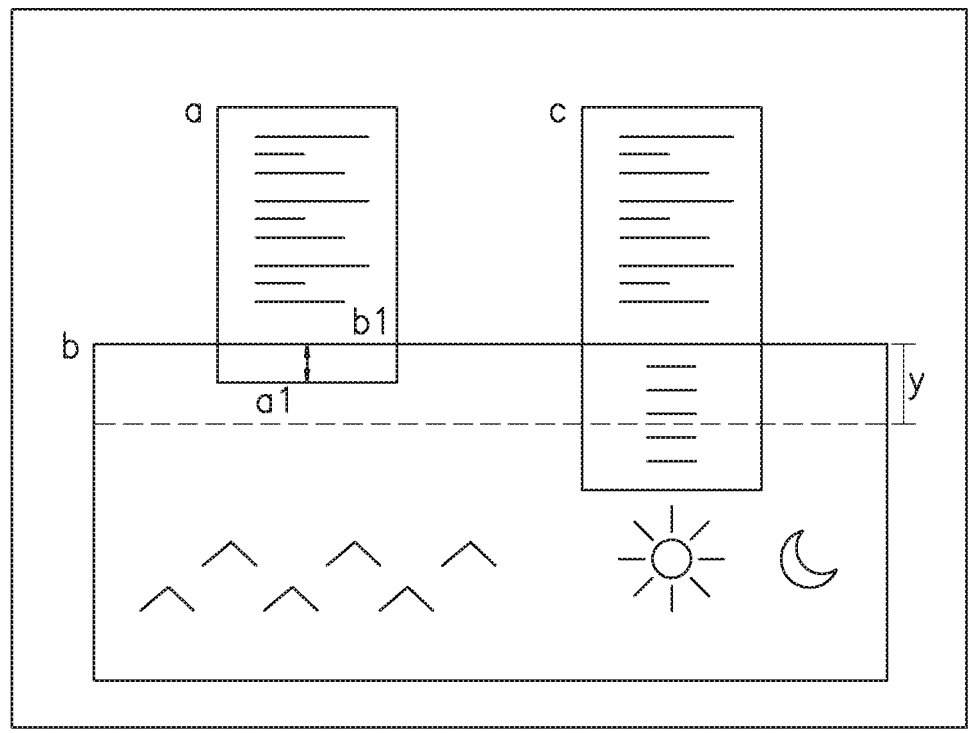
FIG. 20 is a schematic illustration of the use of the primary-intersect-max dynamic layout basic parameter, constructed and operative in accordance with the present invention.

Dynamic layout editor 70 may also create an automatic anchor if the distance between the bottom edge a1 of component [a] and the top edge b1 of component [b] if a1 is below b1 (i.e. the bottom of component [a] intersects with the top of component [b]) as is illustrated in FIG. 20 to which reference is now made. If the intersection distance is larger than the primary-intersect-max parameter y, component [b] and component [c] are not automatically anchored since the overlap is too large (greater than y).

Figure 21:
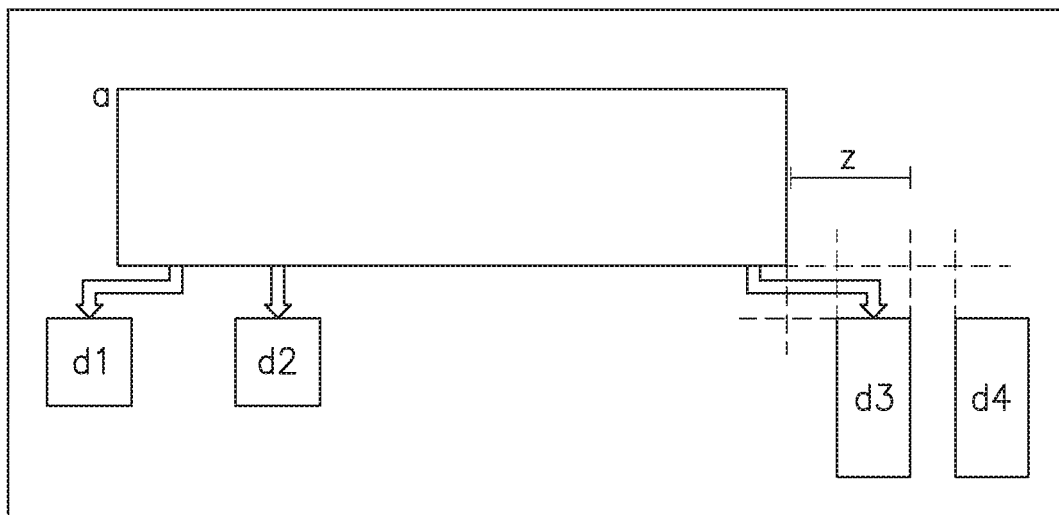
FIG. 21 is a schematic illustration of the use of the secondary-distance-max dynamic layout basic parameter, constructed and operative in accordance with the present invention.

Dynamic layout editor 70 may also create an automatic anchor when the horizontal overlap or distance between potentially anchored components meets a further condition in addition to that of the vertical distance or intersection. An example of this is illustrated in FIG. 21 to which reference is now made. If, component [a] is sufficiently close (in the vertical dimension) to components [d1], [d2], [d3] and [d4], component [a] may expand and intersect (horizontally) with components [d1] and [d2]. Component [a] may also be sufficiently close to (horizontally) component [d3] to form an anchor (i.e. the horizontal distance between the closest vertical edges of component [a] and component [d3] is less than the secondary-distance-max parameter Z). However, component [d4] may not be sufficiently close enough (horizontally) to component [a] and their horizontal distance may be greater than the secondary-distance-max parameter Z. Thus component [a] may be automatically anchored to components [d1], [d2] and [d3] but not to [d4].

It will be appreciated that comparison against parameters which are not implemented or specified (as part of the dynamic layout base parameter set) is not performed. For example, if a minimal secondary axis intersection distance [x] is implemented, but no matching maximal intersection distance is implemented, then any amount of intersection greater than or equal to [x] would satisfy this dynamic layout basic parameter condition.

It will also be appreciated that dynamic layout base parameter sets may also include [0 to infinity] ranges. These are used, for example, to test whether a component [a] is higher than a component [b] and intersects it and whether size of the intersection region between components [a] and [b] is relevant to the systems' automatic anchoring decisions. In such a scenario, a range [0 to infinity] may be defined for the primary intersects [min, max] dynamic layout basic parameter pair.

It will also be appreciated, that the parameters may be combined using Boolean conditions or any other applicable conditions (such as a weighted combination) when dynamic layout editor 70 checks for an automatic anchor creation between component [a] and component [b].

For example, if components [a] and [b] are disjointed along the primary direction, a check is made to see whether their distance is in the relevant [min, max] range.

If components [a] and [b] intersect along the primary direction a check is made to see whether their intersection distance is in the relevant [min, max] range.

If components [a] and [b] are disjointed along the secondary axis (in either direction), check that their distance is in the relevant [min, max] range.

If [a] and [b] intersect along the secondary axis, a check is made to see whether their intersection distance is in the relevant [min, max] range.

Therefore, to create an anchor from component[a] to component [b], the two components have to be correctly positioned both vertically and horizontally. It will be appreciated that values for each of the dynamic layout base parameters may be determined using any combination of the following methods: using a general system parameter; using an override value for the specific web site or application being edited; using an override value for the specific component type of each of the two components being checked (e.g. leave a large space around a picture component as compared to a text component); using an override value for the specific screen being designed and using an override value for the specific container in which the links are being created;

It will be appreciated that the dynamic layout basic parameter values may be defined by the various automatic anchoring rules (described in more detail herein below). It will also be appreciated that the system may specify general dynamic layout basic parameter values to be used by all automatic anchoring rules, or as separate set of dynamic layout basic parameter values for each automatic anchoring rule.

It will be further appreciated that the automatic anchoring rules may also require a specific order between the components along the primary direction. For the sake of illustration, a particular rule may require that component [a] be above (either disjointed from or intersecting with) component [b]. Such an order condition will be tested in addition to the dynamic layout basic parameter conditions.

Furthermore, the actual dynamic layout basic parameter values may also be specified using any combination of the following methods:

Using Absolute Pixel Values.

Using a pixel value which is adjusted relative to the size of display device displaying the application, so if (for example), an application is scaled down 20% due to a display screen having a lower resolution, the threshold values are also scaled down by 20%.

Using a pixel value which is adjusted relative to the sizes of the two components being anchored—so if one of the components is enlarged, the required anchor distance would grow proportionally. The dynamic layout basic parameter value may be specified using the minimal, maximal or average size of the components involved.

Figure 22:
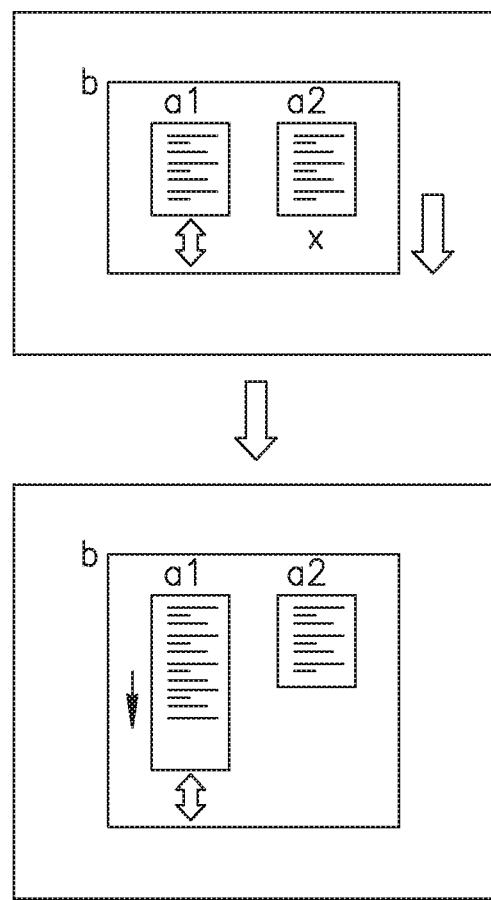
FIG. 22 is a schematic illustration of the implementation of automatic anchoring gate conditions, constructed and operative in accordance with the present invention.

It will also be appreciated that automatic anchoring gate conditions may be implemented as part of the dynamic layout basic parameter conditions. These are per-component/per-edge attributes for each of the implemented automatic anchoring rules which specify if a given rule would be applied to a given component edge or not. For example, as is illustrated in FIG. 22 to which reference is now made, an automatic anchor may be created between the lower edge of components [a1] and [a2] and the lower edge of the containing container [b]. However, the gate condition for component [a1] may specify that such an automatic anchor should be created, while the gate condition for component [a2] may specify that an automatic anchor should not be created. Therefore, in this scenario when the bottom of container [b] moves down, component [a1] may move or expand down, while component [a2] is not affected.

Figure 23:
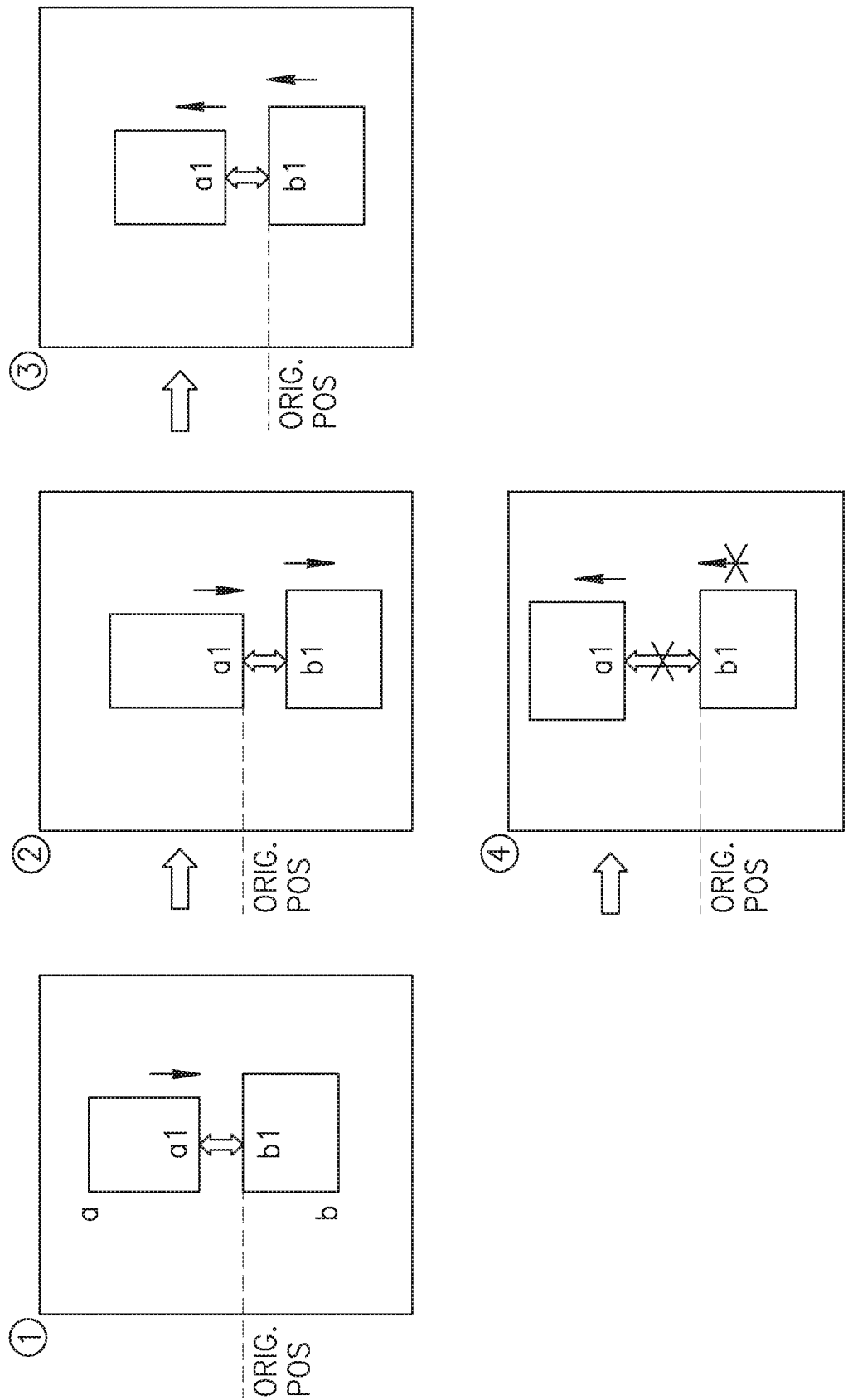
FIG. 23 is a schematic illustration of the automatic anchoring of component edges, constructed and operative in accordance with the present invention.

Reference is now made to FIG. 23 which illustrates the different scenarios of what happens once component edges a1 and b1 become automatically anchored. Any further movement down or up of edge a1 may move the edge b1 as well. This is subject to the limitations of the original position as described herein above, so that if component [b] is moved downwards (for example) due to component [a] pushing it down, and then was pulled back up when component [a] moved up again, component [b] would not move further up once it has returned to its original position, even if component [a] moved up above its original position. In such a case, since the distance between the lower edge of component [a] and the upper edge of component [b] exceeds the threshold X for the existence of automatic anchor, the anchor would be broken.

Figure 24:
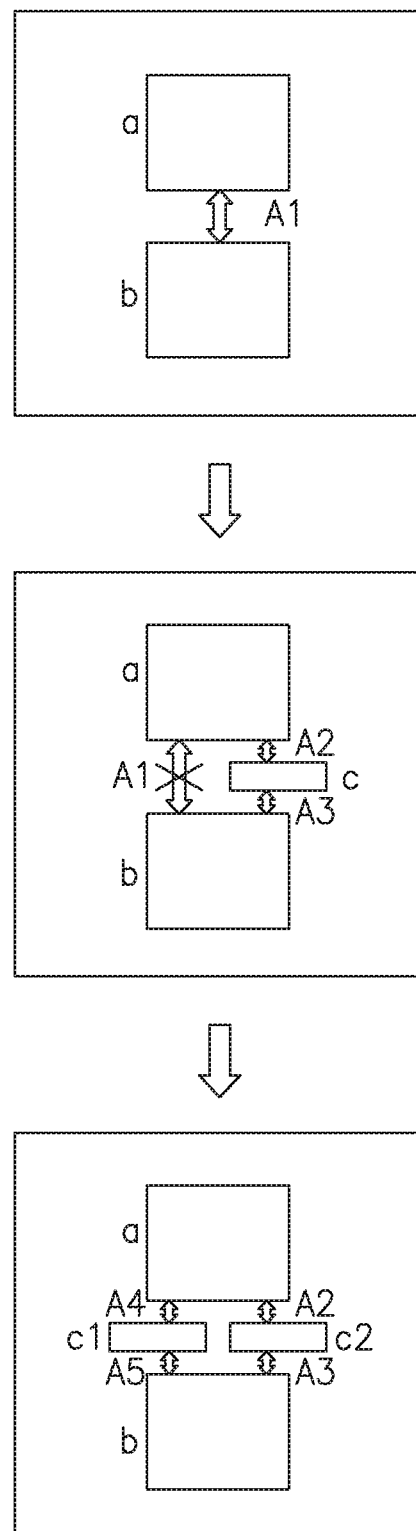
FIG. 24 is a schematic illustration of the breaking of an automatic anchor due to an interfering component, constructed and operative in accordance with the present invention.

Automatic anchors may also be broken when a third component is placed between the two anchored components. For example, as is illustrated in FIG. 24 to which reference is now made, in which components [a] and [b] are automatically anchored by anchor A1. When an additional component [c] is placed between them, the direct anchor A1 between components [a] and [b] is broken. It will be appreciated that the system would typically (in such a case) create automatic anchors A2 and A3 between components[a] and [c] and between components [c] and [b]. The break may occur once component [c] is "sufficiently inside" so as to satisfy the dynamic layout base parameters conditions between components [a] and [c], or between components [c] and [b]. This way, a situation is avoided in which anchors A1, A2 and A3 co-exist. However, it does allow for a situation in which anchors A2, A3, A4 and A5 can co-exist.

It will also be appreciated that dynamic layout editor 70 may also support semi-automatic anchoring. The pertinent visual design system may detect situations in which an anchor is likely to be needed between two or more component edges in an area where no automatic anchor has been designated. In such cases, the system may suggest the possible anchors to the designer, and the designer can select using an appropriate interface whether to confirm the suggestion (thereby creating an anchor) or not.

Figure 25:
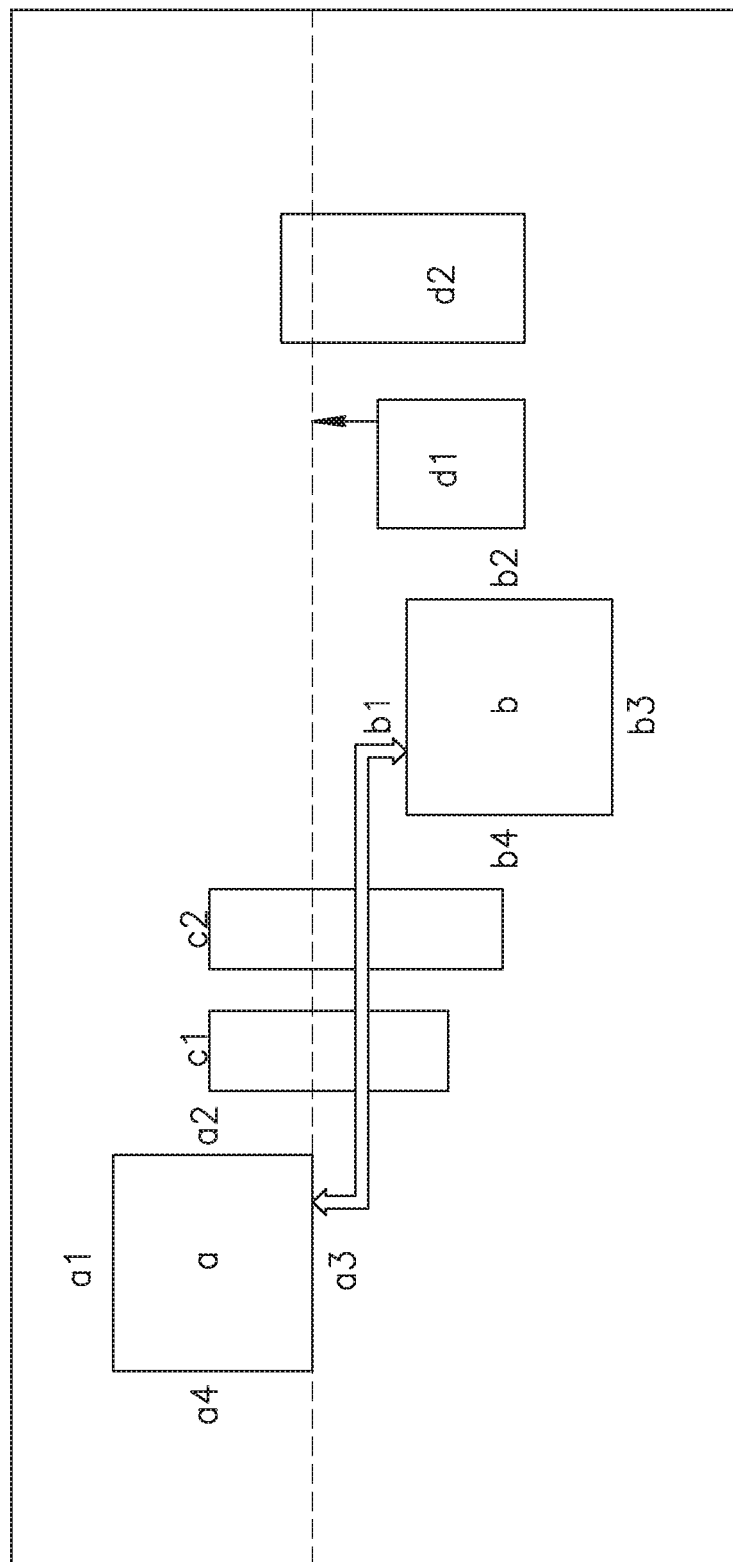
FIG. 25 is a schematic illustration of semi-automatic anchor creation, constructed and operative in accordance with the present invention.

For example, system 100 may suggest that whenever parallel edges of two components lay on the same line, or are sufficiently close to the same line, that the designer confirms the creation of an explicit link between these two parallel edges as is illustrated in FIG. 25 to which reference is now made. As is shown, edges a3 and b4 are sufficiently close vertically (their distance is smaller than a given threshold) so that system 100 suggests that an anchor be created between them. It will be appreciated that additional factors may be taken into account such as: the horizontal distance between components [a] and [b]; the existence of additional components ([c1], [c2]) between [a] and [b] (horizontally) which intersect the common horizontal line and the existence of additional components ([d1], [d2]) whose edges lay on the same line or close to it and the length of the component edge a3 and b3 which are aligned along the line. The created anchor may still be marked as a semi-automatically created anchor and the conditions under which was created may be stored in the stored dynamic layout information. The anchor remains defined as long as these conditions hold true, and would be broken when the conditions under which it was created are no longer in force.

Figure 26:
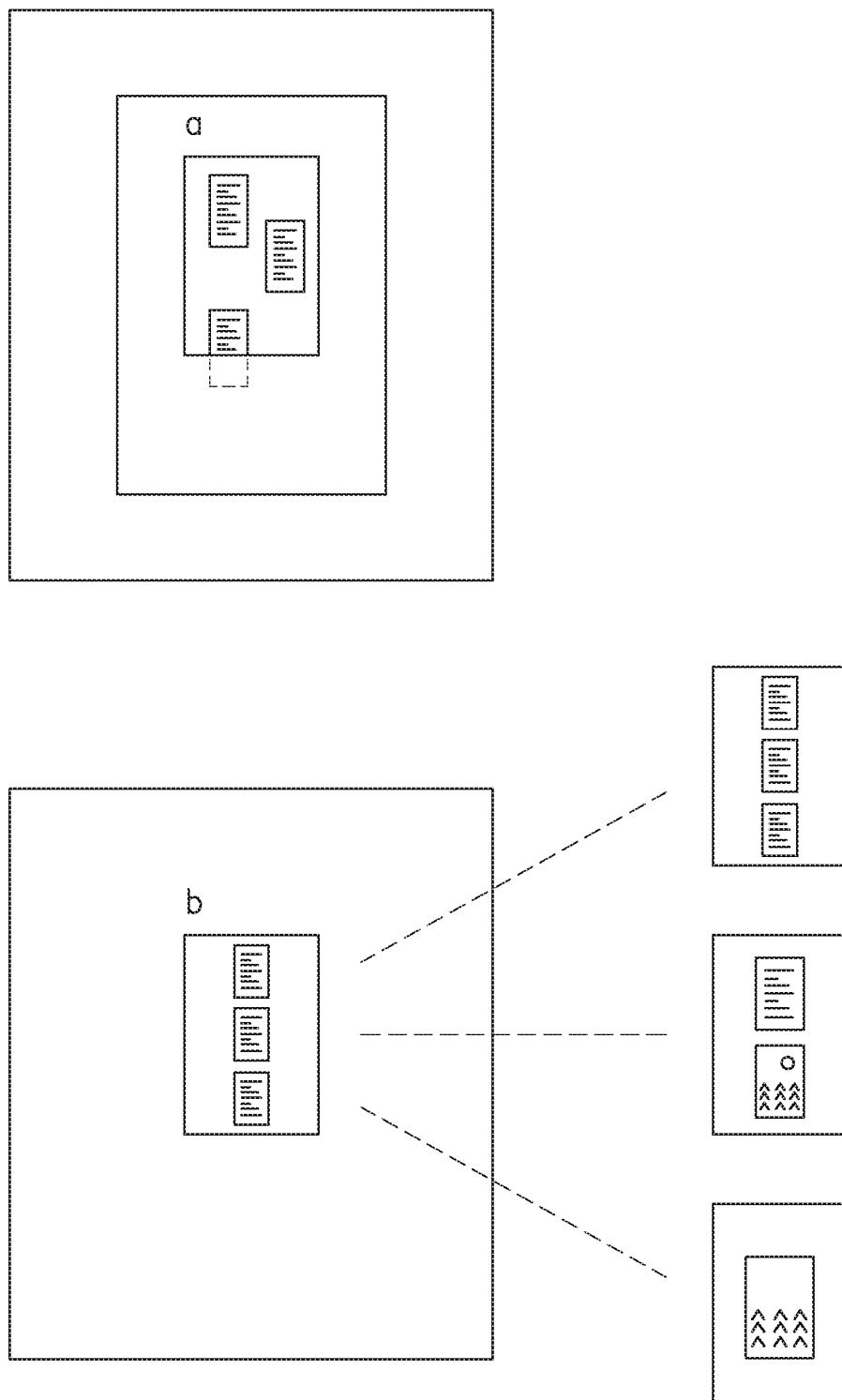
FIG. 26 is a schematic illustration of single page and multi-page containers; constructed and operative in accordance with the present invention.

It will also be appreciated that system 100 may implement a hierarchical component structure, in which some components are containers containing other components or sub-containers. It will be further appreciated that containers may be classed as single page containers or multi page containers. Reference is now made to FIG. 26, which illustrates single page and multi-page containers. As is shown, in single page container [a], all of the contained components are displayed when the container is visible, subject to clipping by the container boundaries. In multi-page container [b], the container components may be placed on multiple underlying areas, all of which belong (logically) to container [b], but of which one component only is displayed at any given time [b]. It is also possible for a multi-page container to display a number of the underlying areas at the same time, e.g. in a gallery-style arrangement. In such a system, components may be arranged as a set of tree structures, in which the roots of the trees are the separate application pages, and nodes of the trees are atomic components, single page containers and the separate contained areas of multi-page containers. Each component or container may be considered to have a single recognized parent node.

It will be appreciated that in such a layout, anchors (explicit, automatic or otherwise) can only be made between a component and its direct parent; between a container component and one of its descendants (in any of the contained areas in multi-page containers) or between two peer components which are both direct descendants of the same node—either the same application page/container or the same area in a multi-page container.

Figure 27:
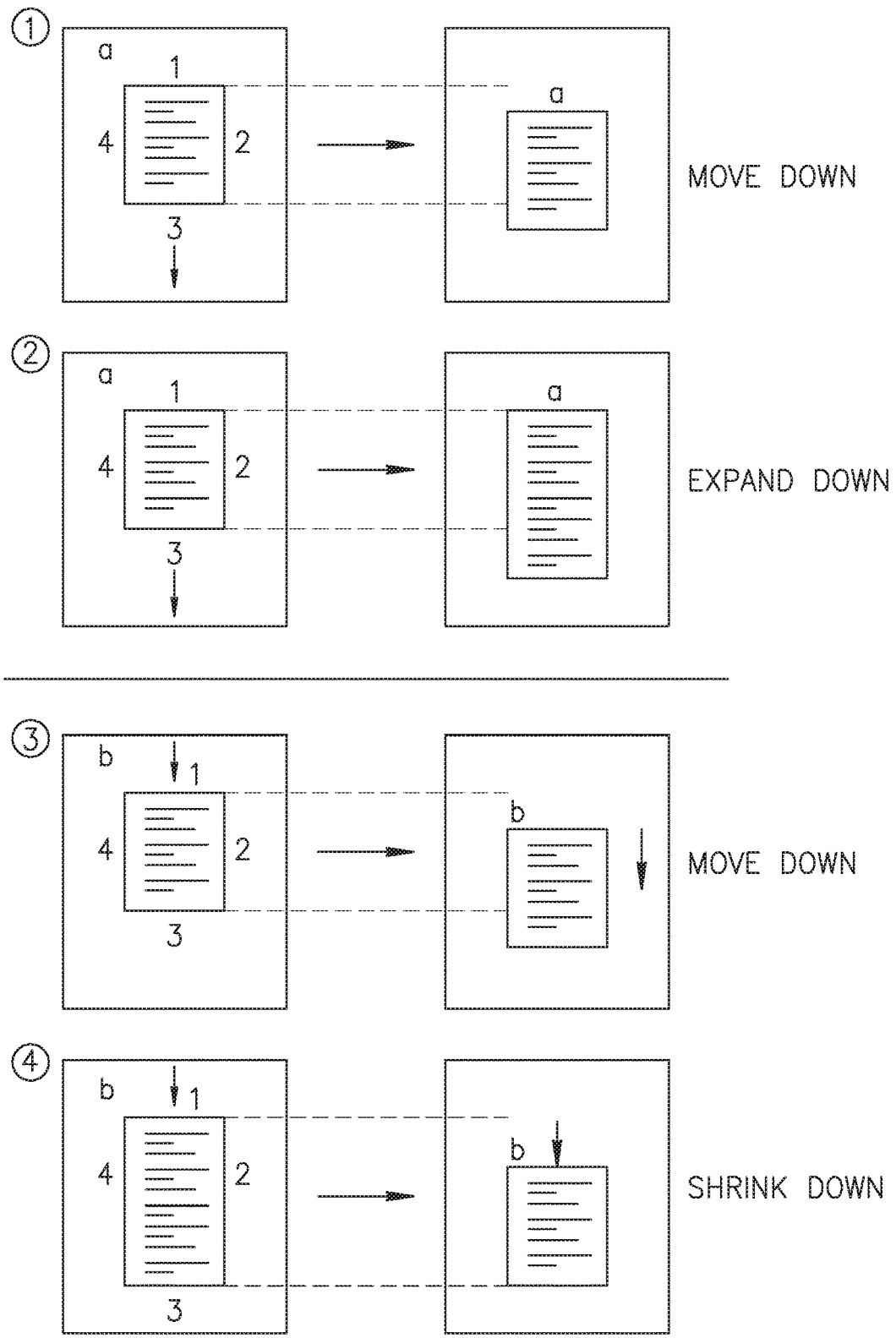
FIG. 27 is a schematic illustration of a comparison of dynamic layout effects of moving and resizing; constructed and operative in accordance with the present invention.

It will also be appreciated that when a dynamic layout event occurs, the anchored edge of the affected element (e.g. component, content, container etc.) has to move. Reference is now made to FIG. 27 which illustrates such a scenario where dynamic layout is implemented. For example, due to a dynamic layout event, edge 3 of component [a] needs to move downwards. If edge 3 is the lower edge of a given component, there are two possible ways to do this: by moving the entire component down (keeping its vertical size intact) (scenario 1) or by moving just the edge down, expanding the entire component in the vertical direction (scenario 2). If the edge is the upper edge 1 of component [b], there are again two possible ways to do this: by moving the entire component down (keeping its vertical size intact) (scenario 3) or by moving just the edge down, shrinking the entire component in the vertical direction (scenario 4).

It will be further appreciated that if the other horizontal edge of the same component is directly anchored to a framework element, the choice of direction is forced by that anchor. Otherwise, there are multiple options. For explicit anchors, dynamic layout editor 70 may provide a graphical user interface for the user to specify, for each explicit anchor, the direction for each anchor (since anchors may be bidirectional) and whether the anchor would move the affected component upon a dynamic layout event, or resize it instead.

For automatic anchors, this method is typically inappropriate as such anchors may be constantly created and removed. It will be appreciated that dynamic layout editor 70 may provide a default setting which allows the designer to specify which action should be taken (for both types of edges) in the case of automatic anchors. This may be specified at the application/web site level, with possible overrides at the application page, container and component level.

It will also be appreciated that for some types of automatic anchors, a single option may be available—typically a resize (rather than move). In particular, in all automatic anchor situations in which a component [a] affects the container component [b] which logically contains [a], the effect must always be a resize and not a move—since a contained component cannot move the container that contains it.

Figure 28:
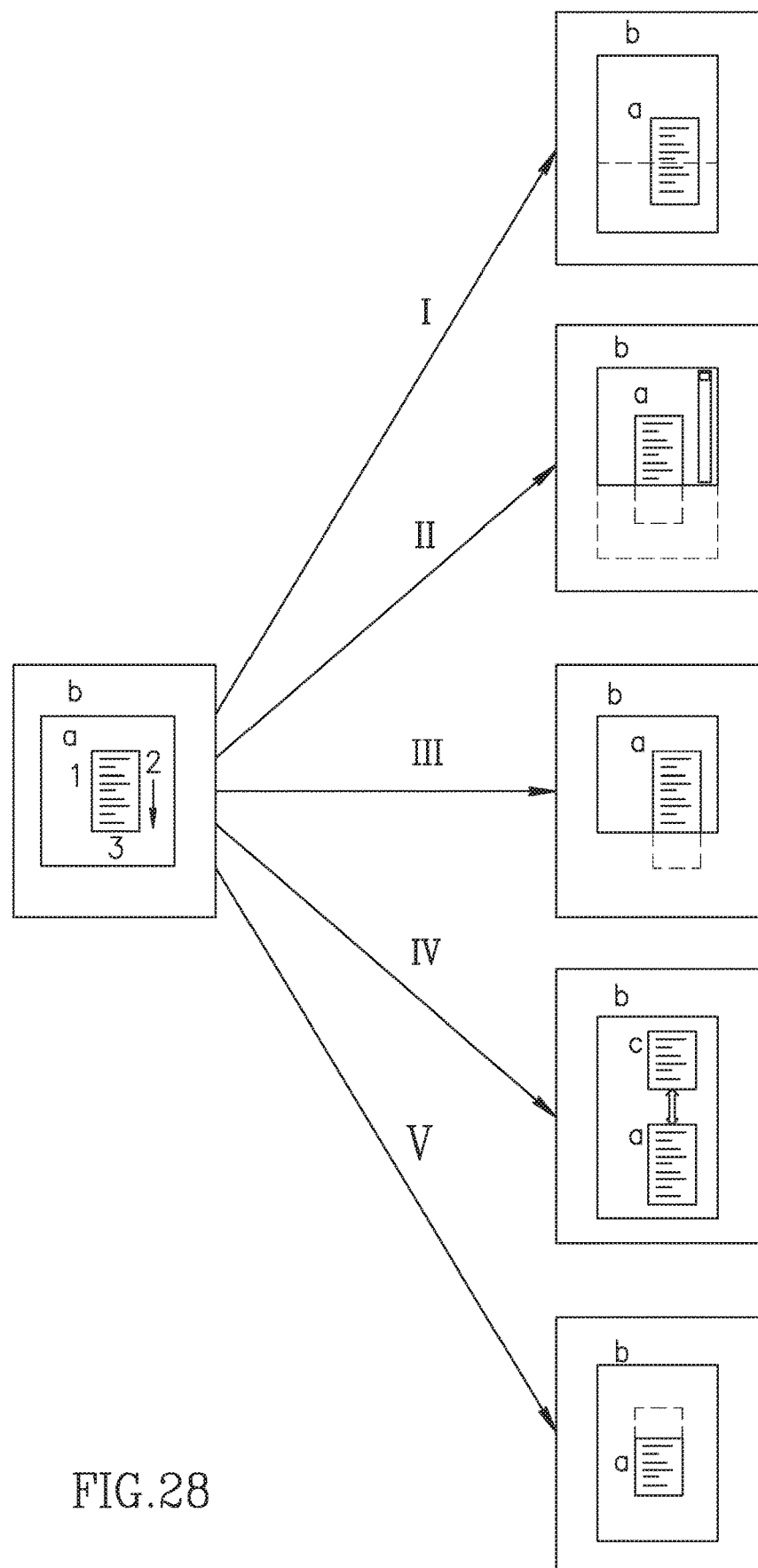
FIG. 28 is a schematic illustration of the changes to a behavior set for a given component due to dynamic layout; constructed and operative in accordance with the present invention.

It will also be appreciated that some dynamic layout changes may require a component to shrink, e.g. when its bottom edge moves up due to an explicit anchor to another edge which was moved up. It may be possible to define a minimal size for each component or component type in order to prevent such components from shrinking below their minimal size. Reference is now made to FIG. 28 which illustrates how the behavior set for a given component [a] may change due to dynamic layout (moving or expanding down) when edge 3 of component [a] reaches the bottom of container [b]. It will be appreciated that the distance between bottom edge 3 of component [a] and the bottom edge of container [b] may be below a certain pre-specified threshold. Container [b] may be an actual container or may be the edge of the screen. In such a case, the following options (or combinations thereof) may be implemented:

In scenario I, container [b] or the screen may be extended downwards. In scenario II, container [b] or the screen may be extended logically but not physically and therefore retaining the existing position and size of container [b]. The discrepancy between the physical and logical dimension of container [b] is resolved by making container [b] a scrollable object, with a vertical scroll bar which allows viewing of the non-displayed portions of container [b]. In scenario III, component [a] may continue moving or expanding down, but part of the component may become clipped (and thus hidden) by the bottom of container [b]. In scenario IV, component [a] may stop moving or expanding down—which may affect additional components as well. For example, if component [a] was moving downwards (e.g. due to a component [c] pushing it from above), component [a] may stop moving and thereby cause [c] to stop moving as well, or alternatively the distance between [c] and [a] may be shrunk (depending on the type of anchor D between them). It will also be appreciated that if component [a] expands downwards (e.g. due to editing text content inside component [a]), the content inside component [a] might be affected in a variety of ways, including (but not limited to): being displayed using different fonts and being displayed with scroll bars (which allow scrolling over the content). In scenario V, component [a] may start to shrink instead of just moving downwards.

It will be appreciated as discussed hereinabove, that the above mentioned examples may be classified into four main automatic anchoring rules.

The first rule is between content and a containing component. An automatic anchor may be defined between every container and its content. Under this rule, the size of a component which contains variable content may change as the content changes. This may occur due to content changes made by a designer or an end-user, changes in content initiated by the application itself while running and changes in content caused by dynamic content. System 100 may define a minimal distance threshold between the content and the component frame so that content changes only affect the lower edge of the component once the lower edge of the content is within a minimal distance from the lower edge of the container.

The second rule may be between a component and a peer component in a primary direction. An automatic anchor may be defined between parallel edges of adjacent components along the primary direction. If the primary direction is down, then an automatic anchor may be created between the bottom edge of a component [a] and the top edge of a component [b] when the dynamic layout basic parameter conditions are satisfied.

Figure 29A:
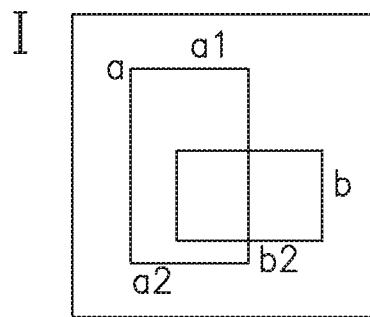
FIGS. 29A, 29B and 29C are schematic illustrations of an automatic anchoring rule between the bottom edges of components which are near to each other, constructed and operative in accordance with the present invention.
Figure 29A:
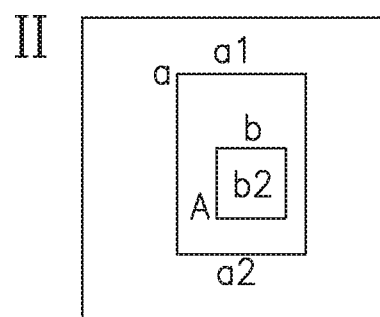
Figure 29A:
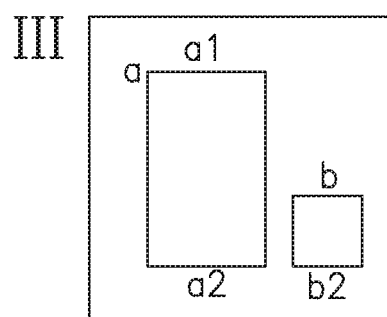
Figure 29A:
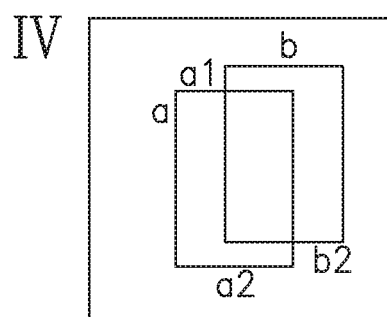
Figure 29B:
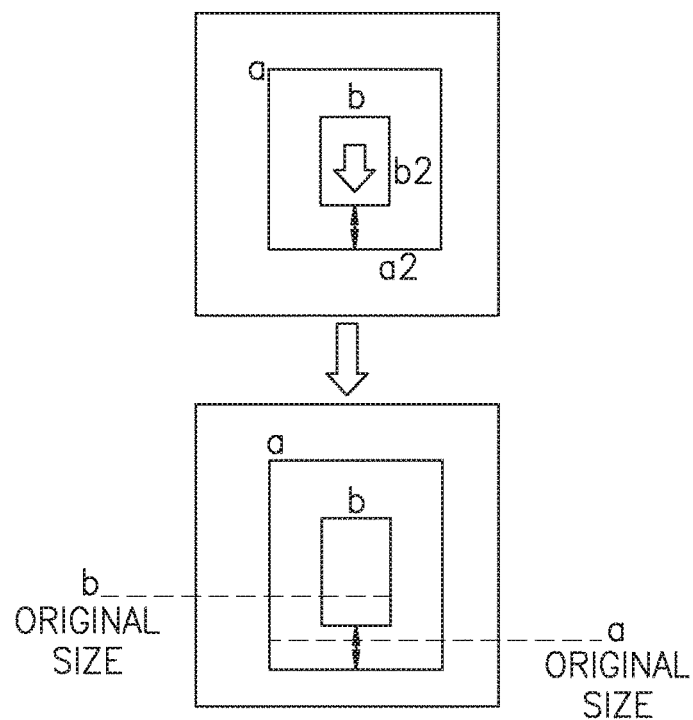
Figure 29B:
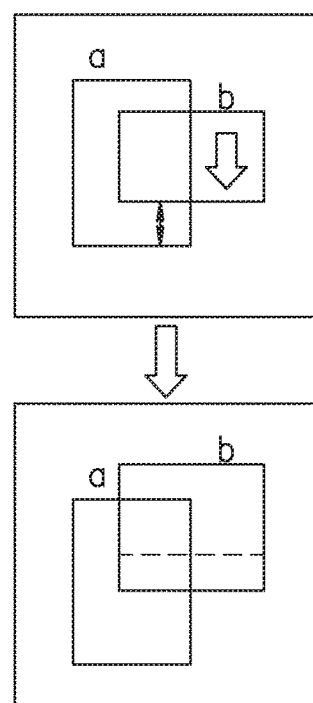

The third rule may be between the bottom of component [a] and the bottom of component [b]. Dynamic layout editor 70 may automatically create an anchor between bottom edges which are near to each other horizontally, or intersect each other in the horizontal direction as is illustrated in FIG. 29A to which reference is now made. It will be appreciated that under this rule and using typical dynamic layout base parameters, dynamic layout editor 70 would create an automatic anchor A between the bottom edges a2 and b2 of components [a] and [b] (scenario I) when the following conditions are met: edge b2 is inside component [a], edge b2 is below the top edge a1 and above the bottom edge a2 (scenario II), component [b] is either completely contained vertically in component [a] or just intersects vertically and components [a] and [b] are sufficiently close enough to each other to intersect horizontally (scenario III). Components [a] and [b] may be peer components or component [a] may be a container which logically contains component [b] (scenario IV) There must be no other component between edges a2 and b2. In this scenario the anchor may be bi-directional or unidirectional from edge b2 to edge a2. Therefore, when component [b] moves or expands down (and edge b2 moves downwards), component [a] would also move or expand down (as defined for anchor) i.e. edge b2 pushes edge a2 downwards. When edge b2 moves back upwards, it pulls edge a2 back up again until it teaches its original position as is illustrated in FIG. 29B to which reference is now made.

Figure 29C:
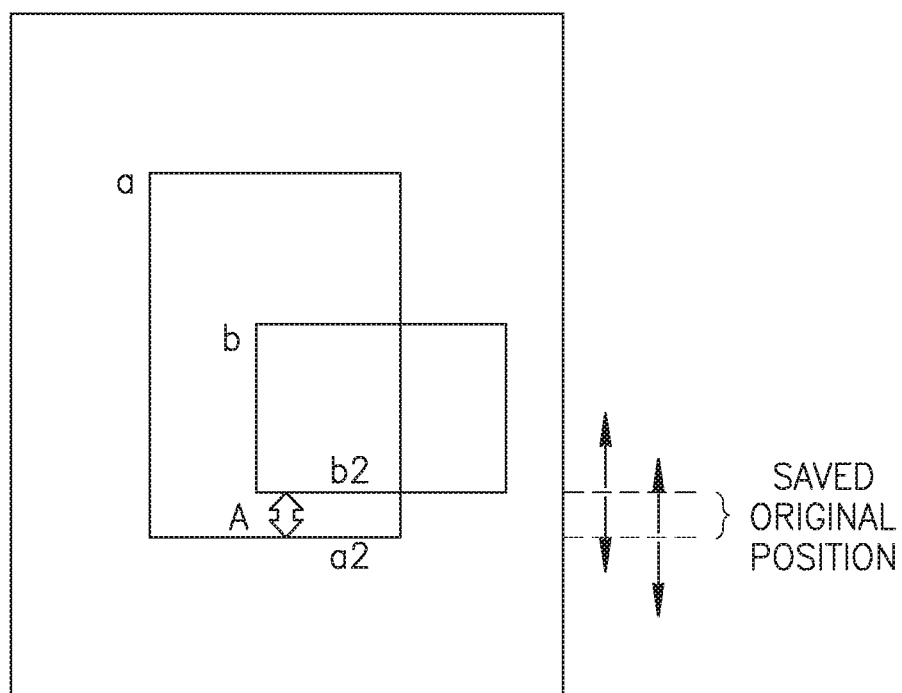

If component [a] logically contains component [b], then moving edge b2 will only resize component [a] (by moving edge a2 up or down as appropriate). It would not move component [a]. This limitation does not apply if components [a] and [b] merely intersect and component [a] does not logically contain [b]. It will be further appreciated that if a bidirectional version of anchor A is implemented, when component [a] moves or expands down, component [b] would also move or expand down (as defined by anchor A)

i.e. edge a2 pills edge b2 down. When edge a2 moves back up, it pushes edge b2 until edge a2 reaches its original position as is illustrated in FIG. 29C to which reference is now made.

Figure 30A:
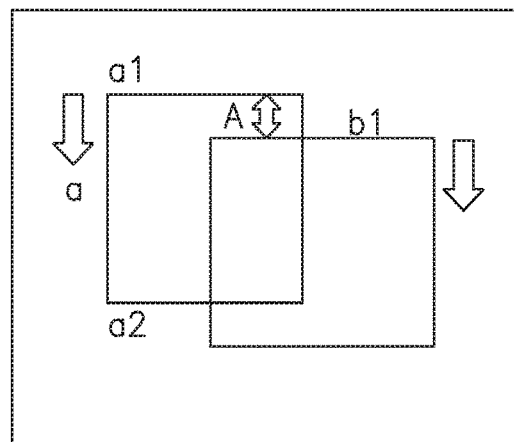
FIGS. 30A and 30B are schematic illustrations of an automatic anchoring rule between the top edges of components which are near to each other, constructed and operative in accordance with the present invention.
Figure 30A:
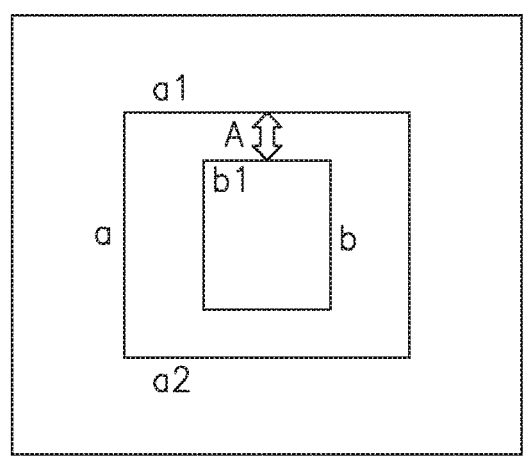
Figure 30B:
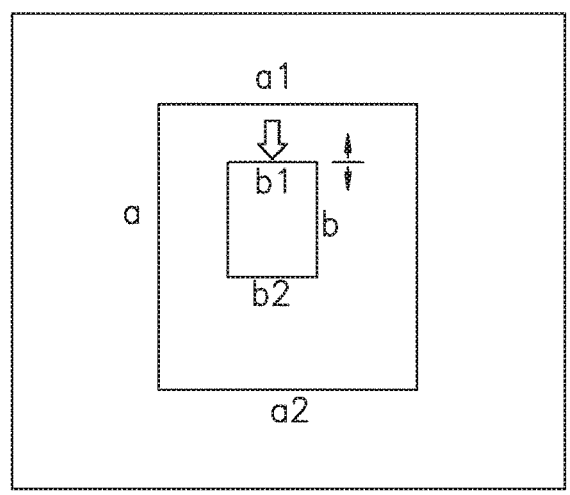

The fourth rule may be between the top of component [a] and the top of component [b]. Dynamic layout editor 70 may create an anchor between the top edges of both components which are near to each other horizontally or intersect each other in the horizontal direction as is illustrated in FIG. 30A to which reference is now made. Under this rule in a typical dynamic layout base parameter setting, dynamic layout editor 70 may create an automatic anchor between the top edges a1 and b1 of two components [a] and [b] if the following conditions are met: edge b1 is inside component [a], edge b1 is below edge a1 and above edge a2 and component [b] is completely contained vertically in component [a] or intersects component [a] vertically. Both components [a] and [b] must be sufficiently close to each other or intersect horizontally. Components [a] and [b] may also be peer components (i.e. inside the same container or page) or [a] may be a container which logically contains [b]. There must be no other component between edges a1 and b1. It will be appreciated that anchor A is unidirectional from edge a1 to edge b1, and is activated when edge a1 moves down, moving edge b1 and therefore component [b] with it. If component [a] is expanded downwards, anchor A is not activated since edge a2 is moved but not edge a1 as is illustrated in FIG. 30B to which reference is now made.

It will be appreciated that dynamic layout editor 70 may apply automatic anchoring rules between more than two component edges if applicable, so that a more complex anchor may be created that connects three or more components.

It will also be appreciated that a flexible anchor may allow the distance between component [a] and container [b] to shrink further until a minimal distance is reached. In this scenario, the anchor may then become fixed so that no further anchor shrinking would be allowed. It will be further appreciated that system 100 may specify a default behavior (selected amongst the scenarios of FIG. 28 whenever applicable and implemented), and may specify an override behavior at the component or container level. It will also be appreciated that although the discussion above refers to edges and components moving down, this is by the way of illustration only and system 100 may implement dynamic layout events which cause edge moves in all four directions.

Figure 31:
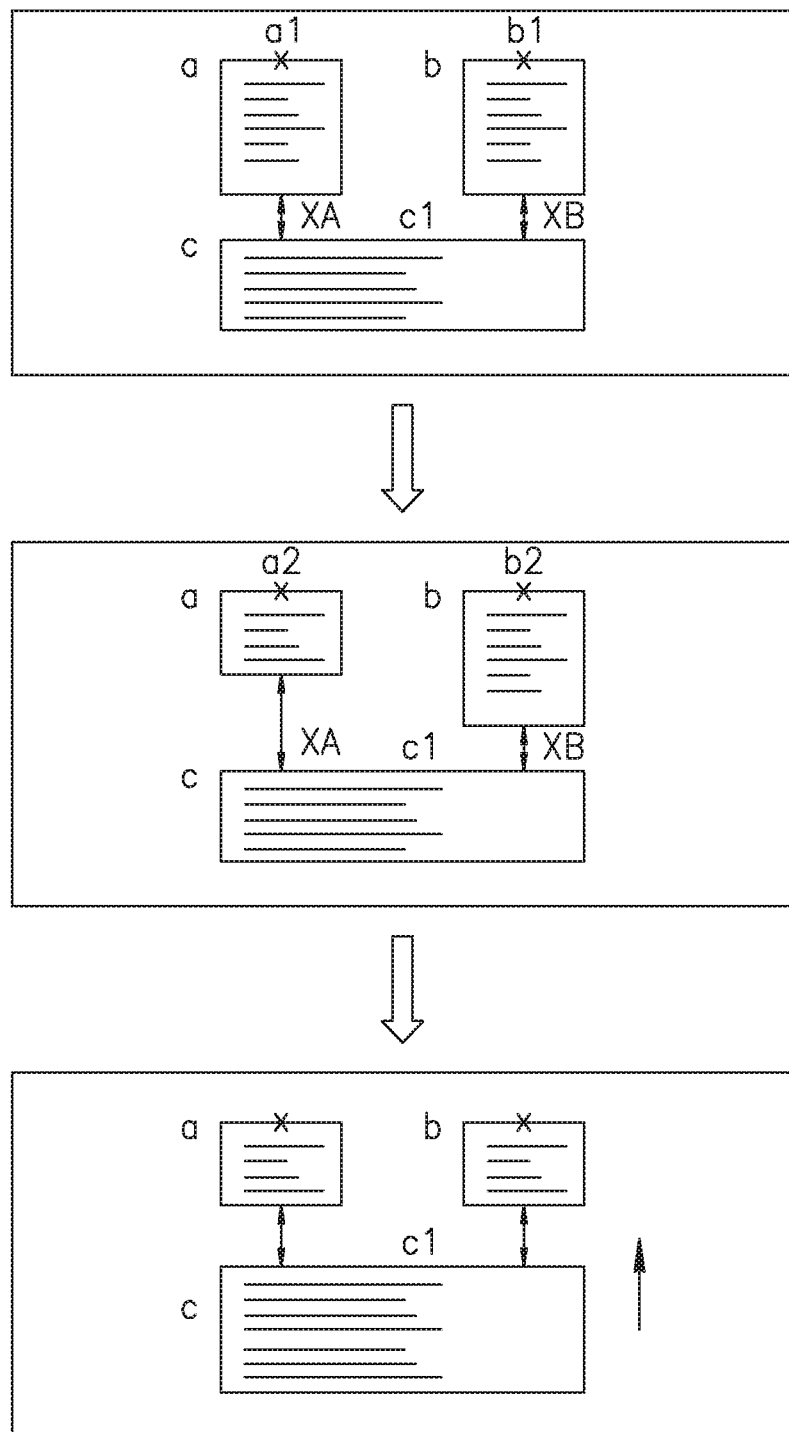
FIG. 31 is a schematic illustration of multiple anchor interaction, constructed and operative in accordance with the present invention.

It will also be appreciated there may be multiple anchors which may dictate different behaviors for a given component when a dynamic layout event occurs as is illustrated in FIG. 31 to which reference is now made. For example, components [a] and [b], may be at a 20 pixel distance from component [c], creating an automatic anchor XA between [a] and [c] and another automatic anchor XB between components [b] and [c]. The top edges a1 of component [a] and b1 of component [b] may both be locked in place. It will be appreciated that components [a] and [b] may be text components, each of which may contain a certain amount of multi-line text (and thus their bottom edges would move according to the amount of text contained in them). When the amount of text of inside component [a] is reduced, component [a] may shrink upwards and pull with it the top edge c1 of component [c] (due to automatic anchor XA). However, this move upwards of component [c] may be limited to the minimal allowed distance between edge c1 and the bottom edge b3 of component [b]. A situation might arise in which edge c1 cannot move upwards since it may "stretch" anchor XA above the maximal distance under which it can be created with the dynamic layout basic parameters in place. However, the system may still remember XA as an "overstretched" anchor, rather than breaking it. It also may remember the original distance set for the anchor XA.

It will be further appreciated that if the amount of text inside component [b] is reduced, component [b] would shrink, moving bottom edge b2 upwards. The top edge c1 of component [c] may also move up as much as is possible according to the limitations set by the two anchors XA and XB.

As discussed hereinabove, dynamic layout coordinator 170 may employ rules to evaluate and create automatic anchors, to determine when a dynamic layout trigger has been activated and to execute the dynamic layout changes based on the pertinent triggered dynamic layout events.

Figure 32:
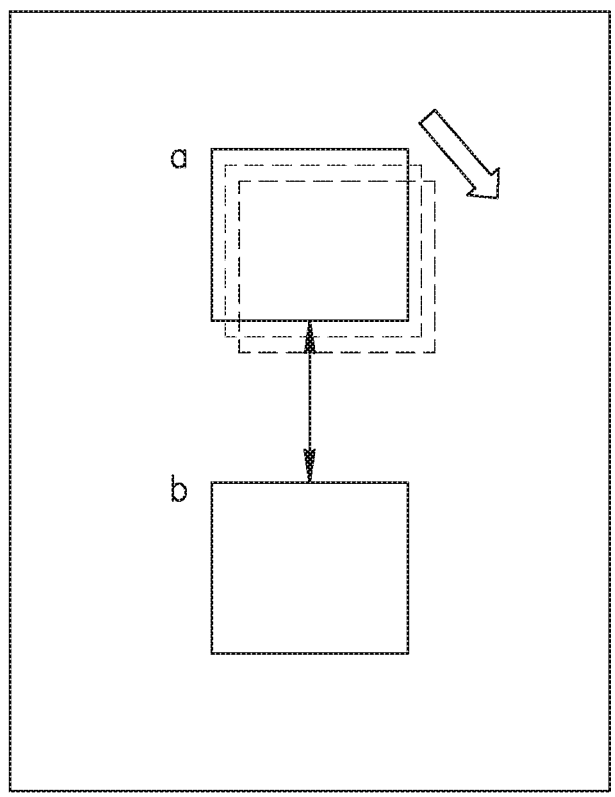
FIG. 32 is a schematic illustration of activation of a dynamic layout algorithm together with an incomplete triggering action, constructed and operative in accordance with the present invention.

It will also be appreciated that these rules may run upon occurrence of any of the possible dynamic layout trigger events described herein above. It will be appreciated that these rules may also run even if triggering action is not completed. Reference is now made to FIG. 32 which illustrates component [a] in the process of moving downwards. A dynamic layout trigger might occur every time the component [a] has moved a few pixels (with the attendant move to component [b]), and before the movement has been completed and before component [b] has reached its new final position.

The rule in this situation may also be applied recursively for each container level inside the application (e.g. to each page separately, and to each container in each page). It may scan all possible anchor relationships—both existing anchors and potential semi-automatic and automatic anchors—and may perform the dynamic layout according to the dynamic layout rules described above, adding, removing and modifying the anchors and modifying component properties as required.

Therefore, a server based system may be used to integrate dynamic layout rules across single and multiple clients sharing the same server enabling the efficient moving and resizing of components where necessary and thus improving the website creation and design process.

It will be appreciated that, as discussed hereinabove, there are often multiple and complex rules governing the application of dynamic layout. Applicant has realized that, occasionally during page design, a designer may sometimes desire to make some sweeping changes to certain components—changes which could break the existing look and feel of the page design in order to create a new and better design. The situation may also be more complex—since there may be multiple pre-defined dynamic layout rules, and the designer may desire to modify a given component or set of components, activating some of the set dynamic layout rules and bypassing others.

Figure 33:
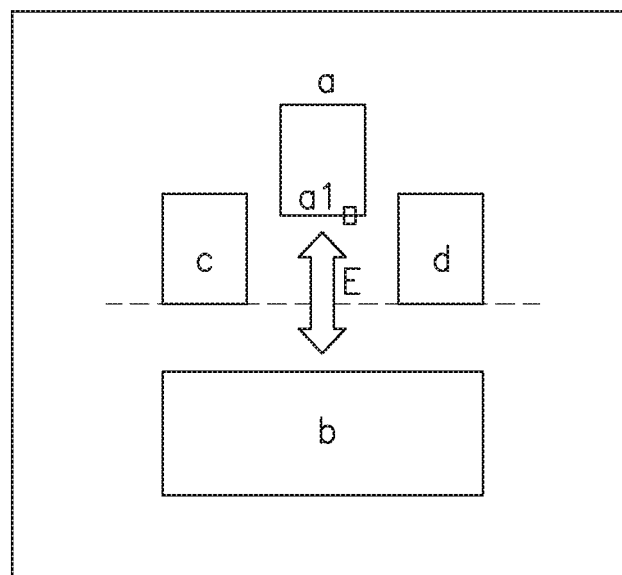
FIG. 33 is a schematic illustration of the use of a specific handle to modify the distance specified for an existing anchor.
Figure 33:
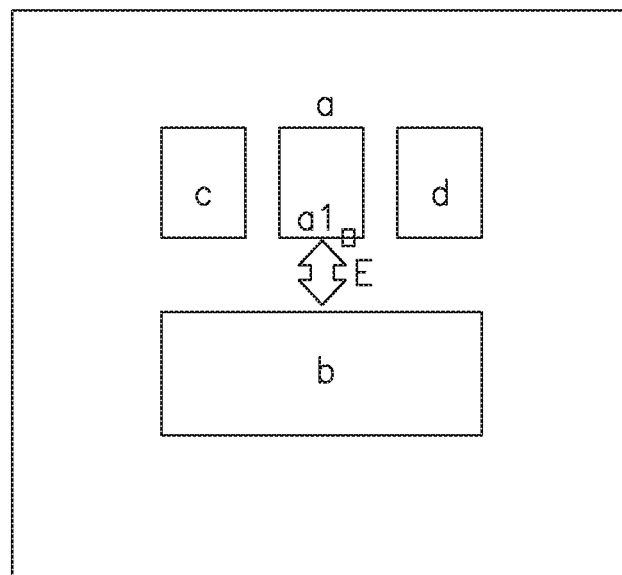

Reference is now made to FIG. 33 which illustrates two components [a] and [b] anchored together by anchor E so that moving component [a] downwards would also move component [b] down. The designer would like to move the lower edge a1 of component [a] to be aligned with the bottom edges of components [c] and [d] without affecting component [b].

Figure 34:
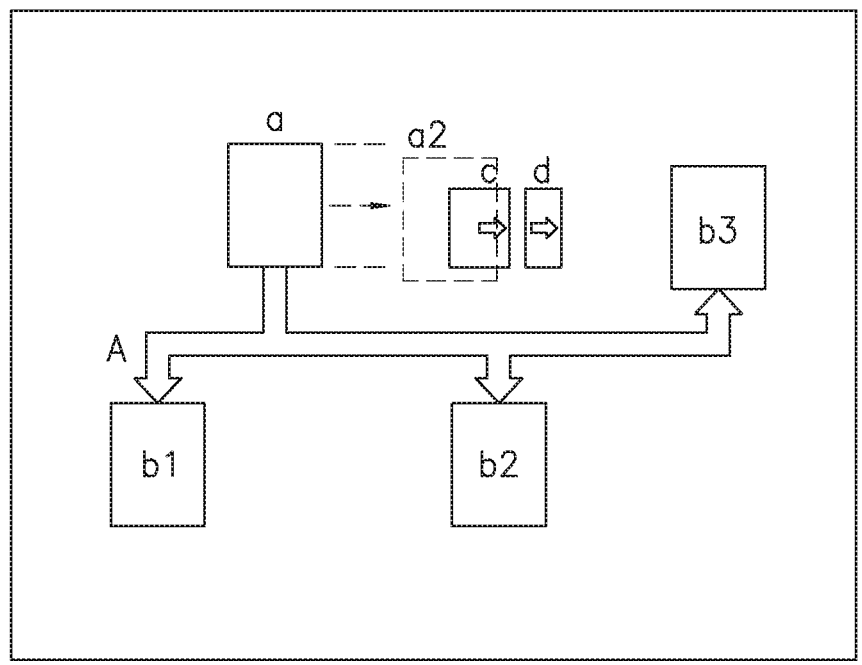
FIG. 34 is a schematic illustration of a specific handle to modify a complex, multi-component anchor.

Reference is now made to FIG. 34 which illustrates another example of a situation where the override of dynamic layout may be required. As is shown, component [a] is anchored to components [b1], [b2] and [b3] with anchor A. The designer would like to reposition component [a] to a new position (as shown by component [a2]) which differs in position both horizontally and vertically. The designer may also wish to keep anchor A intact without affecting or moving components [b1], [b2] and [b3] but may wish to move components [c] and [d] to the right.

It will be appreciated that often, a simple solution such as turning off dynamic layout during an editing session, does not provide a full solution to the range of exception to the rule scenarios, and many existing systems do not provide this turn off option. Another simple solution—that of removing the anchors attached to the given component, editing the component and re-creating the anchors—might be extremely difficult to implement or use. Furthermore, some of the anchors may be automatic or semi-automatic and may not have been created by the designer himself making it more complicated for the designer to remove and restore them. In addition, this solution may become very labor intensive once components start to have numerous anchors attached to them.

Figure 35:
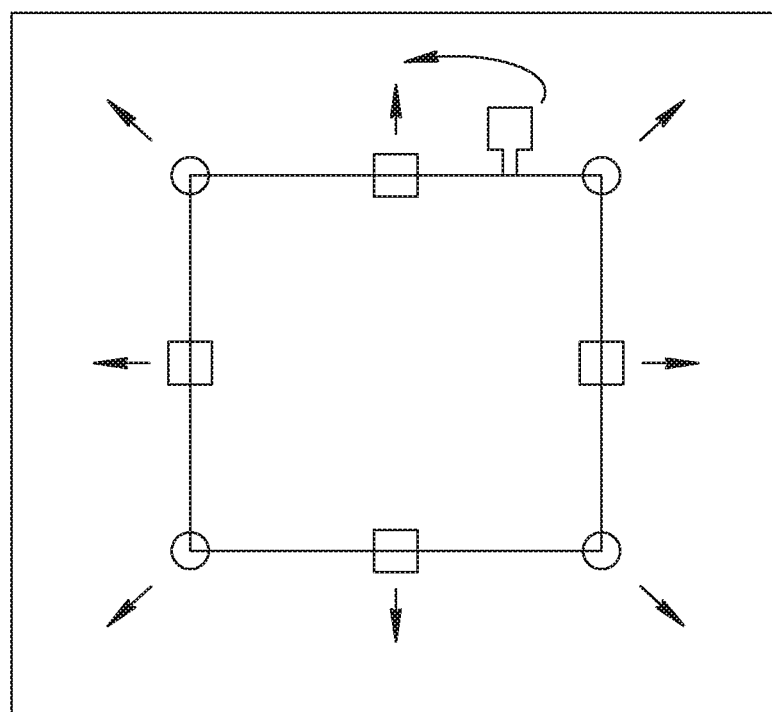
FIG. 35 is a schematic illustration of the use of adjustment handles for visual editing.
Figure 36:
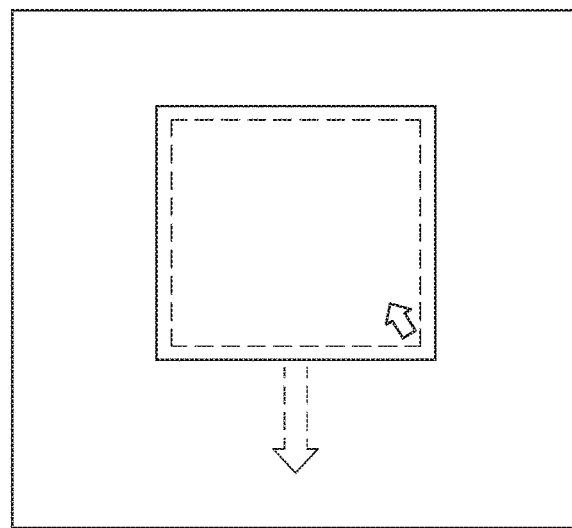
FIG. 36 is a schematic illustration of the use of the internal area of a component for position change.

It will also be appreciated that most visual design systems (and many other systems) use handles (also known as adjustment handles) as the main user interface device through which components are visually manipulated. Handles are typically provided in corners and/or edge centers of the components and allow for moving the components, resizing them and possibly rotating them as is illustrated in FIG. 35 to which reference is now made. Additional editing mechanisms may also be provided, such as (for example) a dialog box, which allow for direct setting of a components' geometrical properties (such as height and width). These actions (move, resize and rotate) may sometimes be achieved using the non-handle regions of the component. In particular, many systems known in the art may allow component resizing by dragging any part of a component edge (e.g. Microsoft Word table row and column resizing). Furthermore, many systems may allow a component to be moved by dragging any area inside the component as is illustrated in FIG. 36 to which reference is now made.

Applicant has realized that the use of multiple adaptable adjustment handles may be integrated with dynamic-layout rules to activate actions with different associated parameters. Applicant has further realized that this may be of particular use in situations in which a single operation (such as "move component") may have multiple, widely divergent semantics due to the use of multiple, parameterized dynamic layout rules, and the combination of explicit and automatic anchors.

Figure 37:
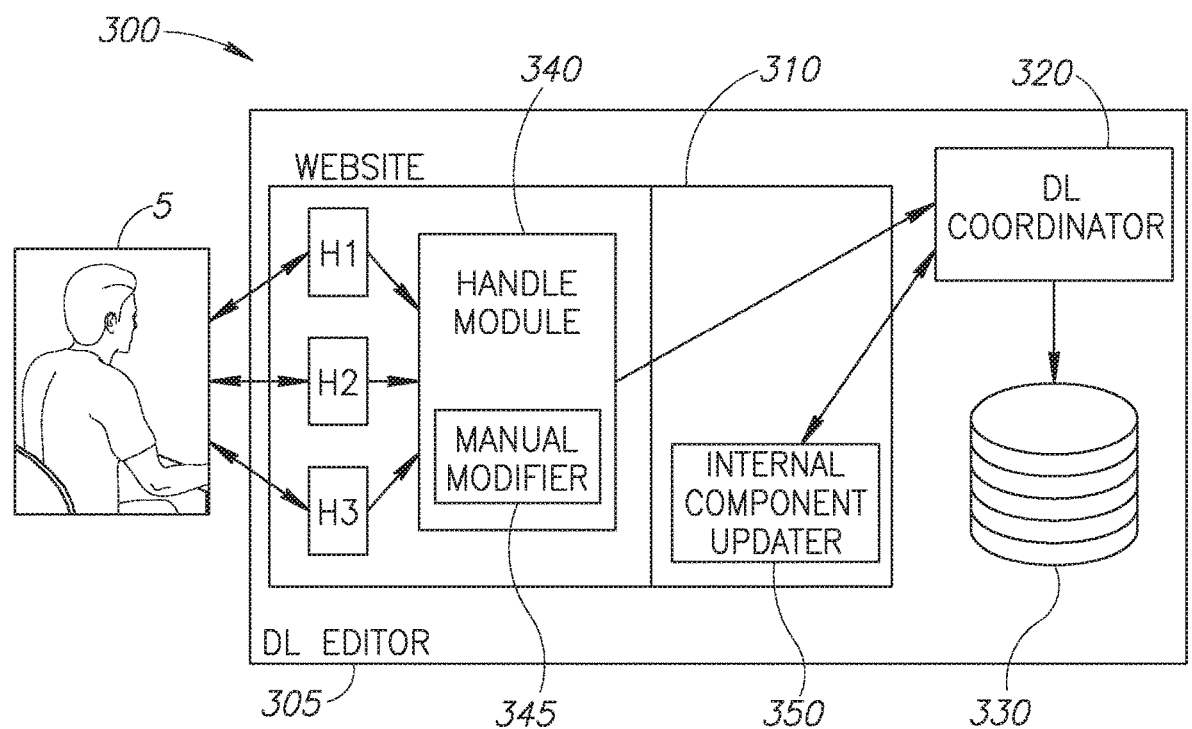
FIG. 37 is a schematic illustration of a system for using smart handles to trigger or to ignore dynamic layout rules for a particular component, constructed and operative in accordance with the present invention.

Reference is now made to FIG. 37 which illustrates a system 300 for using smart handles to trigger or to ignore dynamic layout rules for a particular component. For the sake of clarity, a web-based site editing system is used as an example of a visual design system. System 300 may comprise a dynamic layout editor 305 and a web site 310. Dynamic layout editor 305 may comprise a dynamic layout coordinator 320 and a database 330. Database 330 may hold the dynamic layout rules associated with website 310, as well as information about the components, their content and their arrangement. Web site 310 may comprise a handle module 340 and an internal component updater 350. Handle module 340 may comprise a manual modifier 345. It will be appreciated that website 310 may offer handles H1, H2 and H3 as part of its user interface to move and/or resize components. Handle module 340 may control the display of handles H1, H2 and H3 as well as interpret any changes made by a designer and/or a user to components via handles H1, H2 and H3. Manual modifier 345 may allow designer 5 to override the pre-defined display and/or functionality of handles H1, H2 and H3 as described in more detail herein below. It will be appreciated that system 300 may be installed locally or on a remote server accessed through a communication medium (as described in more detail herein below). For the sake of clarity, a system 300 installed locally is discussed.

User 5 may decide to manually adjust the size, shape or position of a particular component X using the available handles (H1, H2 and H3) provided by website 310 for component X. Handle module 340 may receive any changes made by user 5 using handles H1 and H2 and may pass this information to dynamic layout coordinator 320. It will be appreciated that a handle triggered event may include actions associated with a single handle or with multiple handles. Dynamic layout coordinator 320 may then check within database 330 to see if there are any dynamic layout rules pertinent to component X such as anchoring to a nearby component. Dynamic layout coordinator 320 may then inform internal component updater 350 of any pertinent changes to be made to component X and/or any other components. Internal component updater 350 may then execute the required adjustments. It will be appreciated that handle H3 may be a dynamic layout override handle and therefore may not trigger any visible dynamic layout activity but may still cause internal dynamic layout activity such as changing the length of an anchor etc. Handle H3 may therefore allow for a component to be moved or resized, without affecting any neighboring components.

It will be appreciated that there may be two possible conventions for using smart handles in conjunction with dynamic layout rules. The first is dynamic layout by default in which the regular adjustment handles provided for the components act as triggers for dynamic layout activity. Separate handles may also be provided that purposely bypass the dynamic layout triggering either completely or for specific anchors and/or rules. The second convention is no dynamic layout by default. In this scenario, regular handles do not trigger dynamic layout events and specific handles are provided that do trigger dynamic layout events. A combination of both conventions may also be used.

It will be further appreciated that a designer may differentiate between the various different handle types as discussed hereinabove using any type of visual attribute (such as shape, color or animation), their position on the edge component in question or via a pop up message or graphics symbol which may pop up as the mouse approaches the handle area. It will be also appreciated that handles may be invisible or virtual having different display methods such as using a specific area (internal or external to the actual component area) as a handle, using part of another control structure (such as the component boundary) to provide an additional handle function, and using another area or component element as above and having the area change some visual property upon mouse approach, mouse over or mouse click.

Figure 38:
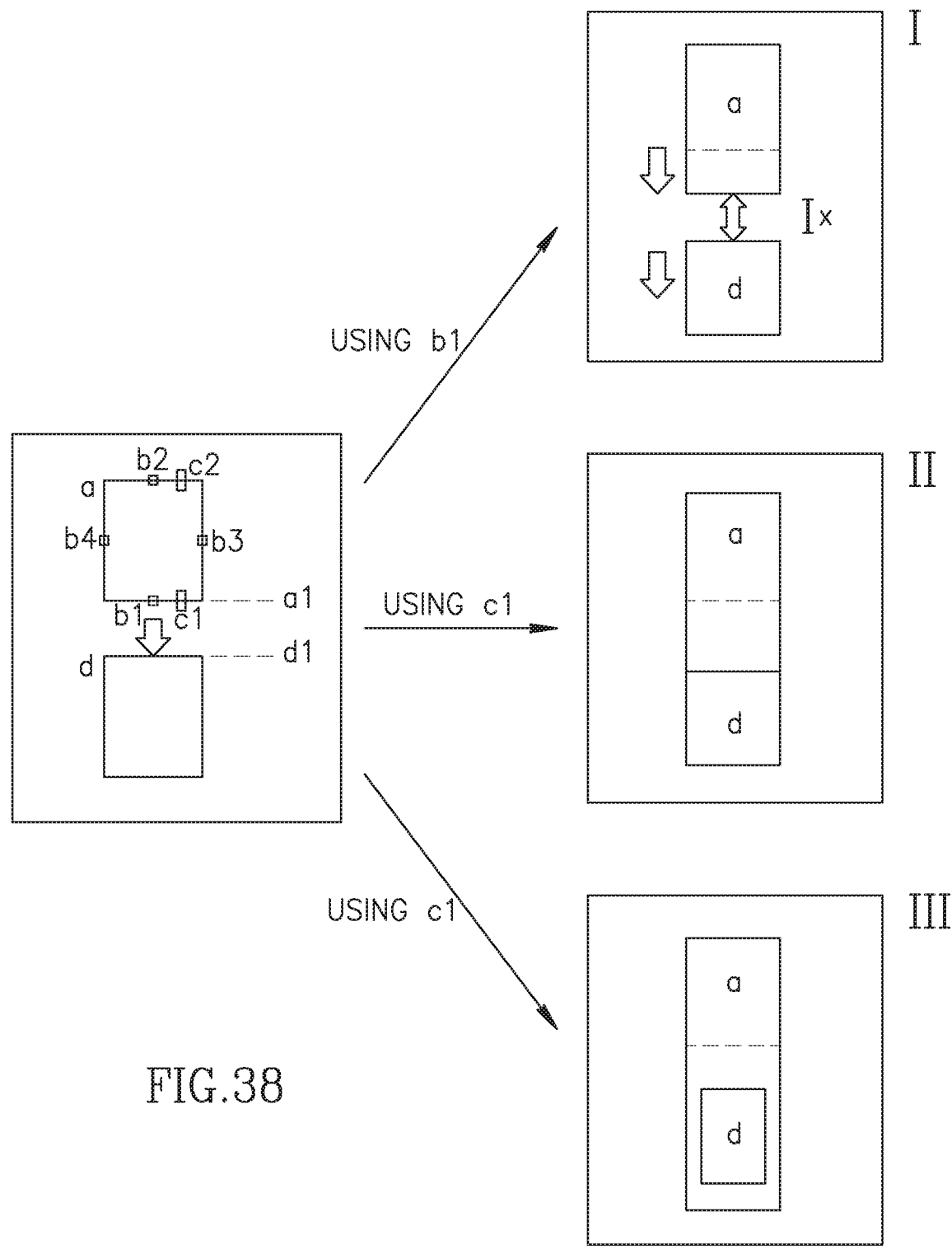
FIG. 38 is a schematic illustration of the use of multiple handles to enable or disable dynamic layout use for automatic anchoring, constructed and operative in accordance with the present invention.

It will be appreciated that visual editing systems typically provide specific handles for the main design functions such as moving and resizing. Therefore, in order to control an automatic anchor, a different handle may be provided for each desired function which may override any dynamic layout rules and be outside the rules. Reference is now made to FIG. 38 which illustrates an example of dynamic layout by default convention for automatic anchors. Component [a] has four regular sized handles b1 (down), b2 (up), b3 (right) and b4 (left). Component [a] may also have additional down/up dynamic layout override resize handles c1 (down) and c2 (up), which only appear in the specific directions in which dynamic layout is available i.e. where component [a] may have an automatic anchor. In scenario I, when component [a] is extended downwards, using regular handle b1, system 300 may be triggered, creating an automatic anchor between a1, the lower edge of component [a] and d1, the upper edge of component [d], once the distance between a1 and d1 becomes smaller than a threshold value x. When this happens, component [a] may push component [d] downwards to make space for the expansion of component [a]. In scenarios II and III, resize handle c1 is used instead of the regular handle b1, thus overriding any preset dynamic layout rules and allowing for component [d] to remain in the same position whether component [a] is resized downwards towards component [d] (scenario II) or overlaps component [d] completely (scenario III).

Figure 39:
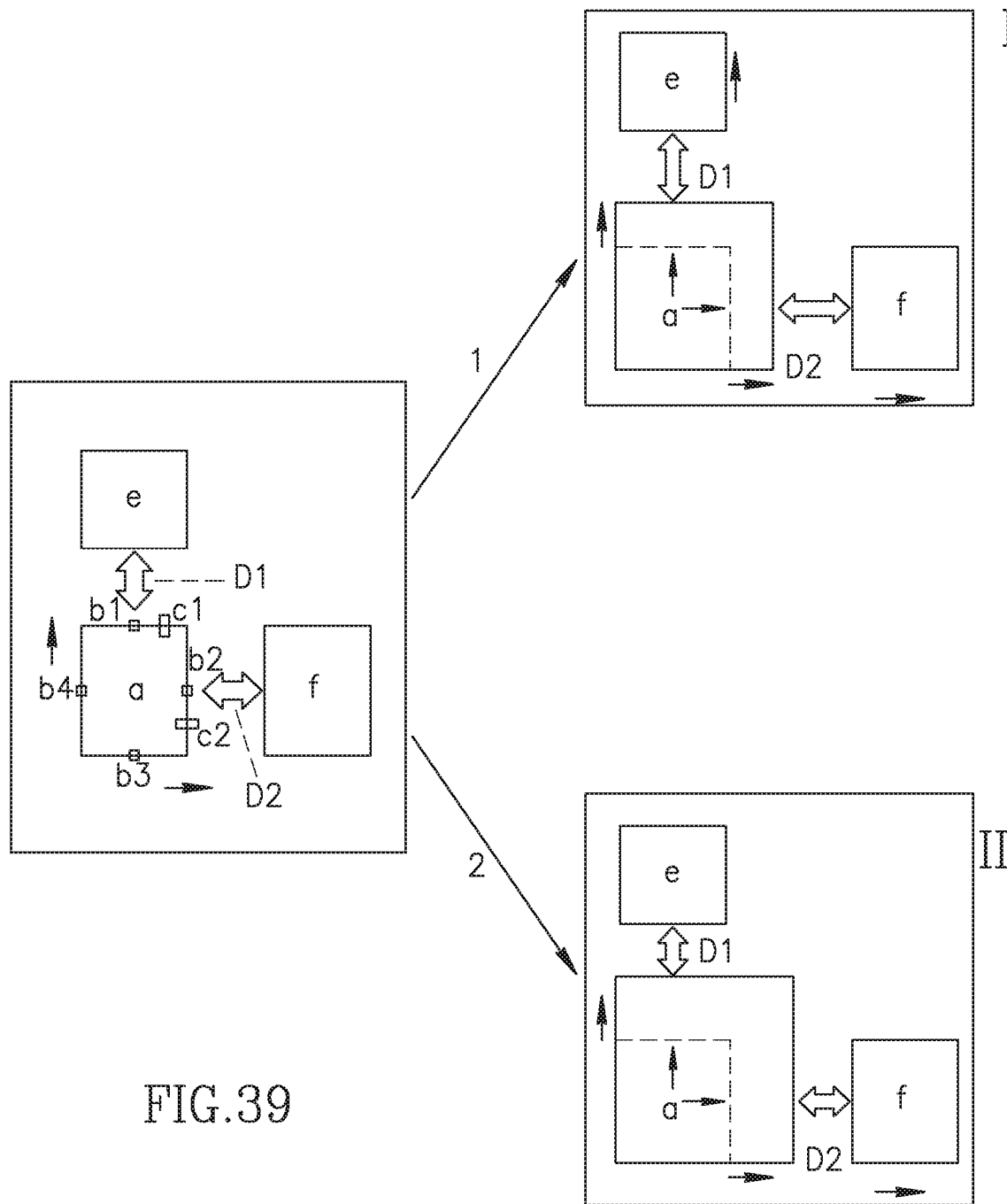
FIG. 39 is a schematic illustration of the use of multiple handles to enable or disable dynamic layout use for explicit anchoring, constructed and operative in accordance with the present invention.

Explicit anchors may be handled in a similar manner. It will be appreciated that explicit anchors are permanent until removed by the designer. The additional adjustment handles may only appear on the edges which have explicit anchors and not on the edges that do not. Reference is now made to FIG. 39 which illustrates an example of dynamic layout by default convention for explicit anchors. Component [a] has regular resize handles (b1, b2, b3, b4) on all four edges but has dynamic layout override resize handles c1 and c2 only on the top and right edges to which the explicit anchors are connected. In scenario I, a resize of component [a] upwards or to the right using handles b1 or b2, may activate explicit anchors D1 and D2 (respectively) and may move components [e] and [f] accordingly. In scenario II, a resize using handles c1 and c2 may resize component [a] without affecting components [e] and [f].

Figure 40:
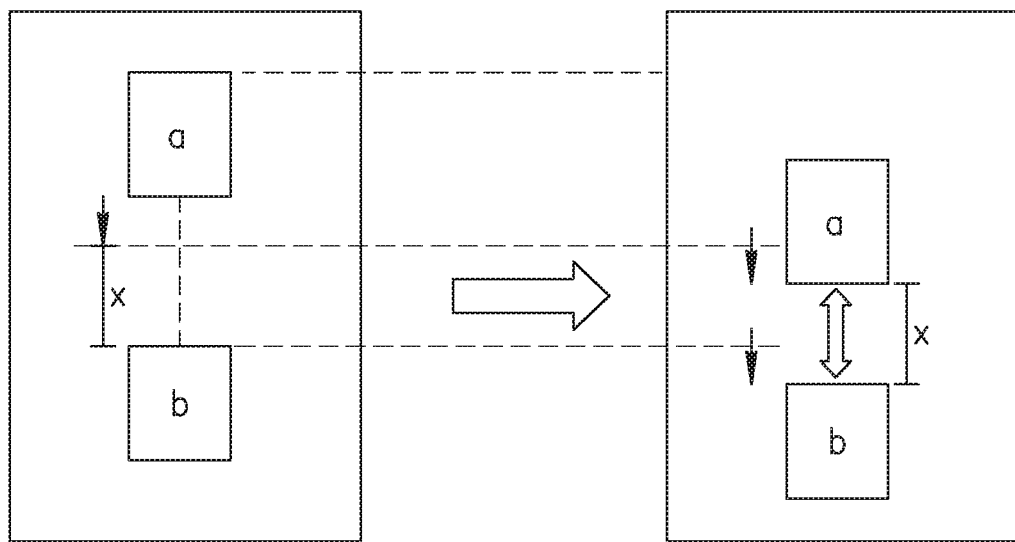
FIG. 40 is a schematic illustration of proximity-based automatic anchor creation, constructed and operative in accordance with the present invention.
Figure 41:
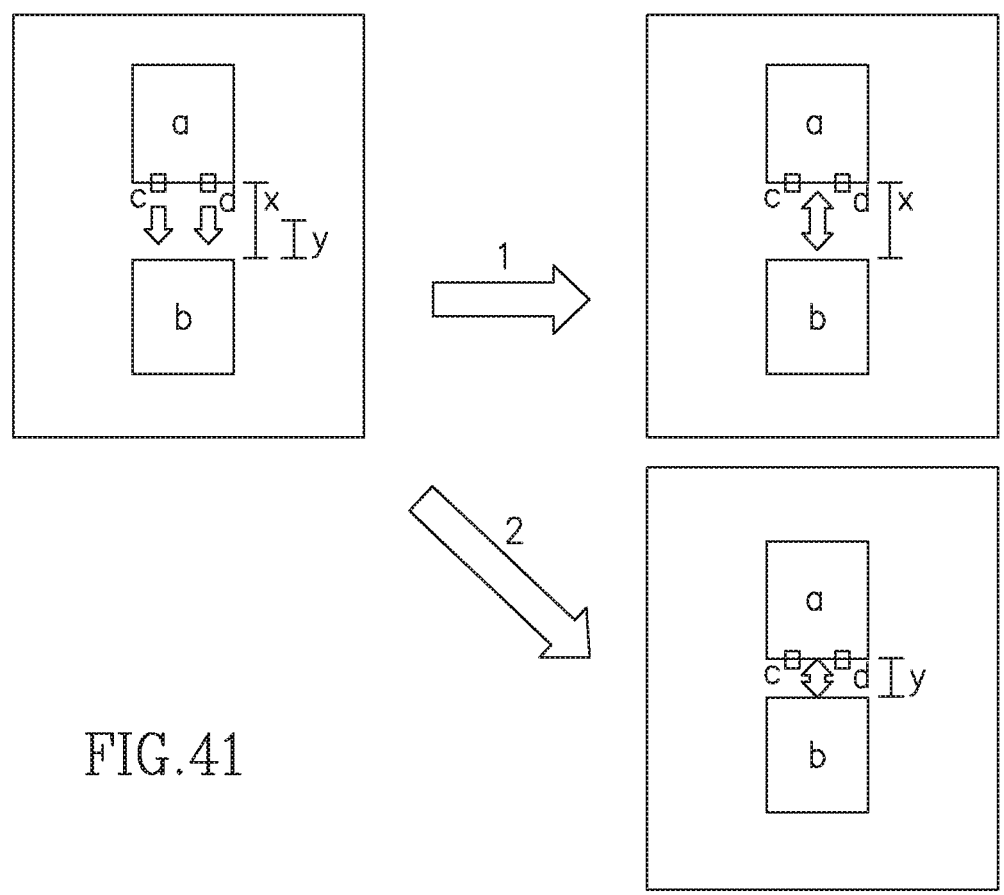
FIG. 41 a schematic illustration of the use of multiple handles to specify different proximity thresholds for proximity-based automatic anchor creation, constructed and operative in accordance with the present invention.

It will be appreciated, that website 310 may display multiple handles which may cause system 300 to use different parameters values for the same layout rules. Reference is now made to FIG. 40 which illustrates a dynamic layout rule in which component [a] is moved and reaches a distance of less than X pixels from component [b], creating an automatic anchor between components [a] and [b] and pushing component [b] downwards accordingly. However, website 310 may provide two different types of handles (c and d) for dealing with component [a] as is illustrated in FIG. 41 to which reference is now made. When handle c is used to move the bottom edge a1 of component [a] downwards as is illustrated in scenario I, the value of X is used as the distance threshold. Likewise, when handle d is used, the value of Y is used as the distance threshold. In this manner, the designer may move components around and enjoy the benefits of dynamic layout during editing and easily create area where components are densely situated amongst each other or are widely spaced apart. These may be achieved without having to switch between system modes, or perform multiple per-component or per anchor setting changes during editing.

It will be appreciated that different handles may be employed by website 310 to control whether dynamic layout rules are to be activated or not and that the rules themselves may vary from handle to handle. It will be further appreciated that handles may be assigned for specific rules or groups of rules. Handles may also be assigned which deactivate or override existing rules or groups of rules. It will be further appreciated that a user or designer may map handles to rules at different levels such as at the entire system level, at a specific application level (such as part of the application creation information) or even at page, container, component or component class level. Handles may also be automatically configured by system 300 via handle module 340 based on which rules are applicable to a particular component based on the type and position of the component within a page as well as according to existing anchors, nearby components or any other criteria. Handles may also be automatically configured based on the history of the use of rules and/or handle types by a specific user. For example, system 300 may provide rules for dynamic layout of horizontal edges and the dynamic layout of vertical edges. Two types of handles may be provided. The first type may allow the movement of a component while taking all rules into account including both horizontal edge and vertical edge anchors. The second type may allow the movement of a component while taking into account horizontal edge rules only and ignoring the vertical edge rules. Thus, a designer may move a component around, activating all relevant rules which affect horizontal edges and individually determining which vertical edge rules to use. The functionality of handles may also be reconfigured manually by designer 5 using a keyboard, mouse or touch screen. In this scenario, manual modifier 345 may override the pre-defined functionality for the pertinent handle as held in handle module 340.

Figure 42:
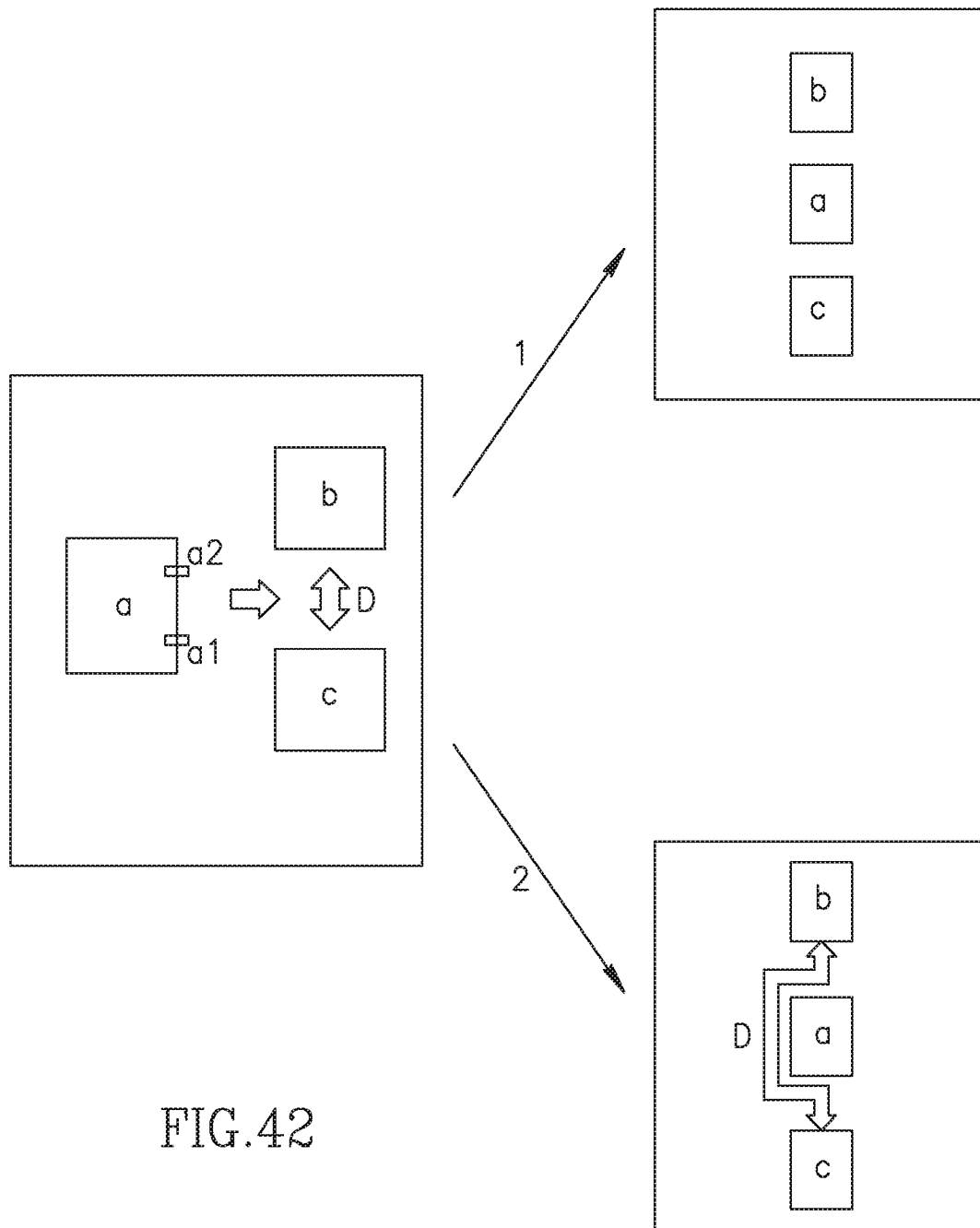
FIG. 42 is a schematic illustration of the use of multiple handles to control an explicit anchor breaking rule, constructed and operative in accordance with the present invention.

Reference is now made to FIG. 42 which represents a component [a] that has been moved between components [b] and [c]. Components [b] and [c] are anchored together by anchor D. In scenario I, component [a] is moved using handle a1, thus breaking anchor D. In scenario II, component [a] is moved using handle a2 and anchor D is not broken.

It will be appreciated that visual editing systems sometimes allow an end-user (rather than the designer) to perform limited layout editing operations by directly manipulating the size and/or the position of some of the components, thus requiring dynamic layout adjustment during run-time to compensate for user changes. It will be further appreciated, that website 310 may display different sets of handles to designers and end-users. For example, system 300 may provide handles which bypass dynamic layout (completely or just specific rules) for designer use and only regular dynamic layout handles to end-users. System 300 may provide handles to all components for designers and only to specific components for end-users. System 300 may also provide a set of handles with specific parameters to designers and a set of handles with different, more limiting parameters to end-users.

It will also be appreciated that if multiple adjustment handles are provided to a particular component, the visual overload may become too large, in particular for small components or small component edges which may have insufficient space for multiple handle attachment. One way of reducing the number of required handles may be through the use of multiple handle selection. In this mode of use, each handle may have a different specific function. The designer may desire to use the functions mapped to multiple handles and apply them to a single operation performed on the component such as moving or resizing it. This may be achieved by performing a multiple selection operation to perform multiple selection among the handles available on a given specific component or component edge. The use of multiple handle selection may allow (for example) three handles to represent seven different function combinations ($7=2^3-1$).

It will also be appreciated that the number of handles in use may be reduced by dynamically displaying only the most relevant handles. An example of this (as described herein above) is a resize handle which affects explicit anchors being displayed only for edges which have such explicit anchors. Other criteria may be used to reduce handle display such as handles displayed based on rules applicable for a given component based on the component type, position, neighboring components etc. Handles may also be displayed according to their history of use, for example handle types used more recently by a designer would have a higher priority than those rarely used. For all the above mentioned cases, a display priority may be assigned and only handles with the higher priorities are displayed.

An alternative method of reducing the number of handles displayed is the use of a mouse, keyboard or screen gestures in conjunction with the use of specific handles in order to move/remove them. Examples may include handle dragging while holding down a given keyboard key to change the handle's function and handle dragging while holding down a mouse key for a mouse equipped with additional control keys. Other examples may include but are not limited to dragging a component or edge using a touch screen and performing a preliminary click on any screen modifier area or button with the effect being either continuous (until pressed again) or limited to the predefined dynamic layout operation performed right after the preliminary click. It will be appreciated that manual modifier 345 may perform this manual override of the handle display parameters held in handle module 340.

It will be appreciated that the implementation of multiple handles may be performed using handle module 340 in conjunction with website 310. It will be appreciated that the handles may be created using the different definitions as in described hereinabove such as handles mapped to specific dynamic layout rules, handles which depend on the existence of specific anchor types, handles defined by the user and mapped to given dynamic layout rules and handles based on user handle use history. Handle module 340 may instruct website 310 to display all applicable handles. Handle module 340 may also instruct website 310 to display a narrower set of handles according to different priorities as described hereinabove. It will be appreciated that the display of handles may be suppressed altogether (for handles which are completely invisible or virtual) or may be conditional based on mouse position etc.

Figure 43:
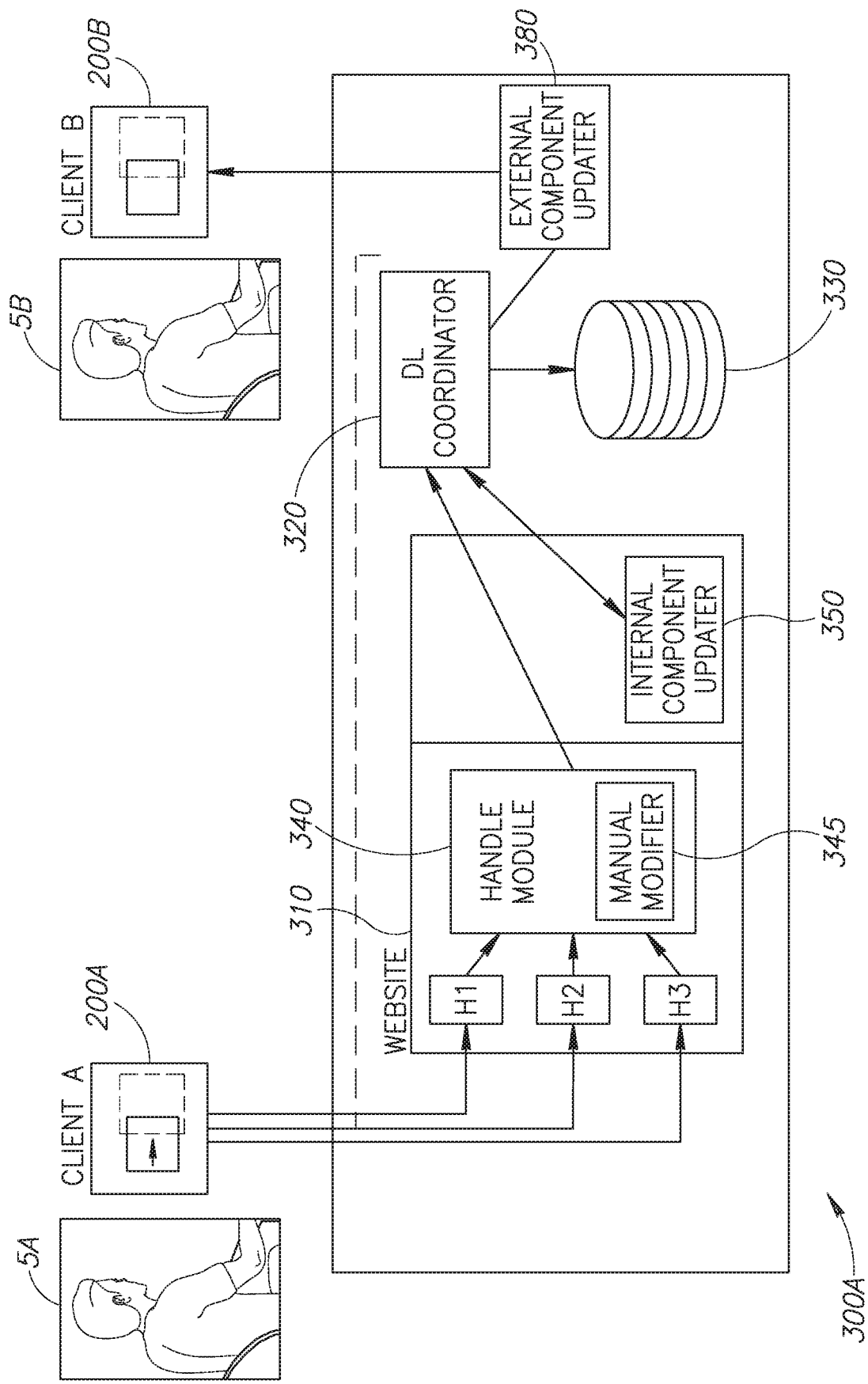
FIG. 43 is an alternative embodiment to the installation of the system of FIG. 37, constructed and operative in accordance with the present invention.

In an alternative embodiment to the present invention, system 300 may be installed on a remote server which may allow website 310 to be accessible to more than one user concurrently. It will be appreciated that user 5A working on client 200A may use handle H1 to trigger a dynamic layout event that may require not only an update for a particular component on his screen but also to the screen of client 200B which user 5B may be viewing. Reference is now made to FIG. 43 which illustrates system 300A, an alternative embodiment to system 300 for using smart handles to trigger or to ignore dynamic layout rules for a particular component. In this scenario it will be appreciated that dynamic layout coordinator 320, may instruct internal component updater 350 to update component X locally on client 200A and also instruct external component updater 380 to update component X displayed on client 200B. It will also be appreciated that system 300 may be integrated with a larger software system (such as Facebook) so as to provide a rich media application for editing, layout and display services inside that larger software system.

A rich media application may also be quite complex. As is known in the art, the design of such complex application may be performed though the use of templates or master pages, each of which is used as the basis for multiple similar regular application pages. This feature has many names in different systems, such as master, master page, template or master slide. It can be found in systems such PowerPoint or Visio commercially available from the Microsoft Corporation. These template pages may be known as master pages and the term regular pages to refer to the pages which not master pages themselves.

Some systems simply duplicate the master page into the newly created regular page at creation time, without establishing a persistent connection between the regular page and the master page. In these systems changes to the master page are not reflected in the regular pages created based on it. Other systems do establish such a persistent connection (which may be modified by the designer). In the later type of system, a master page may be modified and the changes are dynamically reflected in all pages which were created based on this master page (before or after the master page was modified). This persistent link is known as a page association, so that a given master page is associated with the regular pages which use it as a foundation, and these regular pages in turn are said to be associated with the master page used to create them.

Figure 44:
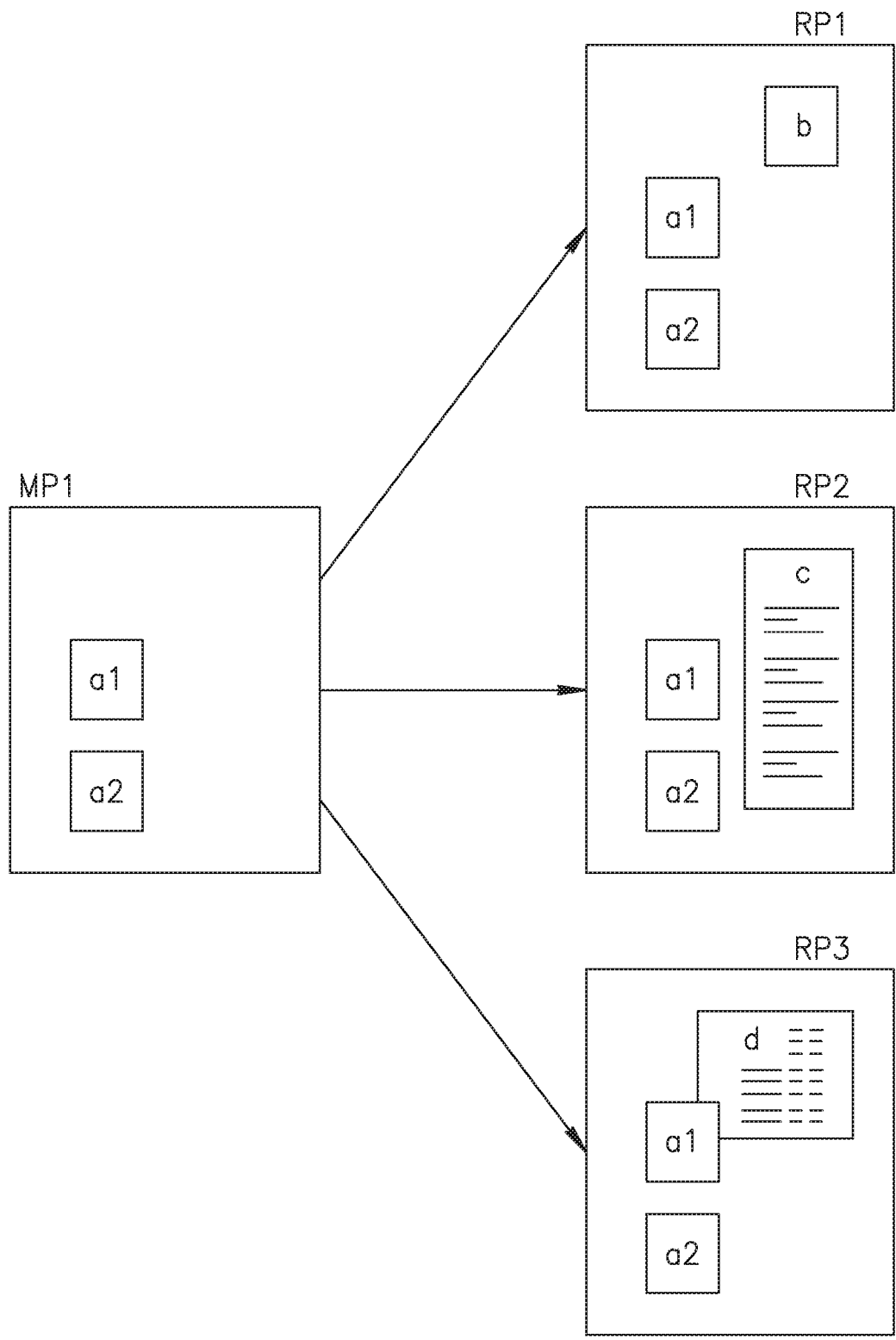
FIG. 44 is a schematic illustration of the association between master pages and regular pages.

Reference is now made to FIG. 44 which illustrates a master page MP1 which includes components [a1] and [a2] and is associated with the regular pages RP1, RP2 and RP3. All three regular pages display the master page components [a1] and [a2], as well as their own page-specific components [b], [c], [d] and [e].

Figure 45:
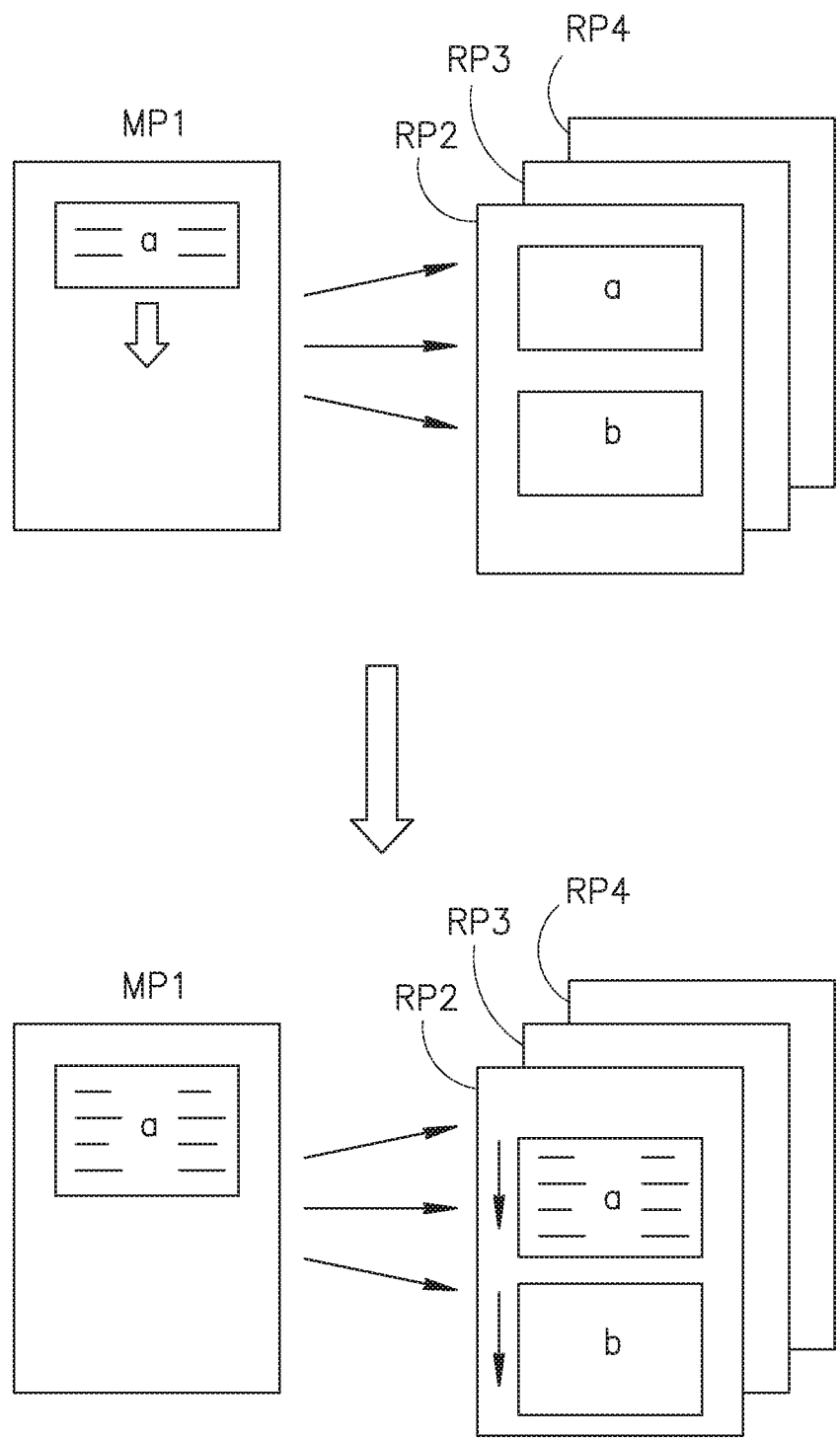
FIG. 45 is a schematic illustration of the use of associated pages and standalone pages.

Applicant has realized that for existing visual design systems, it is often difficult for a designer to visualize the effects that changes to a master page may have on the various regular pages associated with it. This often requires numerous page switching operations in the design environment, or the opening of numerous windows. Reference is now made to FIG. 45 which illustrates a typical page setup in which the various components of the various pages are arranged so that the components residing in the master page (and thus displayed on all associated regular pages) form a common top, bottom or side menu, whereas the specific regular page components are located in the middle section. As is shown, component [a] is located towards the top of the page on MP1 as well as on all associated regular pages RP2, RP3 and RP4. Component [b], specific to page RP2 only is located in the middle of page RP2 only. Therefore, if component [a] is, for example, moved downwards, it may be desirable to move component [b] downwards as well. In this scenario, the designer would not only have to work with page P1, he would also have to work with page P2 separately.

Applicant has further realized that a system that allows the simultaneous editing of master pages and their associated regular pages may also be integrated with dynamic layout principles to improve the flexibility of design and allow changes in regular pages to affect the way the master page components are displayed and vice versa.

Figure 46A:
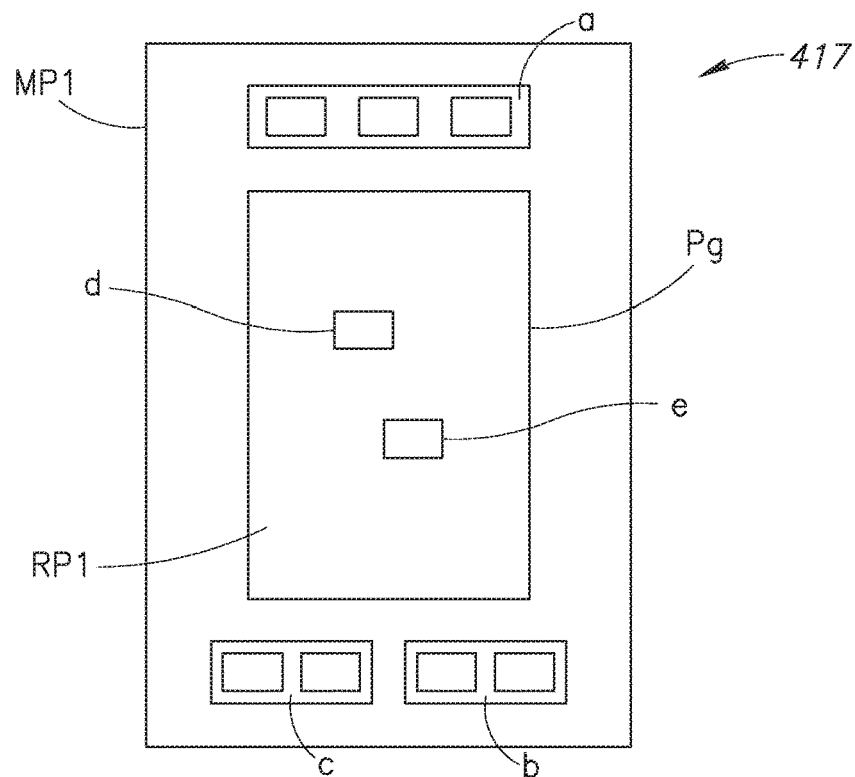
FIGS. 46A and 46B are schematic illustrations of composite pages, constructed and operative in accordance with the present invention.
Figure 46B:
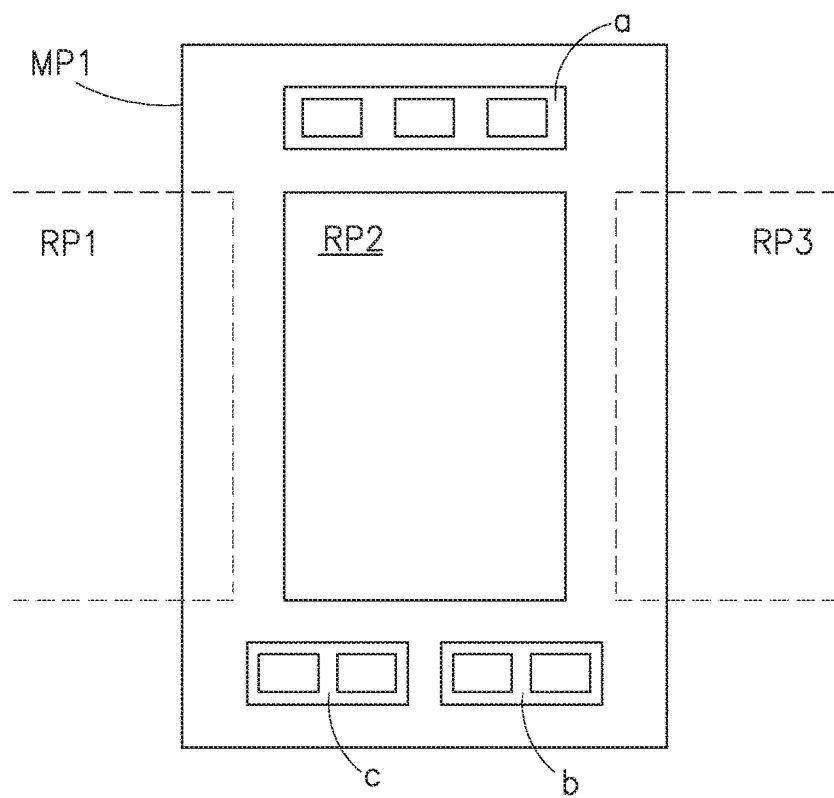

Reference is now made to FIGS. 46A and 46B which illustrate a composite page 417 in accordance with an embodiment of the present invention. Composite page 417 may comprise a master page MP1 and one or more regular pages RP2. Master page MP1 may further comprise of master page components [a], [b] and [c] and a page group component [pg]. Regular page RP1 may comprise regular page components [d] and [e]. It will further be appreciated that page group component [pg] may be likened to a form of place holder, holding a single associated regular page at any one time during run time, but with the ability to change the current regular page as is illustrated in FIG. 46B (described in more detail herein below). Master page MP1 may have three regular pages associated with it—RP1, RP2 and RP3. It will be appreciated that master page MP1 components [a], [b] and [c] may be displayed on all the corresponding regular pages RP1, RP2 and RP3. It will be further appreciated that in general, all master page components may be positioned above page group component [pg] (such as component [a]), below page group component [pg] (such as components [b] and [c]), to the side of page group component [pg] or overlapping page group component [pg]. A master page component that overlaps page group component [pg] is not logically contained in page group component [pg], but is merely considered to geometrically overlap page group component [pg]. Since the master page components [a], [b] and [c] are common to pages RP1, RP2 and RP3, it will be appreciated that during editing mode, a designer may be able to toggle between the three different regular pages, each time viewing the page together with MP1 for easy simultaneous editing of the pages as described in more detail herein below.

Figure 47:
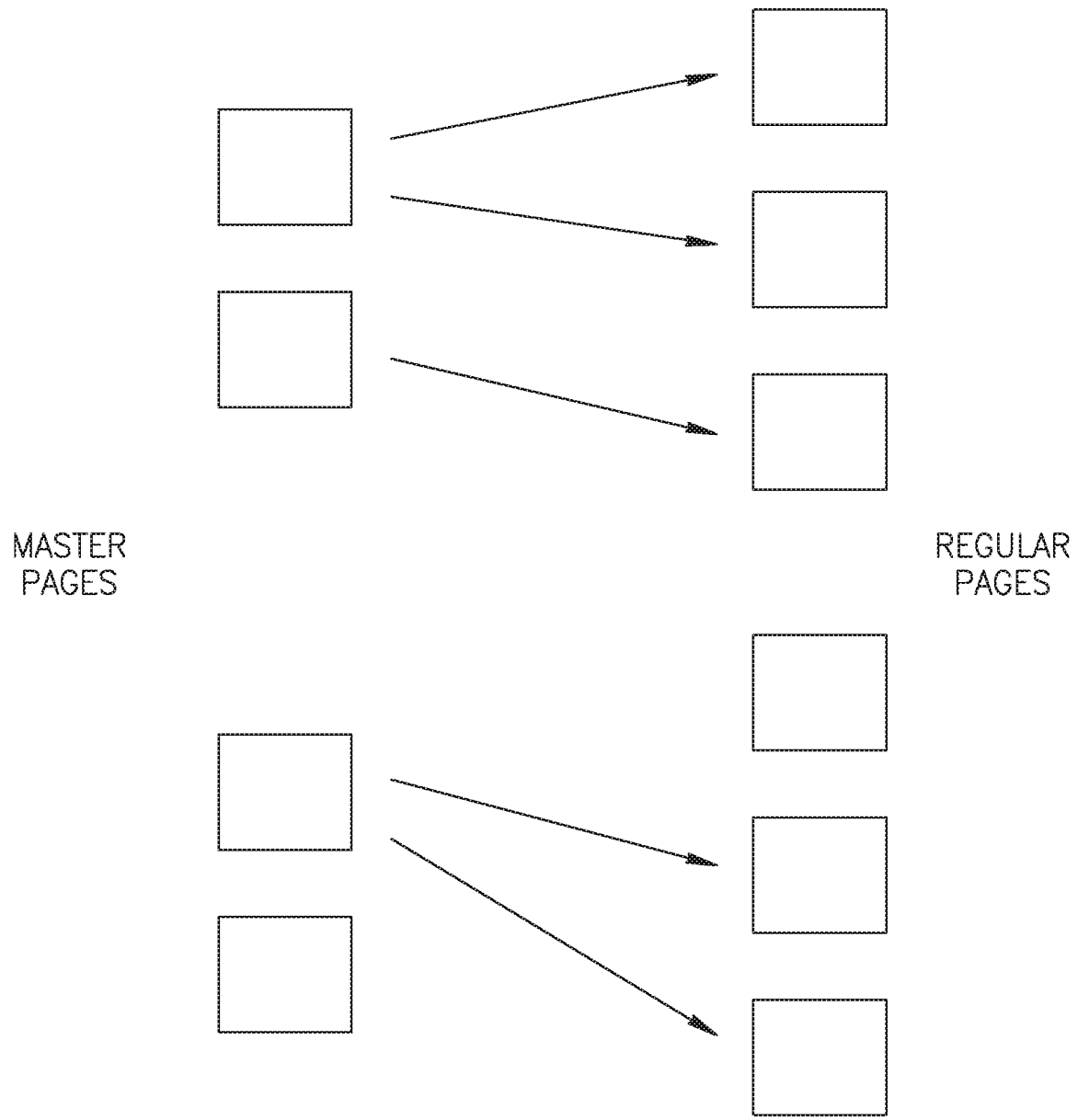
FIG. 47 is a schematic illustration of the bipartite nature of the page associations, constructed and operative in accordance with the present invention.

It will be appreciated that a regular page may be associated with a master page or with no master page at all (known as a standalone regular page). It will also be appreciated that a single master page may be associated with multiple regular pages or with no regular pages at all (known as a standalone master page). This association may be represented by a bipartite graph as is illustrated in FIG. 47 to which reference is now made. Master pages may not be associated with other master pages and regular pages may not be associated with other regular pages.

Figure 48:
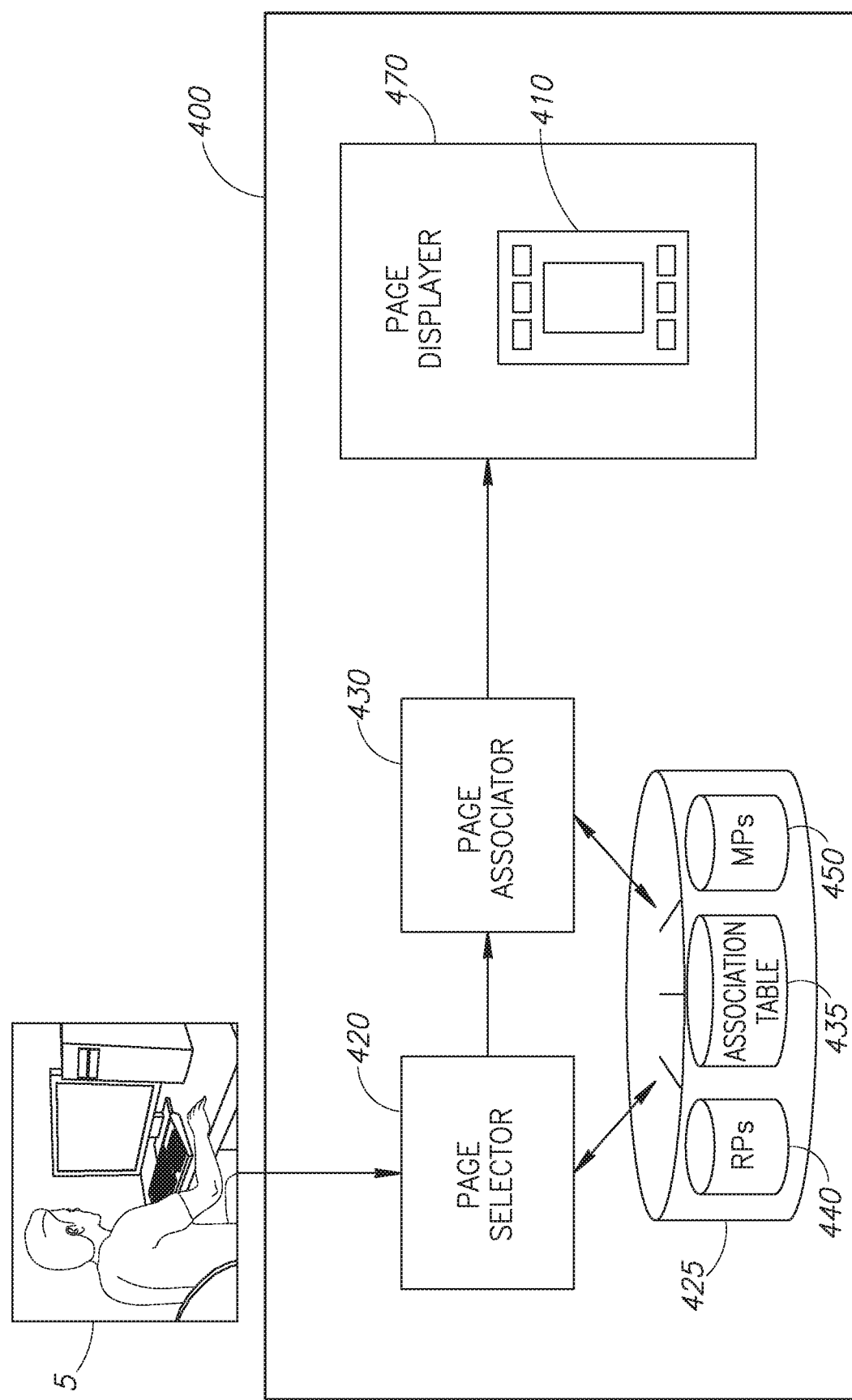
FIG. 48 is a schematic illustration of a website editor for the association of master pages and regular pages and their display, constructed and operative in accordance with the present invention.

It will be appreciated that all associations between master pages and regular pages may be created, modified and removed by a designer. Reference is now made to FIG. 48 which illustrates a website editor 400 for the association of master pages and regular pages and their display, in accordance with an embodiment of the present invention. Editor 400 comprises a page selector 420, a page associator 430, a database 425 and composite page displayer 470. Database 425 comprises a regular page sub-database 440, a master page sub-data base 450 and an association table 435. Designer 5, through a suitable user interface in conjunction with editor 400, may use page selector 420 to select a single master page from master page sub-database 450 and any number of regular pages from regular page sub-database 440. Once the selection has been made, page associator 430 may associate and combine the chosen pages to create composite page 417 saving the pertinent associations in association table 435. It will be appreciated that page associator 430 may geometrically map the regular page components from the page area assigned to the regular page to the group page component. This mapping may be done according to page width and since the various regular pages may have different heights (due to components extending downwards, different page y-values etc.) the page group component is appropriately re-sized. Dynamic layout may also be triggered at this stage (as described in more detail herein below). Displayer 470 may then display composite page 417 accordingly (i.e. a master page with an associated regular page). Page displayer 470 may also display the combined components of composite page 417 according to the pertinent editing mode as is described in more detail herein below.

It will be appreciated that when displayer 470 loads a particular master page for the first time, displayer 470 may look up the associated regular pages for the pertinent master page from association table 435 and may display the first (page-order wise) regular page. If displayer 470 loads the master page after stepping through its various regular pages, the current regular page is loaded. It will also be appreciated, that if displayer 470 loads a regular page, displayer 470 may automatically load the associated master page.

It will be appreciated that editor 400 may be a software component running on a local computing device. The software may be a pre-installed application, a dynamically downloaded application (such as a Flash application) or a browser based application (which may run inside the browser using technologies such as HTML5 and JavaScript. Editor 400 may also be installed on a remote server (as described in more detail herein below). It will be further appreciated that hardware may range from a personal or tablet computer to a mobile communication device.

Figure 49:
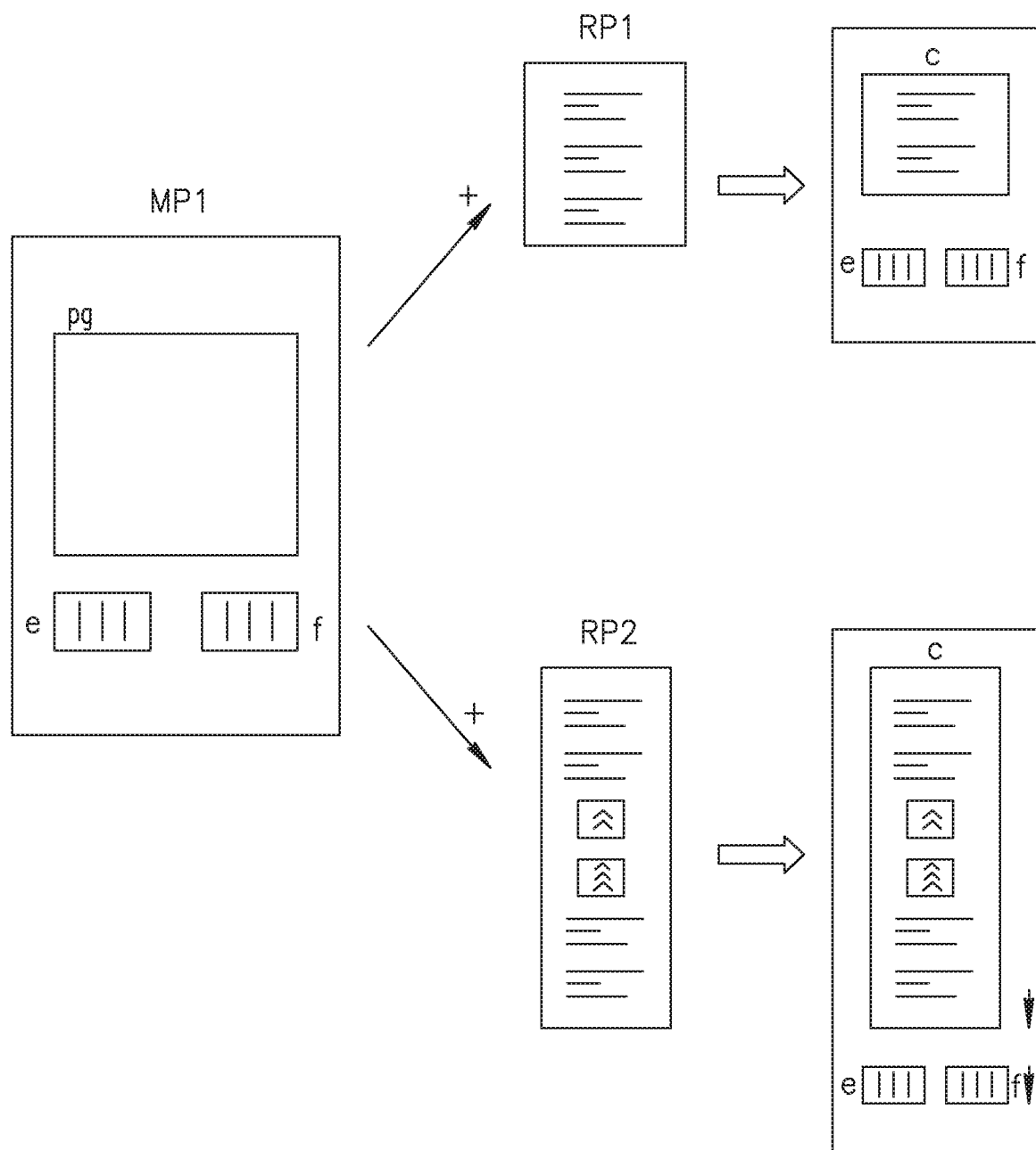
FIG. 49 is a schematic illustration of dynamic layout use in conjunction with multiple regular pages in the same page group component, constructed and operative in accordance with the present invention.

As discussed herein above, dynamic layout principles may be applied to editor 400 to move and resize components when needed as a result of the master page/regular page association. This is typically required when the same master page is associated with multiple regular pages, since different multiple regular pages (which may all reside in the same page group component) may have different sizes and therefore occupy different amounts of space. Therefore, the pertinent page group component may need to be resized/moved each time to accommodate the pertinent regular page in use. This resizing may require the resizing/movement of the master page components as is illustrated in FIG. 49 to which reference is now made. Master page MP1 may comprise of page group component [pg] and components [e] and [f]. When master page MP1 is used in conjunction with regular page RP1, page group component [pg] is displayed using its original size. When master page MP1 is used in conjunction with regular page RP2 (which extends further than RP1), page group component [pg] is automatically extended downwards as are components [e] and [f] if an appropriate dynamic layout association has been defined between the pertinent components.

Figure 50:
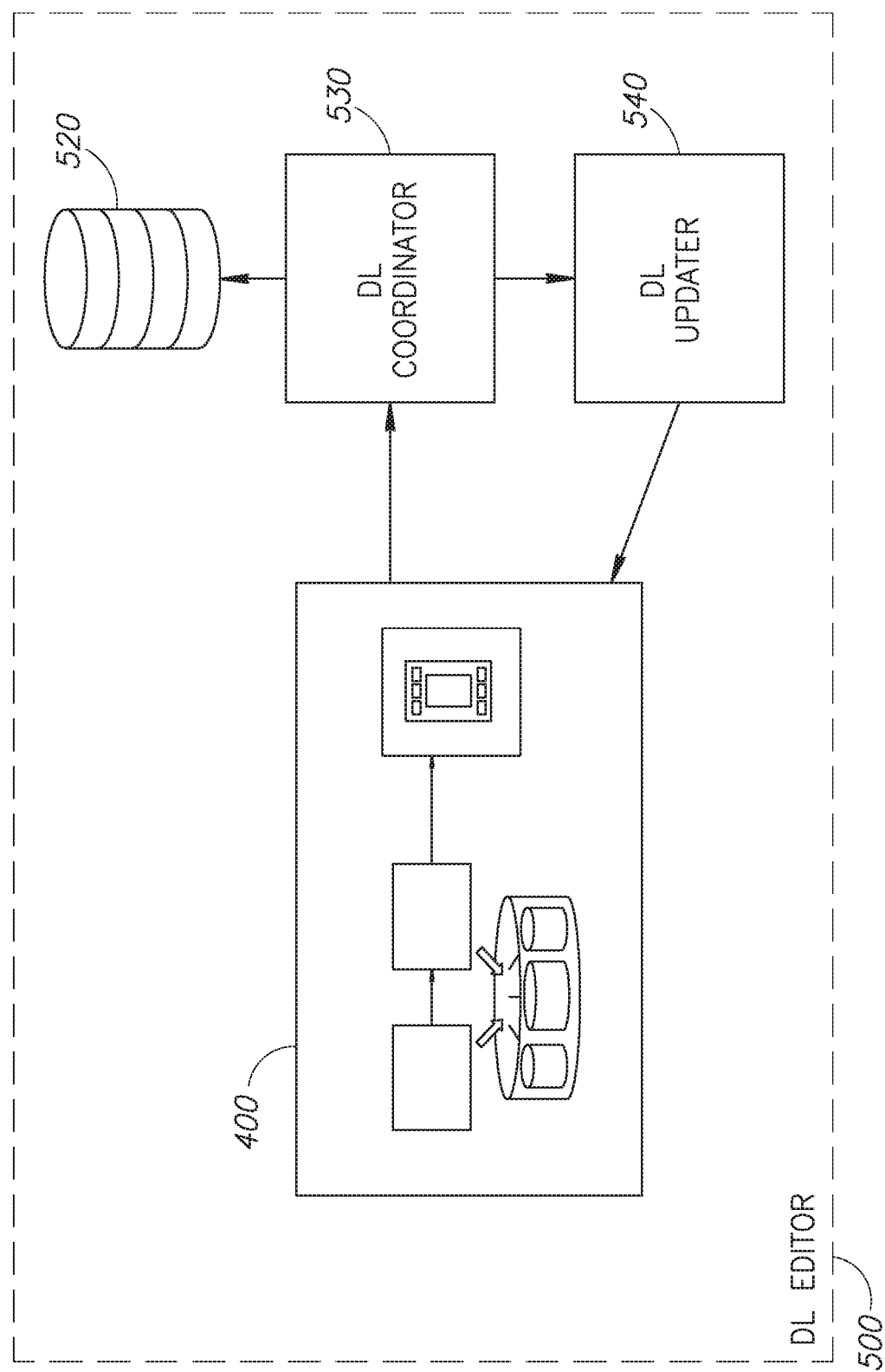
FIG. 50 is a schematic illustration of the use editor of FIG. 48 in conjunction with a dynamic layout editor.

Reference is now made to FIG. 50, which illustrates the implementation of editor 400 in conjunction with a dynamic layout editor 500. Dynamic layout editor 500 may comprise a dynamic layout database 520, a dynamic layout coordinator 530 and a dynamic layout updater 540. It will be appreciated that these elements are functionally similar to those described hereinabove.

It will be appreciated that page displayer 470 may display composite page 417 via different modes—end-user mode, master page editing mode and regular page editing mode. It will further be appreciated that the general view of composite page 417 is the master page together with a pertinent regular page. It will be appreciated that for all three types of modes, the master page is presented with the pertinent regular page displayed in the page group component. The components from both the master page and the regular page are all displayed based on their regular z-order and overlap handling conventions used by the pertinent website.

It will also be appreciated that an end-user may view a standalone regular page which will be shown as it was defined and may be mapped to the viewing screen according to its own page boundaries. An end user may not view a master page by itself, only by viewing a regular page associated with it as is described herein above. Thus, a standalone master page is only useful as a placeholder for the designer (e.g. to be used for associating future regular pages), since the end-user cannot access them. It will also be appreciated that in end-user mode, the end-user is not made aware of the differences between master page and regular page components. Thus, all special manipulation handles, tooltips and other user interface elements (discussed in more details herein below) do not appear in this mode.

Figure 51:
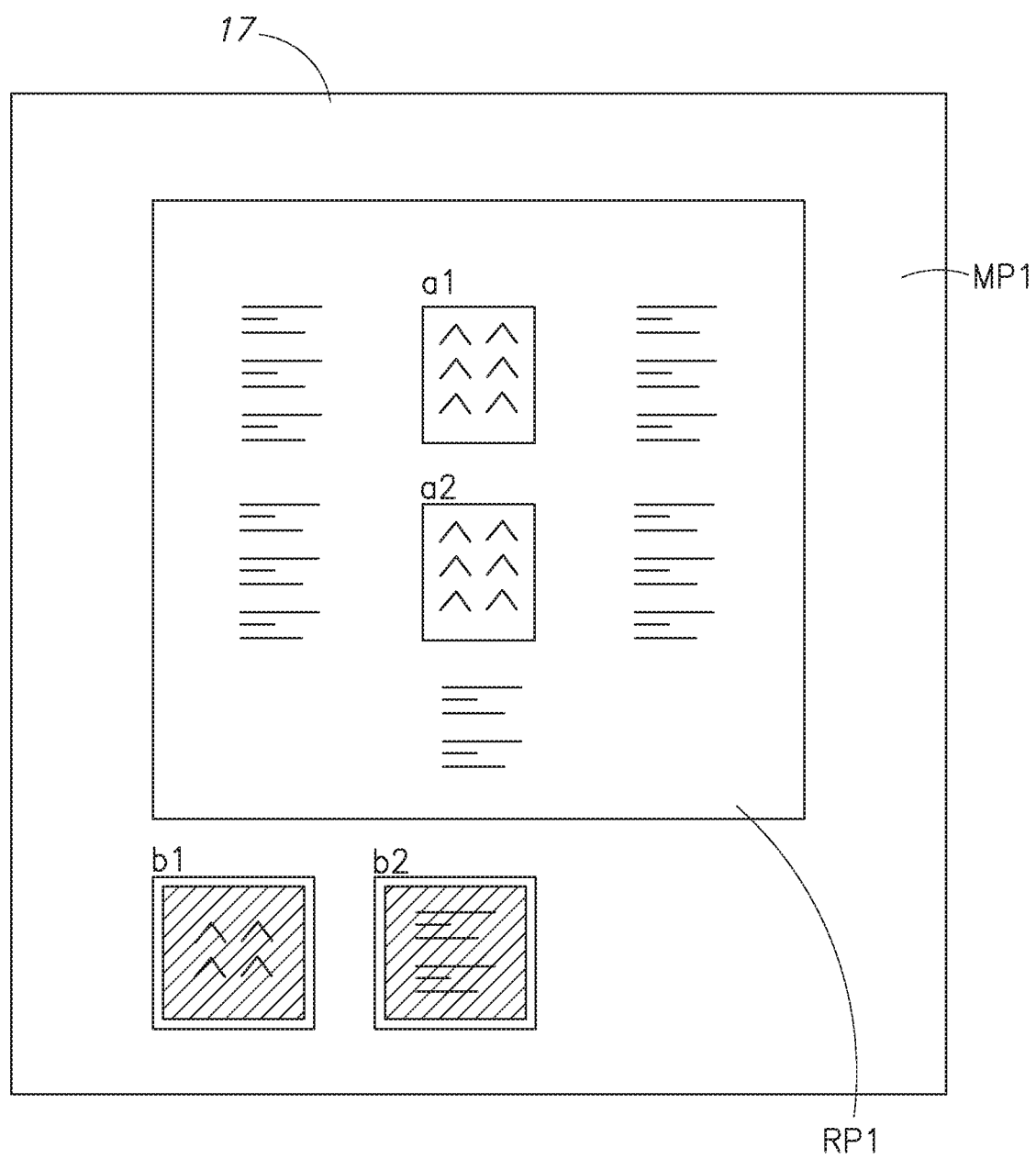
FIG. 51 is a schematic illustration of the shading of master page components in regular page editing mode, constructed and operative in accordance with the present invention.

As discussed herein above, another display mode is regular page editing mode. This is the mode used to edit the entire composite page 417 (comprising a master page and a regular page), while focusing on the details and the components of the specific regular page. In this mode, page displayer 470 may display the pertinent composite page 417, thus displaying all the combined components. The regular page components may be displayed normally while the master page components are displayed with some form of visual marking to distinguish them. This visual marking may be a specific color, an added visual marking such as an extra frame, an alteration to the display style of the component such as a specific type of frame style, an animation or any of the above attributes which may be activated during editing when the designer's mouse approaches the component. Reference is now made to FIG. 51 which illustrates a composite page 417 comprising of master page MP1 and regular page RP1. Components [a1] and [a2] belonging to regular page RP1 are displayed normally, whereas components [b1] and [b2] belonging to master page MP1 are shaded to distinguish between them.

It will be appreciated that this display of visual marking may be defined by designer 5 or may be assigned by page displayer 470 (page displayer 470 recognizing which components belong to master page MP1 and which components belong regular page RP1). It will be further appreciated that the selection of type and intensity of visual marking may be automatically assigned to provide the biggest contrast between the two sets of components. It will be appreciated that the parameters for the assigned visual marking may be saved together with the pertinent pages in the pertinent database. Thus designer 5 may easily distinguish between the different sets of components while editing a large set of regular pages.

It will also be appreciated that master page editing mode may be used to edit composite page 417, while focusing on the details and the components of the specific master page. In this mode, the master page components are shown normally and the regular page components are displayed with some form of visual marking as is described hereinabove. It will be appreciated that the master page may be standalone or may be associated with one or more regular pages. For the latter case, the first regular page may be displayed automatically within the page component when the master page is initially edited.

It will be appreciated that for both editing modes, dynamic layout processing may also occur in order to preserve the page arrangement and relationship between the regular page components and the master page components.

It will be further appreciated that page displayer 470 may define additional modes of display such as a thumbnail mode in which multiple regular pages RP1 are visible at any one time. Displayer 470 may also extend or limit access to these modes such as allowing end-users a limited use of the regular page editing mode (to modify the application they are using), or allowing only specific (senior) designers to use the master page editing mode while limiting most designers to edit only the regular pages and their components.

It will also be appreciated that a designer may switch between master page editing mode and regular page editing mode without having to exit or switch editing session. In this manner, while editing composite page 417, designer 5 may edit either the regular page itself or the associated underlying master page, while continuing to view the same components. It will be appreciated that the mode switch may be affected though a user interface element which may toggle between the modes. Alternatively, the modes may be switched when a mouse gesture is performed on a component or area which "belongs to the opposite" mode. For example, when the designer is using master page editing mode, he may click on the page component or any of the regular page components and switch to regular page editing mode. It will be appreciated, that when switching between the two modes, the display remains the same except for the use of the visual markings to differentiate between the two sets of components.

Figure 52:
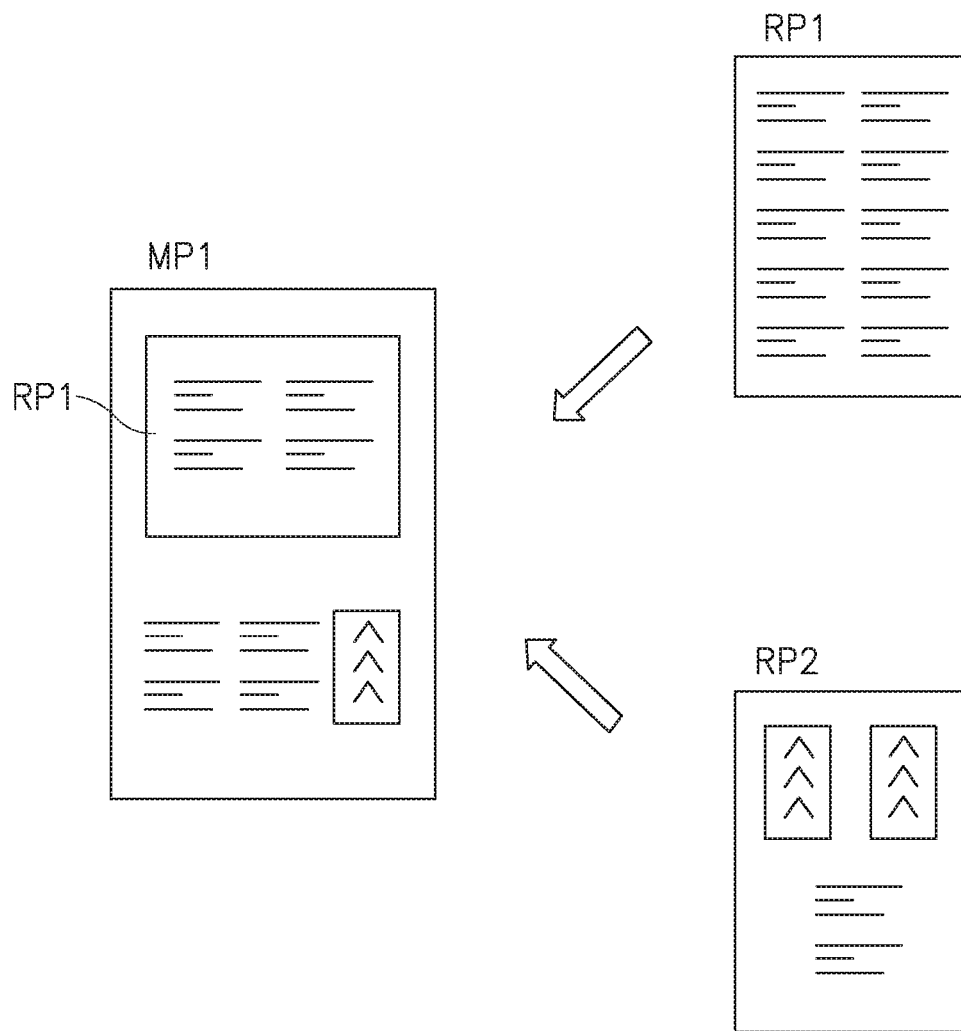
FIG. 52 is a schematic illustration of the flow of editing sessions when editing multiple regular pages, constructed and operative in accordance with the present invention.
Figure 53A:
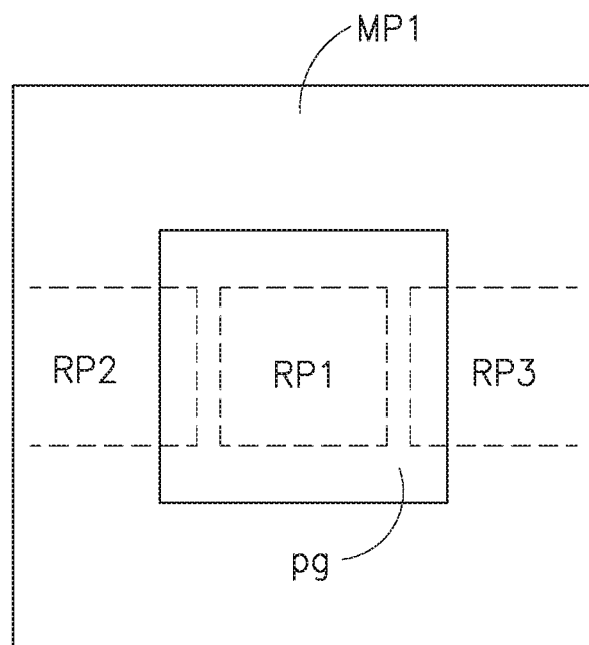
FIGS. 53A and 53B are schematic illustrations of the visual regular page menu design; constructed and operative in accordance with the present invention.
Figure 53B:
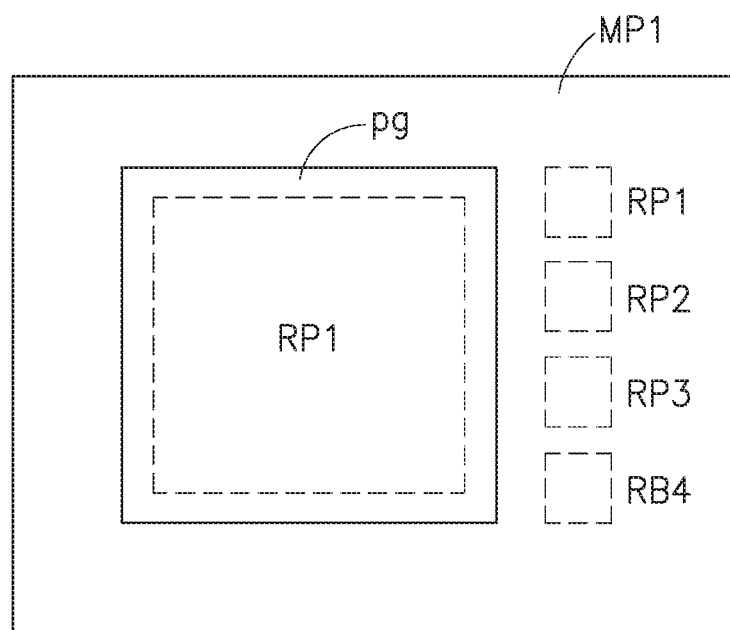

As described herein above, designer 5 may typically view a composite page 417 consisting of a master page with an associated regular page displayed within the page group component (in both master page editing mode or regular page editing mode). Reference is now made to FIG. 52 which illustrates two regular pages RP1 and RP2 both associated with master page RP1. Designer 5 working with master page MP1 together with regular page RP1 may wish to continue edit master page MP1 in conjunction with regular page RP2 instead. To facilitate this, page displayer 470 may allow switching or flipping between the two regular pages RP1 and RP2. It will be appreciated that regular pages may be typically ordered according to their order as pages in the application. The switching may be done instantly (i.e. the new regular page replaces the existing page instantly) or by using some form of transition effect (such as slide aside or dissolve) as is illustrated in FIG. 53A to which reference is now made. Regular pages RP1, RP2 and RP3 may interchanged by "sliding" them through the page component [pg]. It will also be appreciated that page displayer 470 may also display a visual menu showing ghost and or/thumbnail images of the pertinent regular pages so that the designer may pick a pertinent regular page RP1 for display with its master page MP1 as is illustrated in FIG. 53B to which reference is now made.

As discussed herein above, switching between different regular pages may trigger a dynamic layout mechanism to move and resize the page group container as well as other master page components in order to maintain the existing page structure. Furthermore, if the switching is performed using a transition that may take time, page displayer 470 may display the component changes caused by the dynamic layout process using animation (i.e. the pertinent components move gradually).

It will also be appreciated that it is often desirable to make an existing master page component into a regular page component for a specific regular page (so it would be shown only on the pertinent regular page), without affecting the properties of the component or vice versa—making an existing regular page component into a master page component. It will be further appreciated that executing such a change may not affect the current display of components, since the component is visible to the designer, whether it belongs to the master page or the regular page. However, if designer 5 switches regular pages, the component continues to be displayed if it is a master page component, but may no longer be visible if it is a regular page component. It will be appreciated that one possible method of "moving the component" may be through the use of a tooltip. Clicking on a tooltip may switch editing mode or may move the component to the opposite—type page. Another method may be through editing the property sheet of the pertinent component which is typically displayed when editing a component. The property sheet should clearly indicate if the component is associated with a master page or with a regular page. Yet another method may be by clicking on a specific area or element within the component itself (i.e. use a special handle). The area or handle may change shape when the component changes from a master page component to a regular page component and vice versa. Another method may be by physically dragging the component from outside the page group container into it and vice versa. It will be appreciated that this may not work for master page components which are placed in the same areas as the page group container or when component (master page or regular page) overlaps the page group container.

Figure 54:
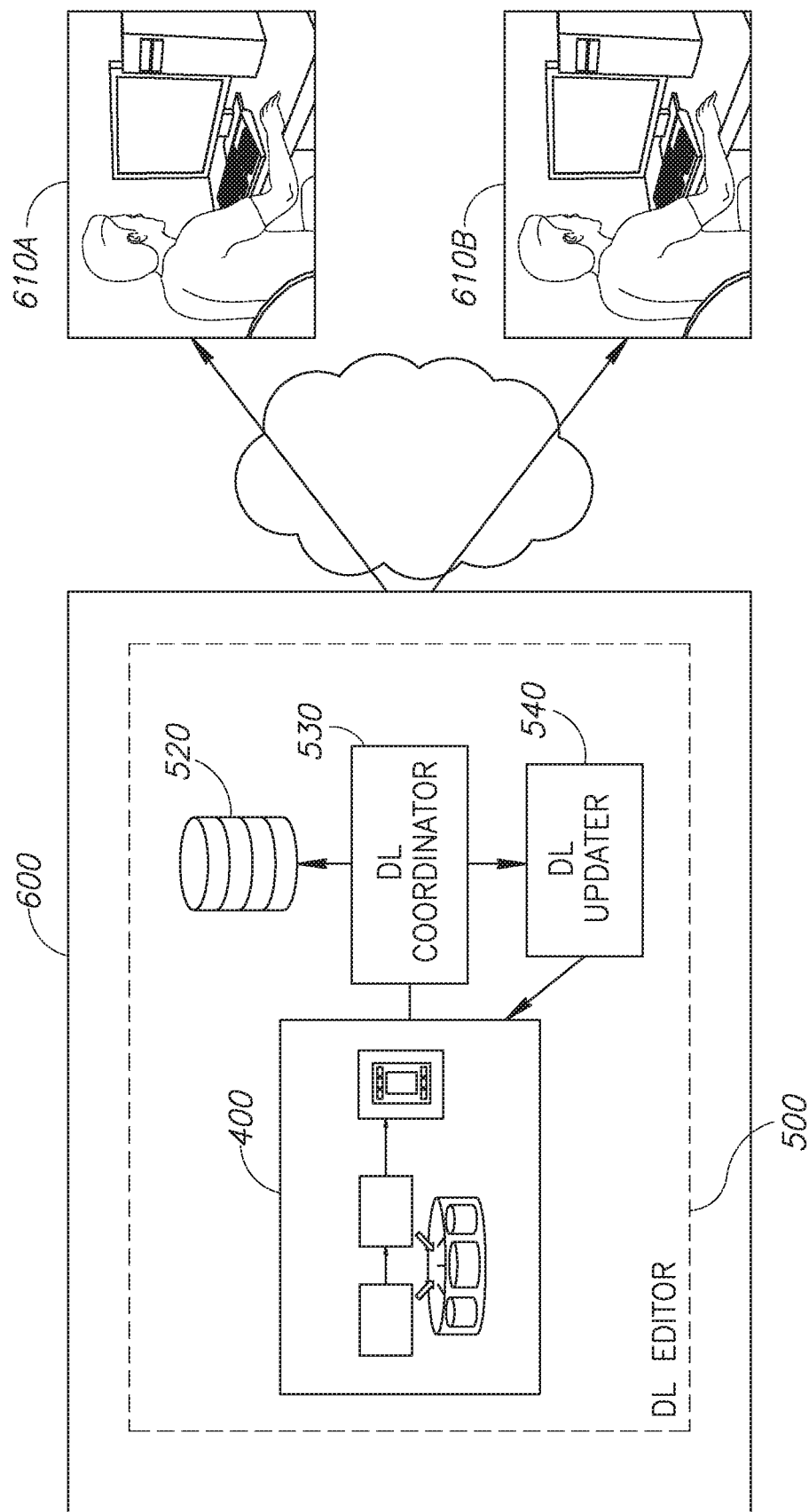
FIG. 54 is a schematic illustration of the implementation of the combined editors of FIG. 50 on a remote server, constructed and operative in accordance with the present invention.

As discussed hereinabove, in an alternative embodiment to the present invention, both editors 400 and 500 may be implemented locally or on a remote server (either together or editor 400 as standalone) accessed by a communication medium such as the Internet, as is illustrated in FIG. 54 to which reference is now made. Editors 400 and 500 may reside on a remote server 600 which may be accessed by clients 610A and 610B. It will be further appreciated that this implementation may allow multiple designers and or users to create and use composite pages which may be shared with or without dynamic layout capabilities. In another embodiment, editors 400 and 500 may be integrated with a larger software system (such as the Facebook system) so as to provide a rich media application for editing, layout and display services inside the larger software system. Editors 400 and 500 may provide the user interface, or may function as a back-end engine, with a different front end system providing the actual user interface.

Figure 55:
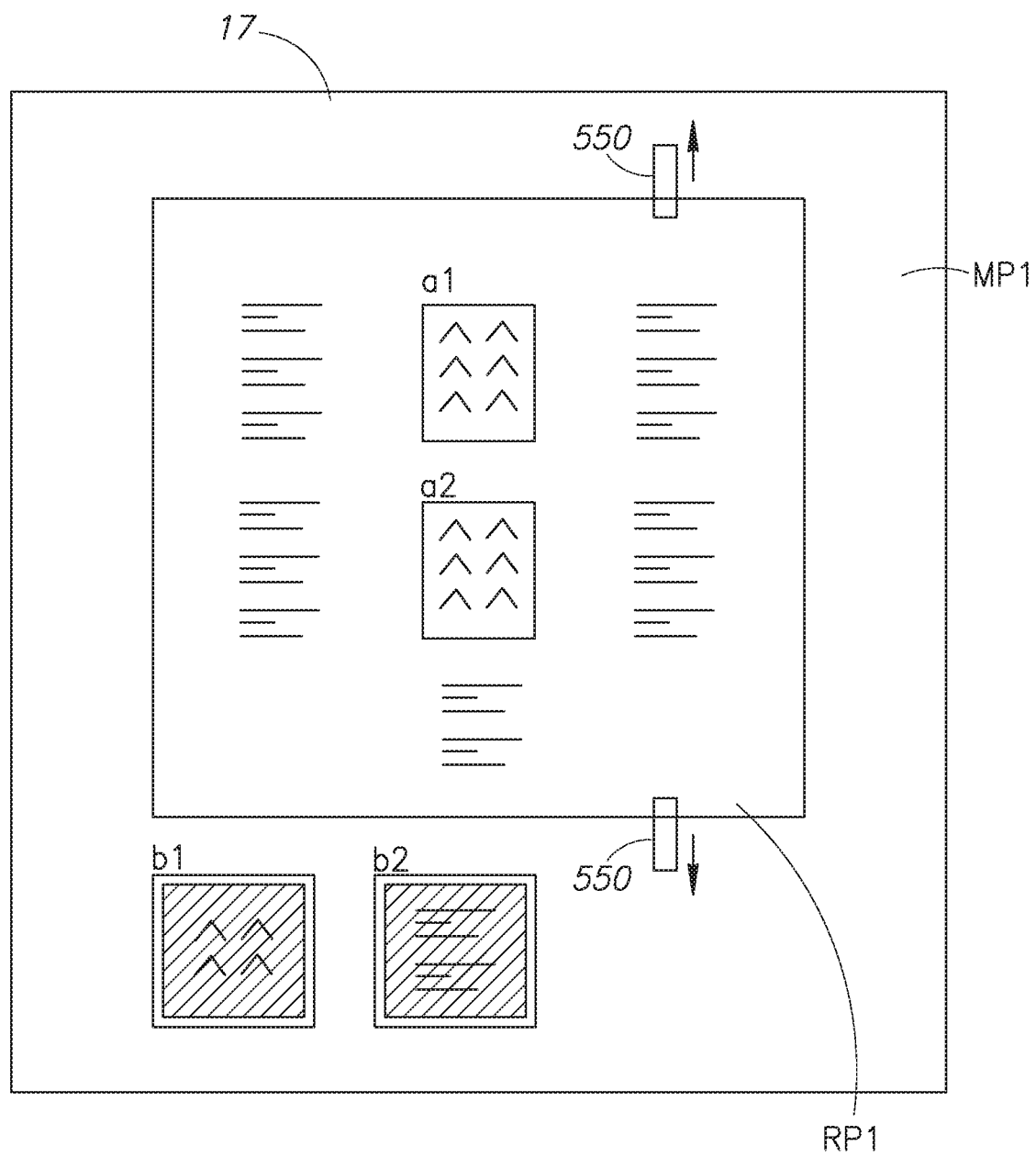
FIG. 55 is a schematic illustration of the use of smart handles to change the boundaries between a master page and regular pages.

Therefore, whether designer 5 is in master page editing mode or in regular page editing mode, he may perform a number of actions to streamline his editing capabilities. He may switch between different regular pages while viewing the same master page, he may switch between different editing modes and he may change and/or move components from master page to regular page and vice versa. As shown in FIG. 55 to which reference is now made, he may also utilize a smart handle, here labeled 550, to change the boundaries between the master page and the regular pages, in any direction (as an example, FIG. 55 shows smart handles for lengthening or shortening of the regular pages). This may cause dynamic layout changes and/or may change which components belong to the master page and the regular pages and vice versa.

It will be appreciated that all these capabilities may be implemented based on user interface action and/or mouse gestures. It will be further appreciated that all of the above mentioned capabilities may be also be enhanced through the use of dynamic layout relationships and rules.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer or a client/server configuration selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A website editor implementable on a computing device, the editor comprising:
   a hardware processor; and
   a database to store pages and components, said components predefined as one of: master components associated with at least one master page and regular components associated with at least one regular page;
   a displayer running on said hardware processor to display a composite page comprising master components and regular components;
   an editor running on said hardware processor to enable a user to select either said master components or said regular components for editing thereby defining selected components and non-selected components; and
   a layout manager running on said hardware processor to dynamically create at least automatic anchors between parallel edges of affecting and affected selected master components or regular components when said layout manager detects a situation where an affecting selected component is related to an affected selected component, said automatic anchors to maintain a spatial relationship between said affecting and affected selected components when said affecting selected component is moved, said automatic anchors having associated dynamic layout rules, said rules defining relationships at least between content and a containing component, between a component and a peer component in a primary direction and between horizontal and vertical edges of said affecting and said affected selected components.

2. The website editor of claim 1 and wherein said master page also comprises a page group component to provide a location for said at least one regular page.

3. The website editor according to claim 1 and wherein said editor comprises a regular page switcher to switch the current regular page being displayed and edited.

4. The website editor according to claim 3 and wherein said regular page switcher comprises a visual menu arrangement to activate said regular page switcher.

5. The website editor according to claim 1 and also comprising a dynamic layout editor to update said selected components.

6. The website editor according to claim 5 and wherein said displayer displays said dynamic layout updates.

7. The website editor according to claim 6 and wherein said displayer displays said dynamic layout updates through an animation effect.

8. A method for editing a website, the method comprising:
   storing in a database, pages and components, said components predefined as one of: master components associated with at least one master page and regular components associated with at least one regular page;
   displaying a composite page comprising master components and regular components;
   enabling a user to select either said master components or said regular components for editing thereby defining selected components and non-selected components; and
   dynamically creating at least automatic anchors between parallel edges of affecting and affected selected master components or regular components when said layout manager detects a situation where an affecting selected component is related to an affected selected component, said automatic anchors to maintain a spatial relationship between said affecting and affected selected components when said affecting selected component is moved, said automatic anchors having associated dynamic layout rules, said rules defining relationships at least between content and a containing component, between a component and a peer component in a primary direction and between horizontal and vertical edges of said affecting and said affected selected components.

9. The method of claim 8 and wherein said master page also comprises a page group component to provide a location for said at least one regular page.

10. The method according to claim 8 and wherein said enabling a user comprises switching the current regular page being displayed and edited.

11. The method according to claim 10 and wherein said switching comprises activating said switching using a visual menu arrangement.

12. The method according to claim 8 and also comprising a updating said selected components.

13. The method according to claim 12 and wherein said displaying displays said dynamic layout updates.

14. The method according to claim 13 and wherein said displaying displays said dynamic layout updates through an animation effect.

* * * * *